(12) United States Patent  
Li et al.

(10) Patent No.: US 11,960,012 B2  
(45) Date of Patent: Apr. 16, 2024

(54) POSITIONING METHOD AND ELECTRONIC DEVICE

(71) Applicant: HUAWEI TECHNOLOGIES CO., LTD., Guangdong (CN)

(72) Inventors: Wei Li, Xi'an (CN); Yongliang Wang, Xi'an (CN); Chengyu Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/683,080

(22) Filed: Feb. 2, 2022

(65) Prior Publication Data

US 2022/0283318 A1  Sep. 8, 2022

Related U.S. Application Data

(63) Continuation of application No. PCT/CN2020/111328, filed on Aug. 26, 2020.

(30) Foreign Application Priority Data

Aug. 29, 2019  (CN) .......................... 201910810205.9

(51) Int. Cl.  
*G01S 19/40* (2010.01)

(52) U.S. Cl.  
CPC .................................... *G01S 19/40* (2013.01)

(58) Field of Classification Search  
CPC ............................................................ G01S 19/40  
USPC .................................................... 342/357.23  
See application file for complete search history.

(56) References Cited

U.S. PATENT DOCUMENTS

| | | | |
|---|---|---|---|
| 9,611,057 B2* | 4/2017 | Driscoll | G01S 19/48 |
| 9,766,349 B1 | 9/2017 | Madhow et al. | |
| 11,626,971 B2* | 4/2023 | Curran | G01S 19/015 |
| | | | 380/255 |
| 2014/0266873 A1* | 9/2014 | Pighin | G01S 19/073 |
| | | | 342/357.42 |
| 2015/0338522 A1 | 11/2015 | Miller et al. | |
| 2017/0068001 A1 | 3/2017 | Chhokra et al. | |
| 2017/0131409 A1 | 5/2017 | Irish et al. | |
| 2019/0320409 A1* | 10/2019 | Dvorecki | G01S 19/396 |
| 2023/0128817 A1* | 4/2023 | Bennington | H04L 67/12 |
| | | | 342/357.45 |

FOREIGN PATENT DOCUMENTS

| | | | |
|---|---|---|---|
| CN | 102165330 A | 8/2011 | |
| CN | 105628033 A | 6/2016 | |

(Continued)

*Primary Examiner* — Harry K Liu  
(74) *Attorney, Agent, or Firm* — Gregg Jansen

(57) ABSTRACT

This application provide a positioning method, including: obtaining, by a first electronic device, a first location of a second electronic device; determining a plurality of candidate locations by using the first location as a center point; selecting a plurality of candidate positioning locations from the plurality of candidate locations based on elevations and azimuths of a plurality of satellites relative to the candidate locations, grid data corresponding to the plurality of candidate locations, and signal parameters of broadcast signals received by the second electronic device from the plurality of satellites; and correcting the first location based on the plurality of candidate positioning locations, to output a corrected second location.

20 Claims, 40 Drawing Sheets

(56) References Cited

FOREIGN PATENT DOCUMENTS

| | | | | |
|---|---|---|---|---|
| CN | 105761310 A | 7/2016 | | |
| CN | 105807301 A | 7/2016 | | |
| CN | 106886036 A | 6/2017 | | |
| CN | 107064974 A | 8/2017 | | |
| CN | 107966724 A | 4/2018 | | |
| CN | 110178049 A | 8/2019 | | |
| CN | 115803648 A | * 3/2023 | ............... | G01C 5/00 |
| JP | 2011002324 A | 1/2011 | | |
| WO | 2014188919 A1 | 11/2014 | | |

* cited by examiner

```
CONT.                CONT.                                                              CONT.
FROM                 FROM                                                               FROM
FIG. 23A             FIG. 23A                                                           FIG. 23A
```

S2008: Select a plurality of candidate positioning locations from the plurality of candidate locations based on the first visibility and the second visibility of the plurality of satellites relative to the plurality of candidate locations S2101: Obtain, based on road identifiers of roads on which some or all of the candidate positioning locations in the plurality of candidate positioning locations are located, road data of the roads on which some or all of the candidate positioning locations are located S2102: Determine a positioned road based on distribution statuses of some or all of the candidate positioning locations on target roads, where the positioned road is a road on which the wearable device 420 is located S2103: Determine, based on distribution statuses of some or all of the candidate positioning locations on both sides of a road centerline of the positioned road, a side that is of the road centerline of the positioned road and on which the wearable device 420 is located S2104: Calculate a vertical projection of the first location or a second location on a road edge on one side of the road centerline of the positioned road, and output the second location at which the vertical projection is located S2010: Indicate the second location to the wearable device 420

S2011: Obtain the second location indicated by the mobile phone 410, and output the second location

FIG. 23B

POSITIONING METHOD AND ELECTRONIC DEVICE

CROSS-REFERENCE TO RELATED APPLICATIONS

This application is a continuation of International Application No. PCT/CN2020/111328, filed on Aug. 26, 2020, which claims priority to Chinese Patent Application No. 201910810205.9, filed on Aug. 29, 2019. The disclosures of the aforementioned applications are hereby incorporated by reference in their entireties

TECHNICAL FIELD

Embodiments of this application relate to the field of positioning technologies, and in particular, to a positioning method and an electronic device.

BACKGROUND

A global navigation satellite system (GNSS) is a wireless positioning system in which an electronic device is located by using distance measurement. For example, the GNSS may include a global positioning system (GPS), a global navigation satellite system (GLONASS), a Beidou navigation satellite system (BDS), a quasi-zenith satellite system (QZSS), satellite-based augmentation systems (SBAS), a Galileo satellite navigation system (GALILEO), and/or the like.

A GNSS positioning principle is as follows: A satellite sends a broadcast signal in real time. An electronic device (for example, a mobile phone) may determine a distance (which is referred to as a pseudorange) between the electronic device and the satellite based on the broadcast signal. For example, as shown in FIG. 1, a distance between a mobile phone and a satellite 1 is d1, a distance between the mobile phone and a satellite 2 is d2, a distance between the mobile phone and a satellite 3 is d3, and a distance between the mobile phone and a satellite 4 is d4. Then, the electronic device may find, based on accurate distances between three satellites and the electronic device, three spherical surfaces that respectively use each satellite as a sphere center point and a corresponding distance as a radius. The mobile phone identifies an intersection of the three spherical surfaces on the earth's surface as a location of the mobile phone. For example, as shown in FIG. 2, a location of the mobile phone is an intersection of a spherical surface with the satellite 1 as a sphere center point and d1 as a radius, a spherical surface with the satellite 2 as a sphere center point and d2 as a radius, and a spherical surface with the satellite 3 as a sphere center point and d3 as a radius on the earth's surface.

It can be learned from the foregoing description that the mobile phone can accurately calculate the location of the mobile phone only when accurate distances between a plurality of satellites and the mobile phone is known for calculation. In other words, more accurate pseudoranges obtained by the mobile phone through measurement based on broadcast signals indicate higher positioning accuracy of the mobile phone.

However, in some scenarios (for example, an urban scenario with densely distributed high-rise buildings shown in FIG. 3), the broadcast signal transmitted by the satellite is blocked. The broadcast signal can be received by the mobile phone only after being reflected by an obstruction. For example, broadcast signals respectively transmitted by the satellite 2 and the satellite 3 need to be reflected by the high-rise building before being received by the mobile phone. In this case, a pseudorange between the satellite and the mobile phone measured by the mobile phone is not a straight-line distance between the satellite 2 and the mobile phone, but a distance obtained after the broadcast signal is reflected. A large measurement error of a pseudorange may seriously affect positioning accuracy of the mobile phone. For example, as shown in FIG. 3, a real location at which a user holds the mobile phone is located is far away from a positioning location of the mobile phone.

SUMMARY

Embodiments of this application provide a positioning method and an electronic device, to implement that in a scenario in which a signal transmitted by a satellite is easily blocked, positioning accuracy of the electronic device can still be ensured or even improved.

According to a first aspect, an embodiment of this application provides a positioning method. The method may be used by a first electronic device to position a second electronic device. The second electronic device may receive broadcast signals transmitted by a plurality of satellites. The method may include: The first electronic device obtains a first location of the second electronic device. Then, the first electronic device determines a plurality of candidate locations by using the first location as a center point. The first electronic device selects a plurality of candidate positioning locations from the plurality of candidate locations based on elevations and azimuths of the plurality of satellites relative to the plurality of candidate locations, grid data corresponding to the plurality of candidate locations, and signal parameters of the broadcast signals received by the second electronic device from the plurality of satellites. Finally, the first electronic device corrects the first location based on location information of the plurality of candidate positioning locations, to output a corrected second location.

In an implementation, the first location may be determined by the second electronic device through positioning. Grid data corresponding to each candidate location includes location information and a sky blocking curve. A sky blocking curve of one candidate location is used to indicate elevations and azimuths, relative to the candidate location, of a plurality of obstructions around the candidate location.

It may be understood that, the grid data corresponding to the candidate location includes a sky blocking curve, and a sky blocking curve of one candidate location is used to indicate elevations and azimuths, relative to the candidate location, of a plurality of obstructions around the candidate location; therefore, the first electronic device may obtain, based on the elevations and azimuths of the plurality of satellites relative to the plurality of candidate locations, the grid data corresponding to the plurality of candidate locations, and the signal parameters of the broadcast signals received by the second electronic device from the plurality of satellites, a blocking status of a signal from a satellite at each candidate location, that is, whether the broadcast signal transmitted by the satellite can be received by the second electronic device at the candidate location through straight-line transmission. The first electronic device selects, based on the blocking status of a signal from a satellite at each candidate location, a plurality of candidate positioning locations from the plurality of candidate locations, and the plurality of candidate positioning locations obtained through positioning is relatively accurate. Therefore, compared with the first location obtained by the second electronic device through positioning, the second position obtained by correcting the first location by the first electronic device based on the location information of the plurality of candidate positioning locations is more accurate in terms of positioning.

In conclusion, according to the method in this embodiment of this application, in a scenario in which a signal transmitted by a satellite is easily blocked, positioning accuracy of an electronic device can still be ensured or even improved.

With reference to the first aspect, in a possible design, the grid data corresponding to the plurality of candidate positioning locations may further include road identifiers of roads on which candidate positioning locations in the plurality of candidate positioning locations are located. The method in this embodiment of this application may further include: The first electronic device determines, based on road data corresponding to road identifiers of roads on which some or all of the candidate positioning locations are located, a side that is of a road centerline of a positioned road and on which the second electronic device is located. The road data includes at least one of road start point coordinates, road width information, and road direction information. The positioned road is a road on which the second electronic device is located. In other words, according to the method in this embodiment of this application, the first electronic device can improve positioning accuracy of the second electronic device, and can accurately locate a side of the road on which the second electronic device is located. In this way, the following problem in some scenarios can be avoided: Another user cannot find a user of the second electronic device in a timely manner because a side of the road on which the second electronic device is located cannot be accurately located.

With reference to the first aspect, in a possible design, a method in which the first electronic device determines, based on the road identifiers of the roads on which some or all of the candidate positioning locations are located, a side that is of the road centerline of the positioned road and on which the second electronic device is located may specifically include: The first electronic device obtains, based on the road identifiers of the roads on which some or all of the candidate positioning locations are located, the road data of the roads on which some or all of the candidate positioning locations are located. The first electronic device determines the positioned road based on distribution statuses of some or all of the candidate positioning locations on a target road, where the target road is a road on which some or all of the candidate positioning locations are located. The first electronic device determines, based on distribution statuses of some or all of the plurality of candidate positioning locations on both sides of the road centerline of the positioned road, a side that is of the road centerline of the positioned road and on which the second electronic device is located. The road data includes at least one of road start point coordinates, road width information, and road direction information.

It may be understood that some or all of the candidate positioning locations may be distributed on one or more target roads. For example, the first electronic device determines, based on distribution statuses of some or all of the plurality of candidate positioning locations on the one or more target roads, a target road on which a largest quantity of candidate positioning locations are distributed is determined as the foregoing positioned road.

With reference to the first aspect, in a possible design, a quantity of candidate positioning locations distributed on one side of the road centerline of the positioned road is greater than a quantity of candidate positioning locations distributed on the other side of the road centerline. In other words, the first electronic device may determine that the second electronic device is located on a side, of the road centerline of the positioned road, on which a larger quantity of candidate positioning locations are distributed.

With reference to the first aspect, in a possible design, a method in which the first electronic device corrects the first location based on the location information of the plurality of candidate positioning locations, to output the corrected second location may specifically include: The first electronic device calculates a vertical projection of the first location on a road edge on one side of the road centerline, and outputs the second location at which the vertical projection is located.

When correcting the first location to obtain the second location, the first electronic device refers to an obstruction around the first location, and also refers to the positioned road of the second electronic device and a relative location (namely, a side of the positioned road on which the second electronic device is located) of the second electronic device to the positioned road. Therefore, compared with the first location of the second electronic device, the second location is comparatively close an actual location of the second electronic device. Therefore, positioning accuracy of the second electronic device is improved.

With reference to the first aspect, in a possible design, a method in which the first electronic device selects the plurality of candidate positioning locations from the plurality of candidate locations based on the elevations and azimuths of the plurality of satellites relative to the plurality of candidate locations, the sky blocking curves corresponding to the plurality of candidate locations, and the signal parameters of the broadcast signals received by the second electronic device from the plurality of satellites includes: The first electronic device selects the plurality of candidate positioning locations from the plurality of candidate locations based on first visibility and second visibility of the plurality of satellites relative to the plurality of candidate locations.

First visibility of one satellite relative to one candidate location is used to indicate that the one satellite is a line-of-sight satellite or a non-line-of-sight satellite of the one candidate location, and the first visibility is related to a sky blocking curve of the one candidate location and an elevation and azimuth of the one satellite relative to the one candidate location. Second visibility of the one satellite relative to the one candidate location is used to indicate a probability that the one satellite is a line-of-sight satellite of the one candidate location, and the second visibility is related to the signal parameters of the broadcast signals received by the second electronic device from the plurality of satellites.

It may be understood that first visibility of one satellite relative to one candidate location is related to "an elevation and azimuth of the one satellite relative to the one candidate location" and "a sky blocking curve of the one candidate location". However, "an elevation and azimuth of the one satellite relative to the one candidate location" and "a sky blocking curve of the one candidate location" do not vary with a measurement error of a pseudorange between the second electronic device and the one satellite. Therefore, "first visibility of one satellite relative to one candidate location" shows a real case in which the one satellite is a line-of-sight satellite or a non-line-of-sight satellite of the one candidate location.

A measurement error may exist in a signal parameter (for example, a pseudorange) of a broadcast signal received by the second electronic device from the satellite. It can be learned that "second visibility of the satellite relative to the one candidate location" related to "a signal parameter of the broadcast signal received by the second electronic device from the one satellite" may not reflect a real case in which the satellite is a line-of-sight satellite of the one candidate location.

In conclusion, based on the first visibility that can reflect a real case in which one satellite is a line-of-sight satellite or a non-line-of-sight satellite of one candidate location and the second visibility that cannot reflect a real case in which one satellite is a line-of-sight satellite of one candidate location, the first electronic device can select candidate locations, namely, the plurality of candidate positioning locations, with a relatively high degree in matching the first visibility with the second visibility from the plurality of candidate locations.

With reference to the first aspect, in a possible design, the plurality of candidate positioning locations include a candidate location at which a quantity of satellites that meet a preset condition is greater than a preset quantity threshold. Alternatively, the plurality of candidate positioning locations include M candidate locations in the plurality of candidate locations. M≥2, and M is a positive integer. A quantity of satellites that meet the preset condition in the M candidate locations is greater than a quantity of satellites that meet the preset condition at another candidate location. The another candidate location includes a candidate location other than the M candidate locations in the plurality of candidate locations, and the satellite that meets the preset condition is a satellite whose first visibility and second visibility match.

In this embodiment of this application, that first visibility and second visibility of a satellite relative to a candidate location match may specifically include: The first visibility indicates that the satellite is a line-of-sight satellite of the candidate location, and the second visibility is greater than or equal to a preset probability threshold. Alternatively, the first visibility indicates that the satellite is a non-line-of-sight satellite of the candidate location, and the second visibility is less than a preset probability threshold.

With reference to the first aspect, in a possible design, before the first electronic device selects the plurality of candidate positioning locations from the plurality of candidate locations based on the first visibility and the second visibility that are of the plurality of satellites relative to the plurality of candidate locations, the method in this embodiment of this application may further include: The first electronic device determines, for each satellite and each candidate location and based on the elevation and azimuth of the one satellite relative to the one candidate location and grid data corresponding to the one candidate location, the first visibility of the one satellite relative to the one candidate location, to obtain first visibility of each satellite relative to each candidate location. The first electronic device determines, for each satellite and based on a signal parameter of a broadcast signal received by the second electronic device from the one satellite, second visibility of the one satellite relative to each candidate location, to obtain second visibility of each satellite relative to each candidate location.

With reference to the first aspect, in a possible design, the first electronic device may determine the first visibility of the one satellite relative to the one candidate location with reference to the following manner:

First, the first electronic device obtains a first azimuth and a first elevation. The first azimuth is an azimuth of the one satellite relative to the one candidate location, and the first elevation is an elevation of the one satellite relative to the one candidate location. The first electronic device determines a sky blocking curve of the one candidate location based on location information of the one candidate location. The first electronic device obtains a second elevation from the sky blocking curve of the one candidate location based on the first azimuth. The second elevation is an elevation of a first obstruction relative to the one candidate location, and the first azimuth is an azimuth of the first obstruction relative to the one candidate location.

If the first elevation is greater than the second elevation, it indicates that the broadcast signal transmitted by the satellite can be received by the electronic device located at the candidate location through straight-line transmission. In this case, the first electronic device may determine that the satellite is a line-of-sight satellite of the candidate location. In other words, the first visibility of the satellite relative to the candidate location indicates that the satellite is a line-of-sight satellite.

Alternatively, if the first elevation is less than or equal to the second elevation, it indicates that the broadcast signal transmitted by the satellite cannot be received by the electronic device located at the candidate location through straight-line transmission. In this case, the first electronic device may determine that the satellite is a non-line-of-sight satellite of the candidate location. In other words, the first visibility of the satellite relative to the candidate location indicates that the satellite is a non-line-of-sight satellite.

With reference to the first aspect, in a possible design, the first electronic device stores model code of a preset artificial intelligence (AI) model. The preset AI model has a function of determining, based on a signal parameter of a broadcast signal received by an electronic device at any location from any satellite, second visibility of the any satellite relative to the any location.

The first electronic device may determine the second visibility of one satellite relative to one candidate location with reference to the following manner: The first electronic device runs the model code of the preset AI model; uses, as an input, the signal parameter of the broadcast signal received by the second electronic device from the one satellite; and determines, by using the preset AI model, the second visibility of the one satellite relative to each candidate location.

With reference to the first aspect, in a possible design, the grid data may be received by the first electronic device from a server. The method in this embodiment of this application may further include: The first electronic device receives grid data of at least one first grid from the server. The at least one first grid indicates a geographic area in which the first location is located, and an area of each first grid is less than a preset area threshold. Grid data of one first grid includes location information and a sky blocking curve of the one first grid. The first electronic device stores the grid data of the at least one first grid. It may be understood that the grid data corresponding to the one candidate location is grid data of a first grid closest to the one candidate location.

With reference to the first aspect, in a possible design, the grid data may be obtained by the first electronic device by processing an $i^{th}$ layer of tile map in N layers of tile maps. The method in this embodiment of this application may further include: The first electronic device obtains the $i^{th}$ layer of tile map in the N layers of tile maps, where the $i^{th}$ layer of tile map includes a plurality of map tiles. 2≤i≤N, and both i and N are positive integers. The first electronic device obtains grid data of at least one first grid in at least one map tile in the $i^{th}$ layer of tile map. At least one first grid of one map tile is at least one geographic area in a plurality of geographic areas obtained by dividing the map tile. An area of each first grid is less than the preset area threshold. Grid data of one first grid includes location information and a sky blocking curve of the one first grid. The first electronic device stores the grid data of the at least one first grid. It may be understood that the grid data corresponding to the one candidate location is grid data of a first grid closest to the one candidate location.

With reference to the first aspect, in a possible design, the $i^{th}$ layer of tile map may include a plurality of map tiles. The at least one map tile may include: a map tile, in the plurality of map tiles in the $i^{th}$ layer of tile map, of a geographic area in which the first electronic device is located. The geographic area in which the first electronic device is located may correspond to one or more map tiles.

With reference to the first aspect, in a possible design, the at least one first grid is a first grid of a geographic area with densely distributed obstructions. In other words, the first electronic device may obtain and store only the first grid of the geographic area with densely distributed obstructions. In this way, a calculation amount for obtaining the grid data of the first grid by the first electronic device may be reduced, and occupation of storage space of the first electronic device by the grid data may be further reduced.

With reference to the first aspect, in a possible design, before the first electronic device selects the plurality of candidate positioning locations from the plurality of candidate locations, the method in this embodiment of this application may further include: The first electronic device obtains the grid data corresponding to the plurality of candidate locations from the grid data of the at least one first grid stored by the first electronic device. The grid data corresponding to the plurality of candidate locations is grid data of a first grid closest to the plurality of candidate locations.

With reference to the first aspect, in a possible design, a method in which the first electronic device obtains the grid data of the at least one first grid may include: The first electronic device performs step a and step b for each map tile in the at least one map tile, to obtain the grid data of at least one first grid in the map tile. Step a: Divide one map tile into K first grids, where K≥2, and K is a positive integer. Step b: Obtain grid data of at least one first grid in the K first grids.

With reference to the first aspect, in a possible design, the grid data of the one first grid further includes a road identifier of a road on which the one first grid is located.

With reference to the first aspect, in a possible design, the grid data of the one first grid further includes road data of a road on which the one first grid is located. The road data includes at least one of road start point coordinates, road width information, and road direction information.

With reference to the first aspect, in a possible design, the grid data corresponding to the plurality of candidate locations is included in data of one or more map tiles. The data of the map tiles further includes road data, and the road data includes at least one of road start point coordinates, road width information, and road direction information.

With reference to the first aspect, in a possible design, the signal parameter of the broadcast signal includes a carrier-to-noise ratio (CN0), a pseudorange residual, and a pseudorange rate.

A larger CN0 indicates a higher possibility that a satellite is visible relative to an electronic device located at a candidate location. A smaller CN0 indicates a lower possibility that a satellite is a line-of-sight satellite of a candidate location. A larger pseudorange residual indicates a lower probability that a satellite is a line-of-sight satellite of a candidate location. A smaller pseudorange residual indicates a higher probability that a satellite is a line-of-sight satellite of a candidate location. A larger pseudorange rate indicates a lower probability that a satellite is a line-of-sight satellite of a candidate location. A smaller pseudorange rate indicates a higher probability that a satellite is a line-of-sight satellite of a candidate location.

With reference to the first aspect, in a possible design, the grid data of the first grid may further include building attribute information. The building attribute information is used to indicate that the first grid is located inside a building or outside a building.

It may be understood that if the building attribute information of the first grid indicates that the first grid is located inside a building, an electronic device located in the first grid cannot receive a broadcast signal transmitted by a satellite. Therefore, the electronic device located in the first grid cannot perform GNSS positioning. In other words, the grid data of the first grid is not used for location calibration, so as to improve positioning accuracy. In conclusion, the at least one first grid may be a first grid located outside the building. In this way, occupation of storage space of the first electronic device by the redundant grid data can be reduced.

According to a second aspect, an embodiment of this application provides an electronic device. The electronic device is the foregoing first electronic device, and the first electronic device positions a second electronic device. The electronic device may include a first determining module, a second determining module, a selection module, and a location correction module. The first determining module is configured to obtain a first location of the second electronic device. The second determining module is configured to determine a plurality of candidate locations by using the first location determined by the first determining module as a center point. The selection module is configured to select a plurality of candidate positioning locations from the plurality of candidate locations based on elevations and azimuths of the plurality of satellites relative to the plurality of candidate locations determined by the second determining module, grid data corresponding to the plurality of candidate locations, and signal parameters of broadcast signals received by the second electronic device from the plurality of satellites. Grid data corresponding to each of the candidate locations includes location information and a sky blocking curve, and a sky blocking curve of one candidate location is used to indicate elevations and azimuths, relative to the one candidate location, of a plurality of signal obstructions around the one candidate location. The location correction module is configured to correct the first location based on location information of the plurality of candidate positioning locations, to output a corrected second location. In an implementation, the first location may be determined by the second electronic device through positioning.

With reference to the second aspect, in a possible design, the grid data corresponding to the plurality of candidate positioning locations may include road identifiers of roads on which candidate positioning locations in the plurality of candidate positioning locations are located. The electronic device may further include a third determining module. The third determining module is configured to determine, based on road data corresponding to road identifiers of roads on which some or all of the candidate positioning locations are located, a side that is of a road centerline of a positioned road and on which the second electronic device is located. The road data includes at least one of road start point coordinates, road width information, and road direction information. The positioned road is a road on which the second electronic device is located.

With reference to the second aspect, in another possible design, the third determining module is specifically configured to: obtain, based on the road identifiers of the roads on which some or all of the candidate positioning locations are located, road data of the roads on which some or all of the candidate positioning locations are located; determine a positioned road based on distribution statuses of some or all of the candidate positioning locations on a target road, where the target road is a road on which some or all of the foregoing candidate positioning locations are located; and determine, based on distribution statuses of some or all of the candidate positioning locations on both sides of the road centerline of the positioned road, a side that is of the road centerline of the positioned road and on which the second electronic device is located.

With reference to the second aspect, in a possible design, a quantity of candidate positioning locations distributed on one side of the road centerline of the positioned road is greater than a quantity of candidate positioning locations distributed on the other side of the road centerline.

With reference to the second aspect, in another possible design, the location correction module is specifically configured to: calculate a vertical projection of the first location on a road edge on one side of the road centerline, and output the second location at which the vertical projection is located.

With reference to the second aspect, in a possible design, the selection module is specifically configured to select the plurality of candidate positioning locations from the plurality of candidate locations based on first visibility and second visibility of the plurality of satellites relative to the plurality of candidate locations. For detailed descriptions of the first visibility and the second visibility, refer to the descriptions in the first aspect and the possible designs of the first aspect. Details are not described again in this embodiment of this application.

With reference to the second aspect, in a possible design, the plurality of candidate positioning locations include a candidate location at which a quantity of satellites that meet a preset condition is greater than a preset quantity threshold. Alternatively, the plurality of candidate positioning locations include M candidate locations in the plurality of candidate locations, where M≥2, M is a positive integer, a quantity of satellites that meet the preset condition in the M candidate locations is greater than a quantity of satellites that meet the preset condition at another candidate location, and the another candidate location includes a candidate location other than the M candidate locations in the plurality of candidate locations. The satellite that meets the preset condition is a satellite whose first visibility and second visibility match.

With reference to the second aspect, in a possible design, the selection module is specifically configured to: determine, for each satellite and each candidate location and based on an elevation and azimuth of one satellite relative to one candidate location and grid data corresponding to the one candidate location, first visibility of the one satellite relative to the one candidate location, to obtain first visibility of each satellite relative to each candidate location; and determine, for each satellite and based on a signal parameter of a broadcast signal received by the second electronic device from the one satellite, second visibility of the one satellite relative to each candidate location, to obtain second visibility of each satellite relative to each candidate location.

With reference to the second aspect, in a possible design, that the selection module is configured to: determine, based on an elevation and azimuth of one satellite relative to one candidate location and grid data corresponding to the one candidate location, first visibility of the one satellite relative to the one candidate location may include: the selection module is configured to: obtain a first azimuth and a first altitude angle, where the first azimuth is an azimuth of the one satellite relative to the one candidate location, and the first elevation is an elevation of the one satellite relative to the one candidate position; determine a sky blocking curve of the one candidate location based on location information of the one candidate location; obtain a second elevation from the sky blocking curve of the one candidate location based on the first azimuth, where the second elevation is an elevation of a first obstruction relative to the one candidate location, and the first azimuth is an azimuth of the first obstruction relative to the one candidate location; and if the first elevation is greater than the second elevation, determine that first visibility of the one satellite relative to the one candidate location indicates that the one satellite is a line-of-sight satellite; or if the first elevation is less than or equal to the second elevation, determine that first visibility of the one satellite relative to the one candidate location indicates that the one satellite is a non-line-of-sight satellite.

With reference to the second aspect, in a possible design, the electronic device may further include a storage module. The storage module stores model code of a preset AI model. The preset AI model has a function of determining, based on a signal parameter of a broadcast signal received by an electronic device at any location from any satellite, second visibility of the any satellite relative to the any location.

That the selection module is configured to determine, based on a signal parameter of a broadcast signal received by the second electronic device from the one satellite, second visibility of the one satellite relative to each candidate location includes: the selection module is configured to: run the model code of the preset AI model; use, as an input, the signal parameter of the broadcast signal received by the second electronic device from the one satellite; and determine, by using the preset AI model, the second visibility of the one satellite relative to each candidate location.

With reference to the second aspect, in a possible design, the electronic device further includes a receiving module and a storage module. The receiving module is configured to receive grid data of at least one first grid from a server, where the at least one first grid indicates a geographic area in which the first location is located, an area of each first grid is less than a preset area threshold, and grid data of one first grid includes location information and a sky blocking curve of the one first grid. The storage module is configured to store the grid data of the at least one first grid received by the receiving module. The grid data corresponding to the one candidate location is grid data of a first grid closest to the one candidate location.

With reference to the second aspect, in a possible design, the electronic device further includes an obtaining module and a storage module. The obtaining module is configured to: obtain and $i^{th}$ layer of tile map in N layers of tile maps, where the $i^{th}$ layer of tile map includes a plurality of map tiles, 2≤i≤N, and both i and N are positive integers; and obtain grid data of at least one first grid in at least one map tile in the $i^{th}$ layer of tile map, where at least one first grid of one map tile is at least one geographic area in a plurality of geographic areas obtained by dividing the map tile, an area of each first grid is less than the preset area threshold, and grid data of one first grid includes location information and a sky blocking curve of the one first grid. The storage module is configured to the grid data of the at least one first grid obtained by the obtaining module. The grid data corresponding to the one candidate location is grid data of a first grid closest to the one candidate location.

With reference to the second aspect, in a possible design, the at least one first grid is a first grid of a geographic area with densely distributed obstructions.

With reference to the second aspect, in a possible design, the selection module is further configured to: before selecting the plurality of candidate positioning locations from the plurality of candidate locations, obtain, from the grid data of the at least one first grid stored in the storage module, grid data corresponding to the plurality of candidate locations. The grid data corresponding to the plurality of candidate locations is grid data of a first grid closest to the plurality of candidate locations.

With reference to the second aspect, in a possible design, the grid data of the one first grid further includes a road identifier of a road on which the one first grid is located.

According to a third aspect, an embodiment of this application provides an electronic device, and the electronic device is a first electronic device. The first electronic device positions a second electronic device. The electronic device includes a memory and one or more processors. The memory is coupled to the processor. The memory is configured to store computer program code, where the computer program code includes computer instructions. When the computer instructions are executed by the processor, the electronic device is enabled to perform the method according to any one of the first aspect and the possible designs of the first aspect.

According to a fourth aspect, an embodiment of this application provides a chip system, where the chip system is applied to a first electronic device. The first electronic device positions a second electronic device. The chip system includes one or more interface circuits and one or more processors. The interface circuit and the processor are interconnected by using a cable. The interface circuit is configured to receive a signal from a memory of the first electronic device, and send the signal to the processor. The signal includes computer instructions stored in the memory. When the processor executes the computer instructions, the first electronic device performs the method according to any one of the first aspect and the possible designs of the first aspect.

According to a fifth aspect, an embodiment of this application provides a computer storage medium. The computer storage medium includes computer instructions. When the computer instructions are run on a first electronic device, the first electronic device is enabled to perform the method according to any one of the first aspect and the possible designs of the first aspect.

According to a sixth aspect, an embodiment of this application provides a computer program product. When the computer program product runs on a computer, the computer is enabled to perform the method according to any one of the first aspect and the possible designs of the first aspect.

It may be understood that for beneficial effects that can be achieved by the electronic device according to the second aspect, the third aspect, any one of the possible designs of the second aspect, and any one of the possible designs of the third aspect, the chip system according to the fourth aspect, the computer storage medium according to the fifth aspect, and the computer program product according to the sixth aspect, refer to the beneficial effects in any one of the first aspect and the possible designs. Details are not described herein again.

BRIEF DESCRIPTION OF DRAWINGS

FIG. 23A and FIG. 23B are a flowchart of another positioning method according to an embodiment of this application;

DESCRIPTION OF EMBODIMENTS

The following terms "first" and "second" are merely intended for a purpose of descriptions, and shall not be understood as an indication or implication of relative importance or implicit indication of a quantity of indicated technical features. Therefore, a feature defining "first" or "second" may explicitly or implicitly include one or more features. In the descriptions of the embodiments, unless otherwise stated, "a plurality of" means two or more than two.

For ease of understanding, a specific method for performing GNSS positioning by an electronic device is described in the embodiments of this application.

Figure 1:
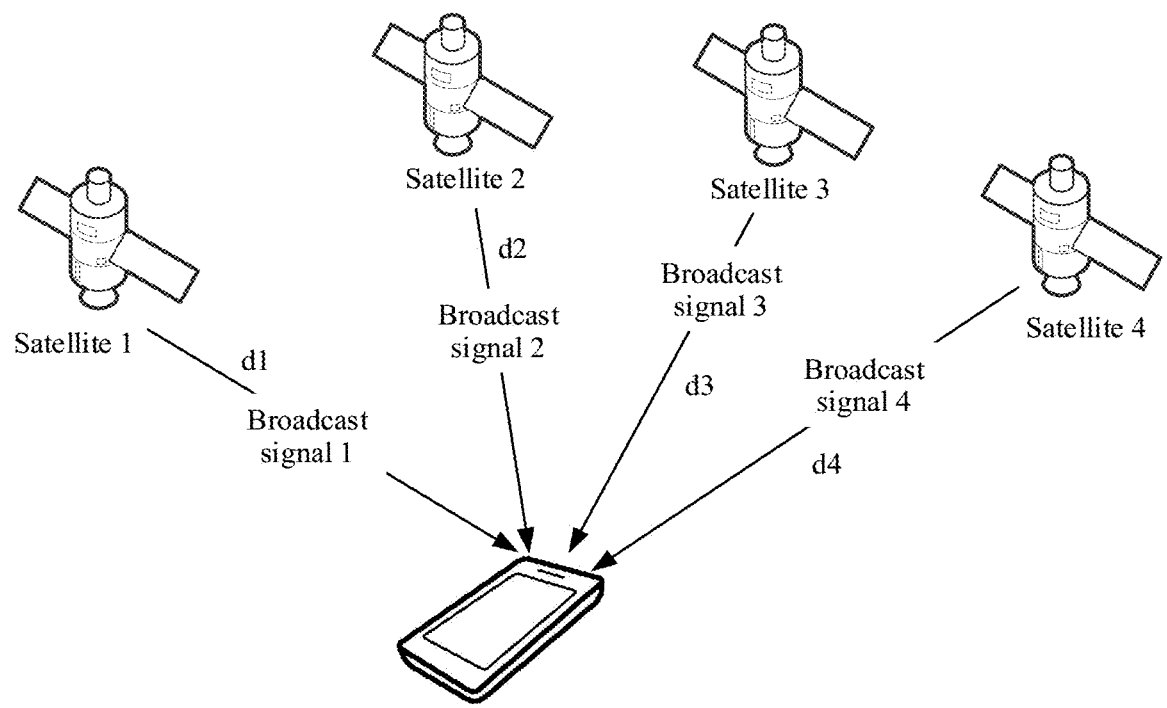
FIG. 1 is a diagram of a communications system corresponding to a GNSS positioning principle of a mobile phone according to an embodiment of this application.

A satellite can send a broadcast signal in real time, where the broadcast signal includes an ephemeris and a navigation message. An electronic device may receive broadcast signals from a plurality of satellites. For example, as shown in FIG. 1, a mobile phone may receive a broadcast signal 1 from a satellite 1, receive a broadcast signal 2 from a satellite 2, receive a broadcast signal 3 from a satellite 3, and receive a broadcast signal 4 from a satellite 4.

Figure 2:
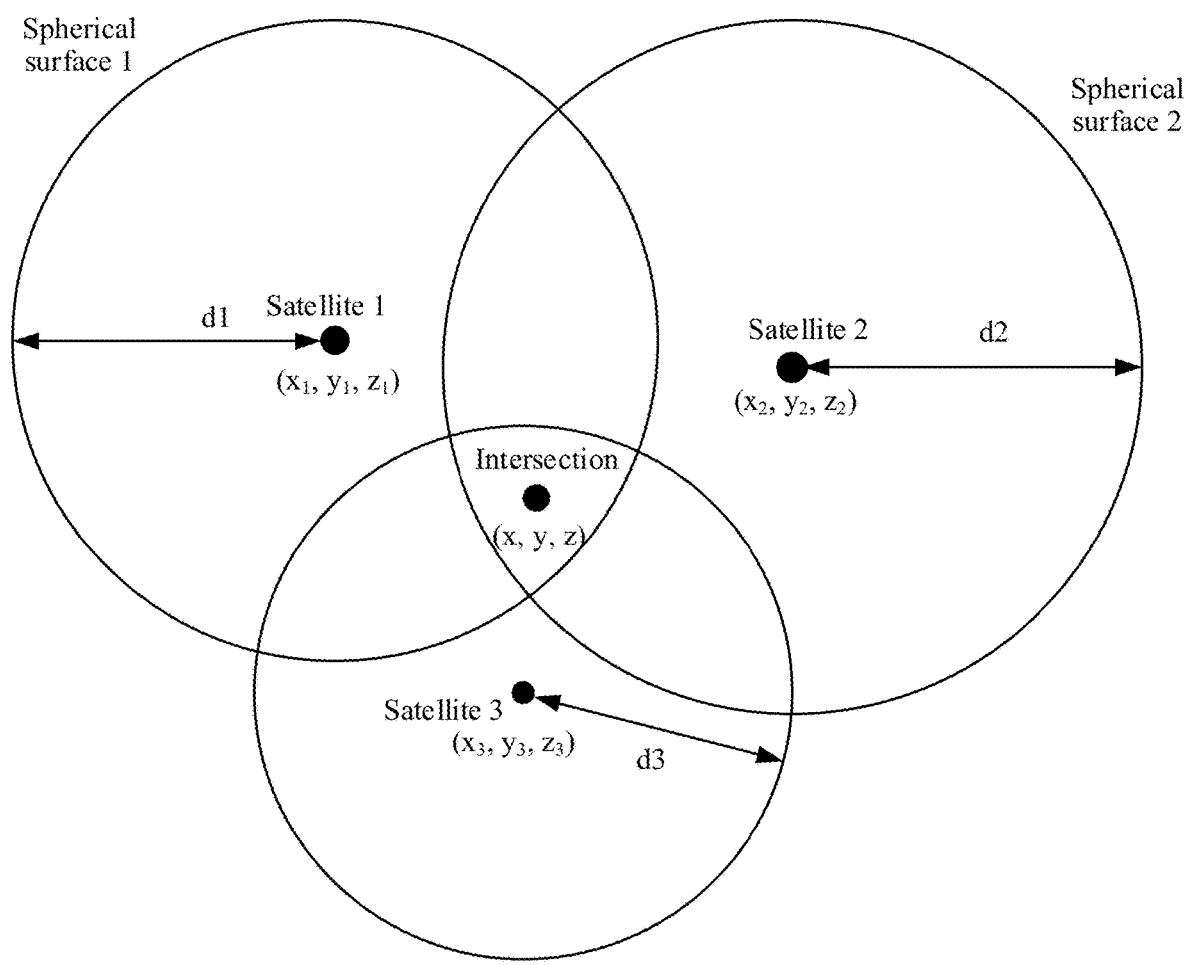
FIG. 2 is a diagram of a GNSS positioning principle of a mobile phone according to an embodiment of this application.

The ephemeris is used to describe a current flight location and speed of a satellite. The electronic device may determine, based on an ephemeris of a satellite, three-dimensional coordinates of the satellite relative to an earth centered earth fixed (earth centered earth fixed, ECEF) coordinate system. For example, as shown in FIG. 2, three-dimensional coordinates of the satellite 1 relative to the ECEF are $(x_1, y_1, z_1)$, three-dimensional coordinates of the satellite 2 relative to the ECEF are $(x_2, y_2, z_2)$, three-dimensional coordinates of the satellite 3 relative to the ECEF are $(x_3, y_3, z_3)$, and three-dimensional coordinates of the satellite 4 relative to the ECEF are $(x_4, y_4, z_4)$.

The navigation message is used to describe an operating status parameter of a satellite. The electronic device may calculate a distance between the electronic device and a satellite based on the navigation message of the satellite. A navigation message includes a sending time of a corresponding broadcast signal. The electronic device may determine a time at which the electronic device receives the broadcast signal. Specifically, the electronic device may calculate a distance between the electronic device and a satellite by using the following formula (1) based on a time at which the electronic device receives a broadcast signal, a time at which the satellite sends the broadcast signal, and a clock offset between the electronic device and the satellite:

$$d = c^*(t_r + \Delta t - t_s) \quad (1)$$

where c is the speed of light, $t_r$ is a time at which the electronic device receives a broadcast signal, $t_s$ is a time at which a satellite sends a broadcast signal, and $\Delta t$ is a clock offset between the electronic device and the satellite.

For example, it is assumed that a sending time of the broadcast signal 1 is $t_s^1$, and a time of receiving the broadcast signal 1 by the mobile phone is $t_r^1$; a sending time of the broadcast signal 2 is $t_s^2$, and a time of receiving the broadcast signal 2 by the mobile phone is $t_r^2$; and a sending time of the broadcast signal 3 is $t_s^3$, and a time of receiving the broadcast signal 3 by the mobile phone is $t_r^3$. In this case, the mobile phone may obtain the following through calculation performed by using the foregoing formula (1): a distance between the mobile phone and the satellite 1 $d1 = c^*(t_r^1 + \Delta t - t_s^1)$, a distance between the mobile phone and the satellite 2 $d2 = c^*(t_r^2 + \Delta t - t_s^2)$, and a distance between the mobile phone and the satellite 3 $d3 = c^*(t_r^3 + \Delta t - t_s^3)$.

Subsequently, the electronic device may calculate, by using the following formula (2), three-dimensional coordinates (x, y, z) of the electronic device relative to the ECEF based on three-dimensional coordinates of at least three satellites relative to the ECEF, and distances between the electronic device and the at least three satellites, to determine a location of the electronic device:

$$d1 = \sqrt{(x_1-x)^2 + (y_1-y)^2 + (z_1-z)^2}$$

$$d2 = \sqrt{(x_2-x)^2 + (y_2-y)^2 + (z_2-z)^2}$$

$$d3 = \sqrt{(x_3-x)^2 + (y_3-y)^2 + (z_3-z)^2} \quad (2)$$

In formula (2), d1, d2, d3, $x_1$, $y_1$, $z_1$, $x_2$, $y_2$, $z_2$, $x_3$, $y_3$, and $z_3$ are all known, and the electronic device may calculate the three-dimensional coordinates (x, y, z) of the electronic device relative to the ECEF by using formula (2), to determine the location of the electronic device.

Figure 3:
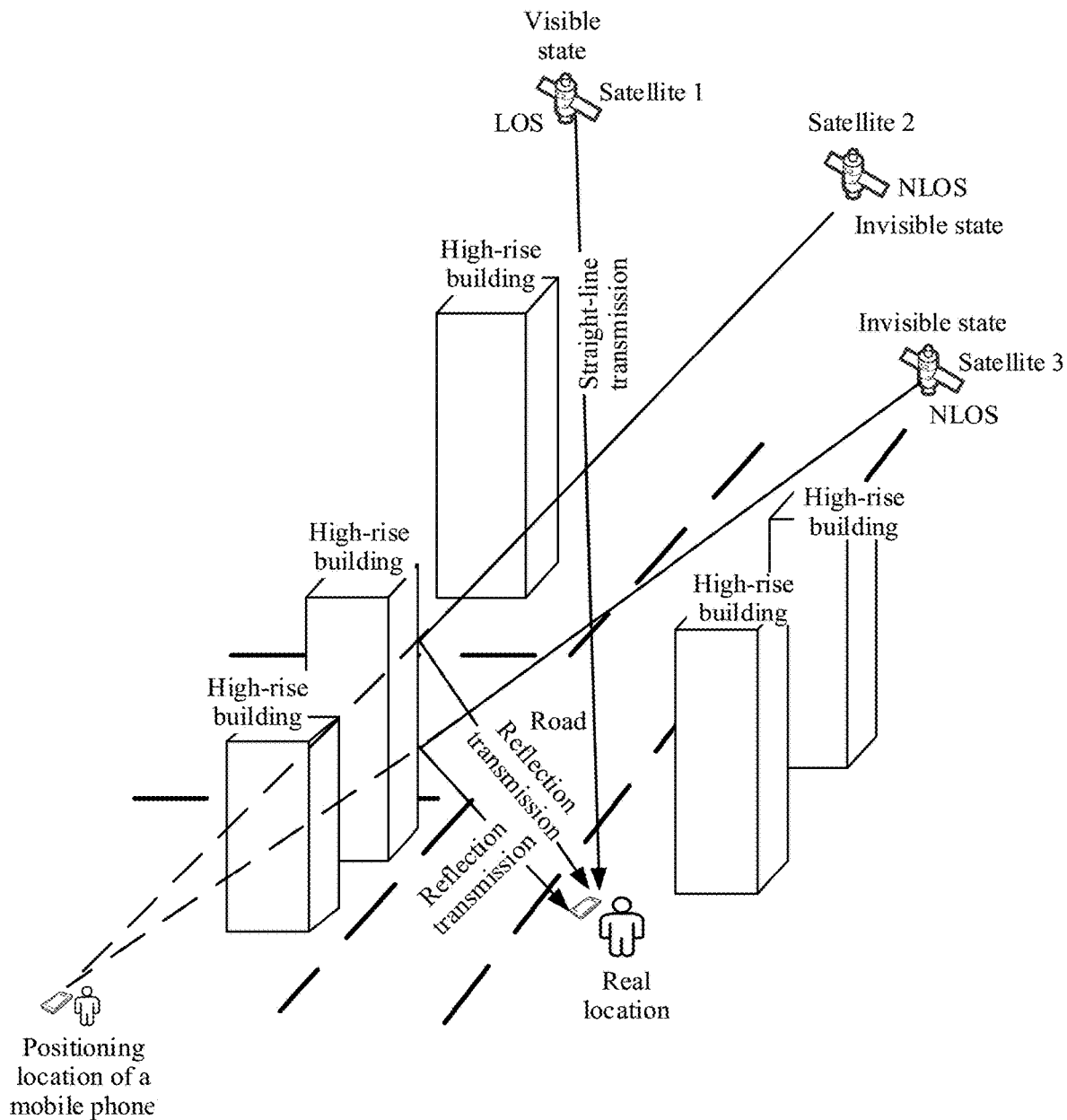
FIG. 3 is a diagram of an application scenario of a positioning method according to an embodiment of this application.

As shown in FIG. 3, in an urban scenario with densely distributed high-rise buildings, broadcast signals transmitted by the satellite 2 and the satellite 3 can be received by the mobile phone only after being reflected by high-rise buildings. In this case, the pseudorange d2 is not a straight-line distance between the satellite 2 and the mobile phone, but a distance of a path existing when the broadcast signal 2 is reflected; and the pseudorange d3 is not a straight-line distance between the satellite 3 and the mobile phone, but a distance of a path existing when the broadcast signal 2 is reflected. In other words, measurement errors of the pseudorange d2 and the pseudorange d3 are relatively large. Consequently, when measurement errors of the pseudorange d2 and the pseudorange d3 are relatively large, the electronic device cannot perform accurate positioning, and positioning accuracy of the electronic device is relatively low. As shown in FIG. 3, a real location at which a user holds the mobile phone is far away from a positioning location of the mobile phone, and positioning accuracy of the mobile phone is relatively low, affecting user experience.

An embodiment of this application provides a positioning method, which may be applied to a GNSS positioning process performed by an electronic device. By using the method, positioning accuracy of the electronic device can still be ensured or even improved in a scenario in which a signal transmitted by a satellite is easily blocked.

Figure 4:
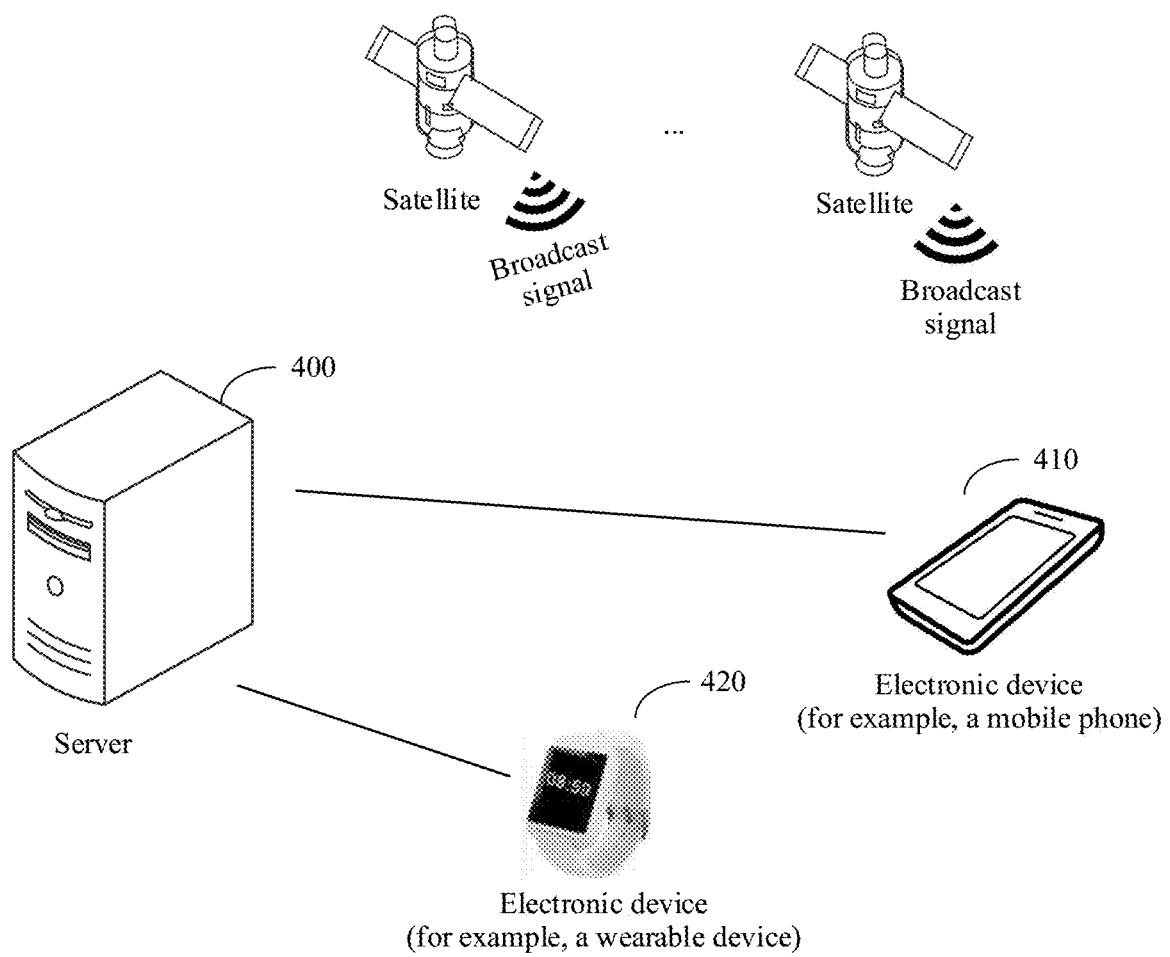
FIG. 4 is a diagram of a communications system to which a positioning method is applied according to an embodiment of this application.

FIG. 4 is a diagram of a positioning system to which a positioning method according to an embodiment of this application is applied. As shown in FIG. 4, the positioning system may include a server 400 and a plurality of electronic devices. For example, the plurality of electronic devices may include a mobile phone 410 and a wearable device 420.

The server 400 is configured to store a plurality of pieces of tile data. The plurality of pieces of tile data may be used to identify whether a satellite is a line-of-sight satellite or a non-line-of-sight satellite. Each electronic device may perform positioning by receiving broadcast signals transmitted by a plurality of satellites, to determine a first location of the electronic device. Then, the electronic device may identify visibility (including first visibility and second visibility) of a satellite based on the tile data in the server 400. The first visibility of the satellite is used to indicate that, for the electronic device, the satellite is a line-of-sight satellite or a non-line-of-sight satellite. The second visibility of the satellite is used to indicate a probability that the satellite is a line-of-sight satellite for the electronic device. Finally, the electronic device may correct the first location based on visibility of the plurality of satellites, to improve positioning accuracy of the electronic device.

If a signal transmitted by a satellite is blocked by an obstruction for an electronic device, that is, the satellite cannot transmit a broadcast signal to the electronic device in a straight line, the satellite is a non-line-of-sight satellite for the electronic device. If a signal transmitted by a satellite is not blocked by an obstruction for an electronic device, that is, the satellite can transmit a broadcast signal to the electronic device in a straight line, the satellite is a line-of-sight satellite for the electronic device. For example, as shown in FIG. 3, the signal transmitted by satellite 1 is not blocked for the mobile phone, that is, the satellite 1 can transmit a broadcast signal to the mobile phone in a straight line; and the signal transmitted by satellite 2 and the signal transmitted by satellite 3 are blocked by the buildings and cannot transmit broadcast signals to the mobile phone in a straight line. In this case, for the mobile phone shown in FIG. 3, the satellite 1 is a line-of-sight satellite, and the satellite 2 and the satellite 3 are non-line-of-sight satellites.

It should be noted that, because geographic locations of different electronic devices may be different, obstructions (for example, buildings) at different geographic locations may be different. Therefore, visibility to a same satellite may be different for the different electronic devices. Certainly, if a plurality of electronic devices are located at a same geographic location, visibility to a satellite is the same for the plurality of electronic devices. In addition, for a same electronic device, visibility to different satellites may be the same or different.

In this embodiment of this application, a transmission mode in which the satellite transmits a broadcast signal to the electronic device in a straight line is referred to as line-of-sight (LOS) transmission. For example, as shown in FIG. 3, a broadcast signal transmitted by the satellite 1 is received by the mobile phone through line-of-sight transmission LOS (namely, straight-line transmission). In this embodiment of this application, a transmission mode in which the satellite transmits a broadcast signal to the electronic device through reflection is referred to as non-line-of-sight (NLOS) transmission. For example, as shown in FIG. 3, broadcast signals transmitted by the satellite 2 and the satellite 3 are received by the mobile phone through non-line-of-sight transmission NLOS (namely, reflection transmission).

The method in this embodiment of this application may be applied to a scenario in which a first electronic device positions a second electronic device. The first electronic device and the second electronic device may be a same electronic device. In other words, the method in this embodiment of this application may be applied to one electronic device to locate the one electronic device. Alternatively, the first electronic device and the second electronic device may be different devices. In other words, the method in this embodiment of this application may be applied to one electronic device to locate another electronic device.

For example, the first electronic device may be a device that has a GNSS positioning function, such as a mobile phone (a mobile phone 410 shown in FIG. 4), a vehicle-mounted device (for example, a vehicle-mounted navigator), a tablet computer, a desktop computer, a laptop computer, a handheld computer, a wearable device, a notebook computer, an ultra-mobile personal computer (UMPC), a netbook, a cellular phone, a personal digital assistant (PDA), an augmented reality (AR)/virtual reality (VR) device, or the like. Certainly, the first electronic device may alternatively be a server 400 shown in FIG. 4. A specific form of the first electronic device is not specifically limited in this embodiment of this application. The following describes implementations of the embodiments of this application in detail with reference to the accompanying drawings.

For example, the second electronic device in this embodiment of this application may be a device that has a GNSS positioning function, for example, a mobile phone, a vehicle-mounted device (for example, a vehicle-mounted navigator), a tablet computer, a desktop computer, a laptop computer, a handheld computer, a wearable device (a wearable device 420 shown in FIG. 4), a notebook computer, an ultra-mobile personal computer (UMPC), a netbook, a cellular phone, a personal digital assistant (PDA), an augmented reality (AR)/virtual reality (VR) device, or the like. A specific form of the second electronic device is not specifically limited in this embodiment of this application. The following describes implementations of the embodiments of this application in detail with reference to the accompanying drawings.

Figure 5:
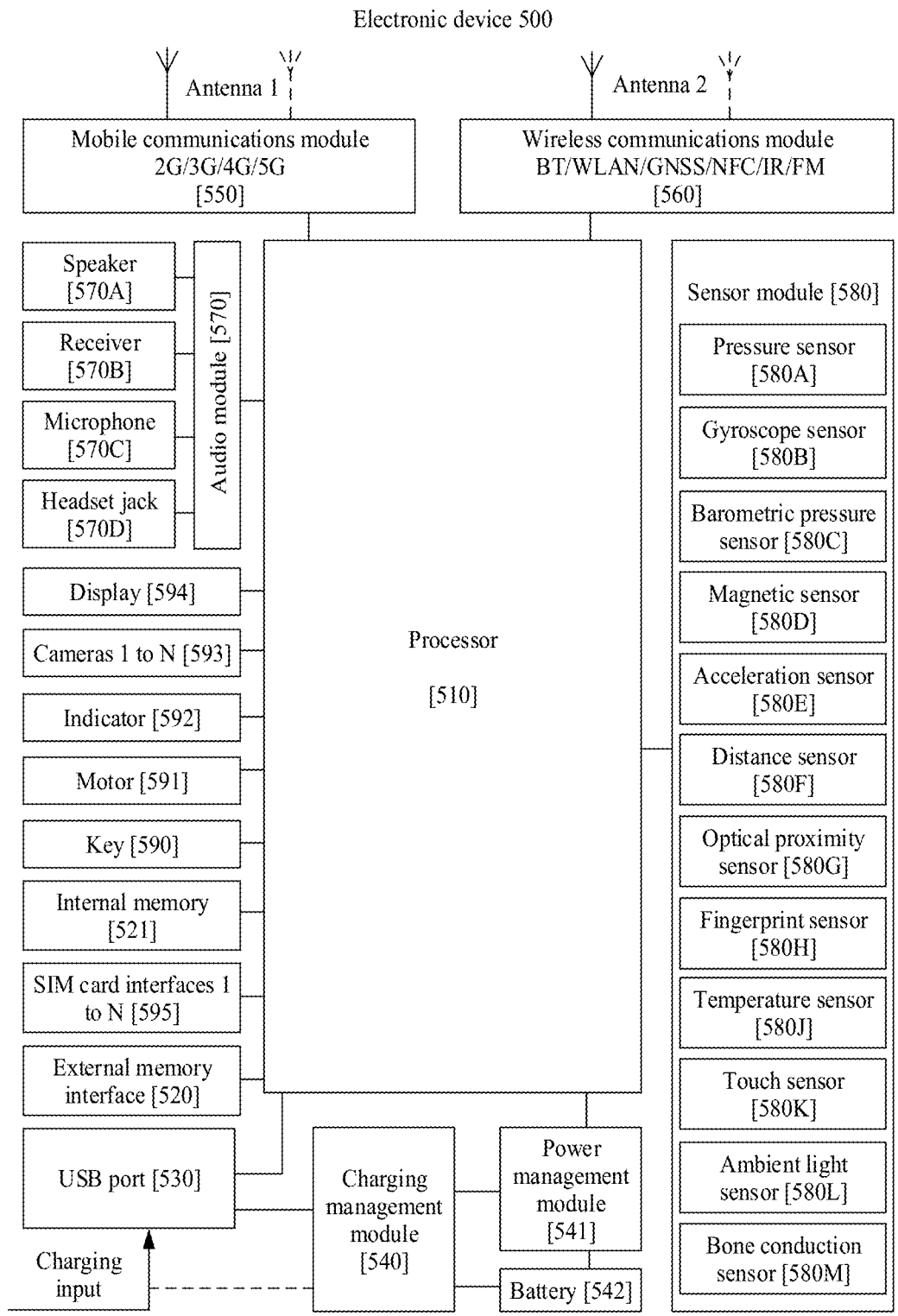
FIG. 5 is a diagram of a hardware structure of an electronic device according to an embodiment of this application.

FIG. 1 shows a diagram of a hardware structure of an electronic device 500 by using an example in which the electronic device is the mobile phone 410 shown in FIG. 4. As shown in FIG. 5, the electronic device 500 may include a processor 510, an external memory interface 520, an internal memory 521, a universal serial bus (USB) port 530, a charging management module 540, a power management module 541, a battery 542, an antenna 1, an antenna 2, a mobile communications module 550, a wireless communications module 560, an audio module 570, a speaker 570A, a receiver 570B, a microphone 570C, a headset jack 570D, a sensor module 580, a key 590, a motor 591, an indicator 592, a camera 593, a display 594, a subscriber identity module (SIM) card interface 595, and the like.

The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, a bone conduction sensor 580M, and the like.

It may be understood that the structure shown in this embodiment of the present invention does not constitute a specific limitation on the electronic device 500. In some other embodiments of this application, the electronic device 500 may include more or fewer components than those shown in the figure, combine some components, split some components, or have different component arrangements. The components shown in the figure may be implemented by using hardware, software, or a combination of software and hardware.

The processor 510 may include one or more processing units. For example, the processor 510 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center point and a command center point of the electronic device 500. The controller may generate an operation control signal based on instruction operation code and a time sequence signal, to complete control of instruction fetching and instruction execution.

A memory may be further disposed in the processor 510, and is configured to store instructions and data. In some embodiments, the memory in the processor 510 is a cache memory. The memory may store instructions or data just used or cyclically used by the processor 510. If the processor 510 needs to use the instructions or the data again, the processor 510 may directly invoke the instructions or the data from the memory. This avoids repeated access and reduces waiting time of the processor 510, thereby improving system efficiency.

In some embodiments, the processor 510 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). The I2S interface may be configured to perform audio communication. The PCM interface may also be configured to perform audio communication, to be specific, sample, quantize, and code an analog signal. The UART interface is a universal serial data bus, and is configured to perform asynchronous communication. The bus may be a two-way communications bus, and converts to-be-transmitted data between serial communication and parallel communication. The MIPI interface may be configured to connect the processor 510 to a peripheral component such as the display 594 or the camera 593. The MIPI interface includes a camera serial interface (CSI), a display serial interface (DSI), and the like. The GPIO interface may be configured by using software. The GPIO interface may be configured as a control signal or a data signal. The USB port 530 is a port that conforms to a USB standard specification, and may be specifically a mini USB port, a micro USB port, a USB Type-C port, or the like. The USB port 530 may be configured to connect to a charger to charge the electronic device 500, may be configured to transmit data between the electronic device 500 and a peripheral device, or may be configured to connect to a headset to play audio through the headset. Alternatively, the port may be configured to connect to another electronic device, for example, an AR device.

It may be understood that an interface connection relationship between the modules that is shown in this embodiment of the present invention is merely an example for description, and does not constitute a limitation on the structure of the electronic device 500. In some other embodiments of this application, the electronic device 500 may alternatively use an interface connection manner different from that in the foregoing embodiment, or a combination of a plurality of interface connection manners.

The charging management module 540 is configured to receive a charging input from the charger. The charger may be a wireless charger or a wired charger. The power management module 541 is configured to connect to the battery 542, the charging management module 540, and the processor 510. The power management module 541 receives an input of the battery 542 and/or the charging management module 540, and supplies power to the processor 510, the internal memory 521, an external memory, the display 594, the camera 593, the wireless communications module 560, and the like. The power management module 541 may be further configured to monitor parameters such as a battery capacity, a battery cycle count, and a battery health status (electric leakage or impedance).

A wireless communication function of the electronic device 500 may be implemented through the antenna 1, the antenna 2, the mobile communications module 550, the wireless communications module 560, the modem processor, the baseband processor, and the like.

The antenna 1 and the antenna 2 are configured to: transmit and receive electromagnetic wave signals. Each antenna in the electronic device 500 may be configured to cover one or more communication bands. Different antennas may be further reused, to improve antenna utilization. For example, the antenna 1 may be reused as a diversity antenna of a wireless local area network. In some other embodiments, the antenna may be used in combination with a tuning switch.

The mobile communications module 550 may provide a solution including 2G/3G/4G/5G wireless communication or the like and that is applied to the electronic device 500. The mobile communications module 550 may include at least one filter, a switch, a power amplifier, a low noise amplifier (LNA), and the like. The mobile communications module 550 may receive an electromagnetic wave through the antenna 1, perform processing such as filtering or amplification on the received electromagnetic wave, and transmit a processed electromagnetic wave to the modem processor for demodulation. The mobile communications module 550 may further amplify a signal modulated by the modem processor, and convert an amplified signal into an electromagnetic wave through the antenna 1 for radiation. In some embodiments, at least some function modules in the mobile communications module 550 may be disposed in the processor 510. In some embodiments, at least some function modules in the mobile communications module 550 and at least some modules in the processor 510 may be disposed in a same device. The modem processor may include a modulator and a demodulator.

The wireless communications module 560 may provide a solution for wireless communication applied to the electronic device 500, for example, a wireless local area network (WLAN) (for example, a wireless fidelity (Wi-Fi™) network), Bluetooth™ (BT), a GNSS, frequency modulation (FM), a near field communication (NFC) technology, or an infrared (IR) technology. The wireless communications module 560 may be one or more components integrated into at least one communications processing module. The wireless communications module 560 receives an electromagnetic wave through the antenna 2, performs frequency modulation and filtering processing on the electromagnetic wave signal, and sends a processed signal to the processor 510. The wireless communications module 560 may further receive a to-be-sent signal from the processor 510, perform frequency modulation and amplification on the signal, and convert a processed signal into an electromagnetic wave through the antenna 2 for radiation.

For example, the GNSS in this embodiment of this application may include a GPS, a GLONASS, a BDS, a QZSS, an SBAS, and/or a GALILEO.

The electronic device 500 implements a display function through the GPU, the display 594, the application processor, and the like. The GPU is a microprocessor for image processing, and is connected to the display 594 and the application processor. The GPU is configured to perform mathematical and geometric calculation, and render an image. The processor 510 may include one or more GPUs that execute program instructions to generate or change display information. The display 594 is configured to display an image, a video, or the like. The display 594 includes a display panel.

The electronic device 500 may implement a shooting function through the ISP, the camera 593, the video codec, the GPU, the display 594, the application processor, and the like. The ISP is configured to process data fed back by the camera 593. The camera 593 is configured to capture a static image or a video. An optical image of an object is generated through lens, and is projected onto a photosensitive element. The digital signal processor is configured to process a digital signal, and may process another digital signal in addition to the digital image signal. The video codec is configured to compress or decompress a digital video.

The NPU is a neural-network (NN) computing processor, quickly processes input information by referring to a structure of a biological neural network, for example, by referring to a transfer mode between human brain neurons, and may further continuously perform self-learning. The NPU can implement applications such as intelligent cognition of the electronic device 500, such as image recognition, facial recognition, speech recognition, and text understanding.

The external memory interface 520 may be configured to connect to an external storage card, for example, a micro SD card, to extend a storage capability of the electronic device 500. The external storage card communicates with the processor 510 through the external memory interface 520, to implement a data storage function. For example, files such as music and a video are stored in the external storage card.

The internal memory 521 may be configured to store computer-executable program code. The executable program code includes instructions. The processor 510 runs the instructions stored in the internal memory 521, to perform various function applications of the electronic device 500 and data processing.

The electronic device 500 may implement audio functions, for example, music playing and recording, by using the audio module 570, the speaker 570A, the receiver 570B, the microphone 570C, the headset jack 570D, the application processor, and the like.

The audio module 570 is configured to convert digital audio information into an analog audio signal output, and is also configured to convert an analog audio input into a digital audio signal. The speaker 570A, also referred to as a "horn", is configured to convert an audio electrical signal into a sound signal. The receiver 570B, also referred to as an "earpiece", is configured to convert an audio electrical signal into a sound signal. The microphone 570C, also referred to as a "mike" or a "microphone", is configured to convert a sound signal into an electrical signal. The headset jack 570D is configured to connect to a wired headset. The headset jack 570D may be the USB port 530, or may be a 3.5 mm open mobile terminal platform (OMTP) standard interface or a cellular telecommunications industry association of the USA (CTIA) standard interface.

The key 590 includes a power key, a volume key, and the like. The key 590 may be a mechanical key, or may be a touch-sensitive key. The electronic device 500 may receive a key input, and generate a key signal input related to a user setting and function control of the electronic device 500. The motor 591 may generate a vibration prompt. The motor 591 may be configured to provide an incoming call vibration prompt or a touch vibration feedback. The indicator 592 may be an indicator light, and may be configured to indicate a charging status and a power change, or may be configured to indicate a message, a missed call, a notification, and the like. The SIM card interface 595 is configured to connect to a SIM card. The SIM card may be inserted into the SIM card interface 595 or removed from the SIM card interface 595, to implement contact with or separation from the electronic device 500. The electronic device 500 may support one or N SIM card interfaces, where N is a positive integer greater than 1. The SIM card interface 595 may support a nano-SIM card, a micro-SIM card, a SIM card, and the like.

Terms related to the embodiments of this application are described as follows:

1. Pseudorange.

A pseudorange is a distance between an electronic device and a satellite that is obtained through measurement performed based on a broadcast signal from the satellite after the electronic device performs GNSS positioning. For example, as shown in FIG. 1, a pseudorange between a satellite 1 and a mobile phone is d1, and a pseudorange between a satellite 2 and the mobile phone is d2.

2. Carrier-to-Noise Ratio (CN0).

A carrier-to-noise ratio is also referred to as a signal-to-noise ratio, and is commonly used in a satellite communications system. The carrier-to-noise ratio is a signal-to-noise ratio of a broadcast signal transmitted by a satellite. A larger CN0 of the broadcast signal indicates higher signal quality of the broadcast signal. A smaller CN0 of the broadcast signal indicates lower signal quality of the broadcast signal.

It may be understood that if the broadcast signal transmitted by the satellite is received by the electronic device after reflection (for example, reflection for one or more times), the broadcast signal is attenuated, signal quality of the broadcast signal is relatively low, and the CN0 of the broadcast signal is relatively small. Therefore, the CN0 of the broadcast signal may be further used to reflect whether the broadcast signal is reflected and a quantity of times the broadcast signal is reflected. For example, a larger CN0 of a broadcast signal may indicate a smaller quantity of times the broadcast signal is reflected, and a smaller CN0 of a broadcast signal may indicate a larger quantity of times the broadcast signal is reflected.

3. Pseudorange Rate.

A pseudorange rate is a rate of change of a pseudorange between a satellite and an electronic device. The pseudorange rate may be used to determine the rate of change of the pseudorange between the electronic device and the satellite.

4. Pseudorange Residual.

A pseudorange residual is a difference between an accurate distance (namely, a real distance) and a pseudorange between an electronic device and a satellite. The electronic device may determine the accurate distance (namely, a real distance) between the electronic device and the satellite based on a real location of the electronic device and a real location of the satellite.

5. Elevation of a Satellite.

Figure 6A:
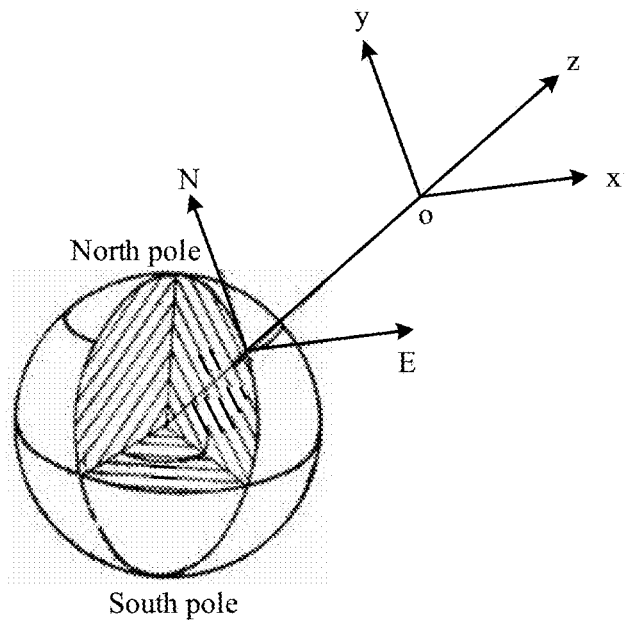
FIG. 6A and FIG. 6B are a diagram of an example of an azimuth and an elevation of a satellite relative to a location at which an electronic device is located according to an embodiment of this application.

An elevation of a satellite (namely, the elevation of the satellite relative to a location of an electronic device) is an included angle between a local horizontal plane and a line connecting a point at which the satellite is located and an origin of a geographic coordinate system, where a point (namely, a location) at which the electronic device is used as the origin of the geographic coordinate system. As shown in FIG. 6(a), an x axis of the foregoing geographic coordinate system points east (E) along a local latitude line, a y axis points north (N) along a local meridian line, and a z axis points upward along a local geographic vertical line. The x axis, y axis, and the z-axis form a right-hand rectangular coordinate system. A plane formed by the x axis and the y axis is the local horizontal plane, and a plane formed by the y axis and the z axis is a local meridian plane. The elevation of the satellite is an angle between the line connecting the point at which the satellite is located and the origin of the geographic coordinate system and the plane formed by the x axis and y axis.

Figure 6B:
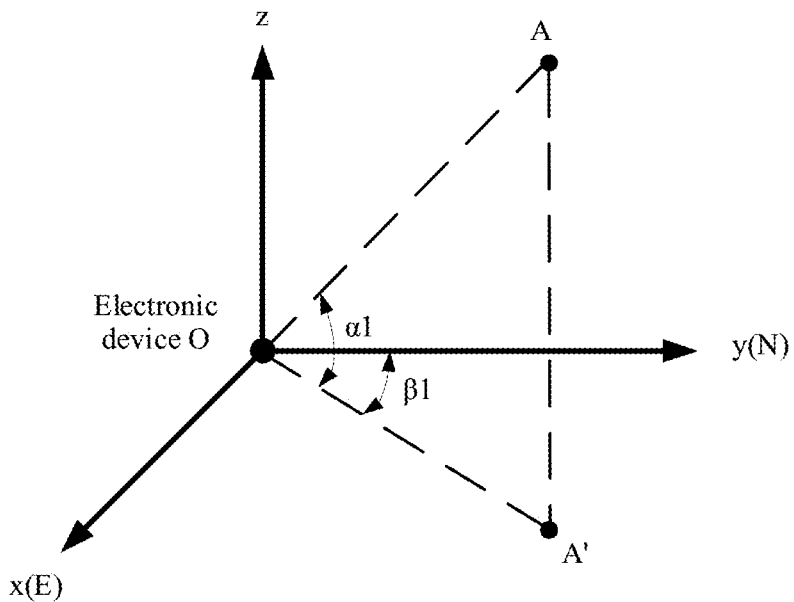

For example, as shown in FIG. 6B, a point O at which an electronic device is located is used as an origin of the geographic coordinate system, the x axis points east (E) along a local latitude line, the y axis points north (N) along a local meridian line, and the z axis points upward along a local geographic vertical line. As shown in FIG. 6B, the elevation of the satellite is an included angle α1 between a line OA connecting a point A and the point O and a plane (namely, a horizontal plane) formed by the x axis and the y axis.

6. Azimuth of a Satellite.

An azimuth of a satellite (namely, the azimuth of the satellite relative to a location of an electronic device) is an included angle between and a y axis (namely, a due north (N) direction) and a line connecting an origin of a geographic coordinate system and a projection point of a point at which the satellite is located on a horizontal plane, where a point (namely, a location) at which the electronic device is used as the origin of the geographic coordinate system.

For example, as shown in FIG. 6B, the azimuth of the satellite is an included angle β1 between they axis and a line OA' connecting a projection point A' of the point A on the horizontal plane and the point O.

It should be noted that, in this embodiment of this application, an elevation (for example, the foregoing α1) of the satellite is represented by a polar diameter $\rho_{wx}$ of a projection point of the satellite on a plane on which a first polar coordinate system is located; and a polar angle $\theta_{wx}$ of the projection point of the satellite on the plane on which the first polar coordinate system is used as the azimuth (for example, the foregoing β1) of the satellite. The first polar coordinate system is a polar coordinate system using a point (namely, a location) at which an electronic device is located as a pole (a point O shown in FIG. 7), a ray (Oy shown in FIG. 7) in a due north (N) direction pointing from the pole to a local meridian line as a polar axis, and a clockwise direction as a positive direction.

Figure 7:
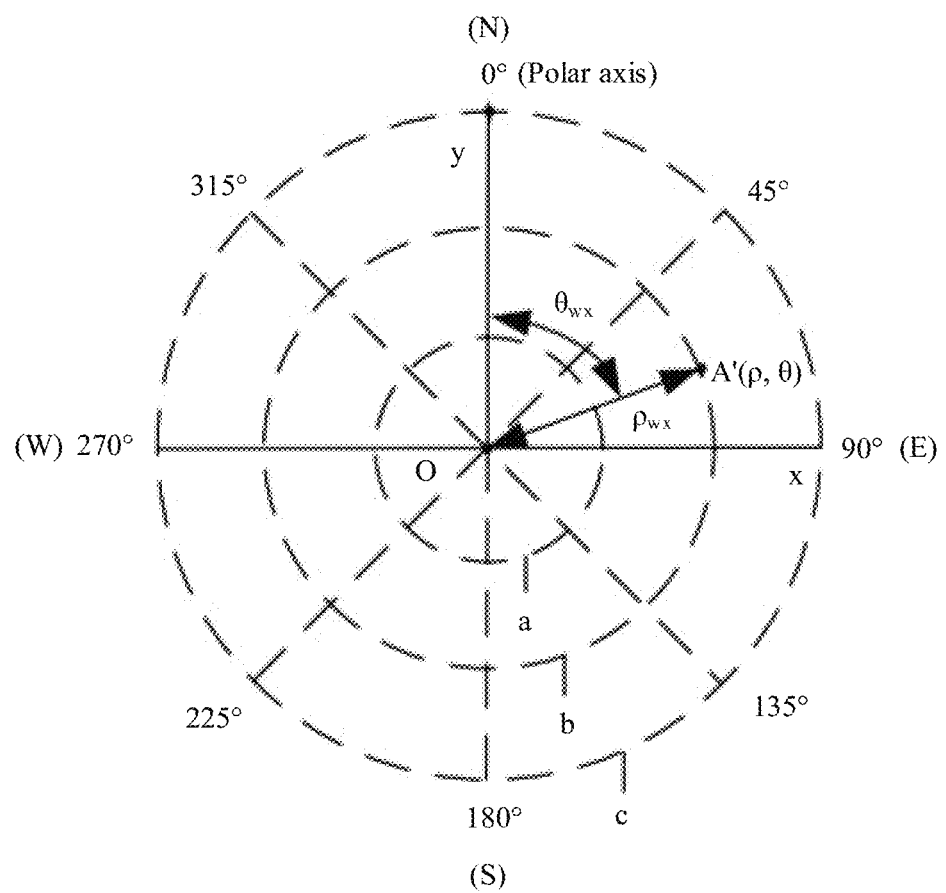
FIG. 7 is a diagram of an example of representing an azimuth and an elevation in a polar coordinate system according to an embodiment of this application.

As shown in FIG. 7, a polar angle $\theta_{wx}$ of a projection point A' of the satellite on a plane on which the first polar coordinate system is located is an included angle between the polar axis Oy and the line OA' connecting the pole O and the projection point A' of the point at which the satellite is located on the plane on which the first polar coordinate system is located. The plane on which the first polar coordinate system is located is the local horizontal plane (namely, an xoy plane shown in FIG. 7). As shown in FIG. 7, an azimuth of the satellite whose projection point is the point A' is $\theta_{wx}$.

For example, as shown in FIG. 7, if the azimuth of the satellite is 0°, it indicates that the satellite is in a due north (N) direction of the electronic device. If the azimuth of the satellite is 45°, it indicates that the satellite is in a northeast direction of the electronic device. If the azimuth of the satellite is 90°, it indicates that the satellite is in a due east (E) direction of the electronic device. If the azimuth of the satellite is 135°, it indicates that the satellite is in a southeast direction of the electronic device. If the azimuth of the satellite is 180°, it indicates that the satellite is in a due south (S) direction of the electronic device. If the azimuth of the satellite is 225°, it indicates that the satellite is in a southwest direction of the electronic device. If the azimuth of the satellite is 270°, it indicates that the satellite is in a due west (W) direction of the electronic device. If the azimuth of the satellite is 315°, it indicates that the satellite is in a northwest direction of the electronic device.

As shown in FIG. 7, the polar diameter $\rho_{wx}$ of the projection point A' of the satellite on the plane on which the first polar coordinate system is located is a distance between the pole O and the projection point A' of the point at which the satellite is located on the plane on which the first polar coordinate system is located, that is, a length of the connection line OA'. As shown in FIG. 7, an elevation of the satellite whose projection point is the point A' may be represented by the length of ρ. Specifically, a larger pole diameter of the projection point of the satellite on the plane on which the first polar coordinate system is located indicates a smaller elevation of the satellite. A smaller pole diameter of the projection point of the satellite on the plane on which the first polar coordinate system is located indicates a larger elevation of the satellite.

For example, circle centers of a circle a, a circle b, and a circle c shown by dashed lines in FIG. 7 are all the point O. A radius of the circle a is r, a radius of the circle b is 2r, and a radius of the circle c is 3r. As shown in FIG. 7, when the projection point of the satellite on the plane on which the first polar coordinate system is located is located on the circle c, a pole diameter of the projection point is the largest (the pole diameter is 3r), and the elevation of the satellite is the smallest (the elevation is zero). When the projection point of the satellite on the plane on which the first polar coordinate system is located is located on the circle b, the polar diameter of the projection point is 2r, and the elevation of the satellite is 30°. When the projection point of the satellite on the plane on which the first polar coordinate system is located is located on the circle a, the polar diameter of the projection point is r, and the elevation of the satellite is 60°. When the projection point of the satellite on the plane of the first polar coordinate system is located on the pole O, the pole diameter of the projection point is zero, and the elevation of the satellite is 90°.

In conclusion, polar coordinates of the projection point of the satellite on the plane on which the first polar coordinate system is located are $(\rho_{wx}, \theta_{wx})$, and the first polar coordinate system uses the point at which the electronic device is located as a pole. $\rho_{wx}$ is a polar diameter of the projection point of the satellite on the plane on which the first polar coordinate system is located, and $\theta_{wx}$ is a polar angle of the projection point of the satellite on the plane on which the first polar coordinate system is located. In this embodiment of this application, that the polar diameter $\rho_{wx}$ of the projection point of the satellite on the plane on which the first polar coordinate system is located represents the elevation of the satellite, and the polar angle $\theta_{wx}$ of the projection point of the satellite on the plane on which the first polar coordinate system is located is used as the azimuth of the satellite is used as an example.

For ease of understanding, the following describes a positioning method provided in the embodiments of this application in detail with reference to the accompanying drawings. The method in the following embodiments may be implemented in the positioning system shown in FIG. 4. The positioning system shown in FIG. 4 includes the server 400, the mobile phone 410, and the wearable device 420.

Case (1): That both the first electronic device and the second electronic device are the mobile phones 410 shown in FIG. 4 is used as an example. In Case (1), the mobile phone 410 performs the positioning method (for example, the following "positioning" procedure) provided in the embodiments of this application, to position the mobile phone 410, to improve positioning accuracy of the mobile phone 410.

Case (2): The first electronic device may be the server 400 or the mobile phone 410 shown in FIG. 4, and the second electronic device may be the wearable device 420 shown in FIG. 4. In Case (2), the server 400 or the mobile phone 410 shown in FIG. 4 may perform the positioning method (for example, the following "positioning" procedure) provided in the embodiments of this application, to assist the wearable device 420 in positioning, and improve positioning accuracy of the wearable device 420.

Figure 8A:
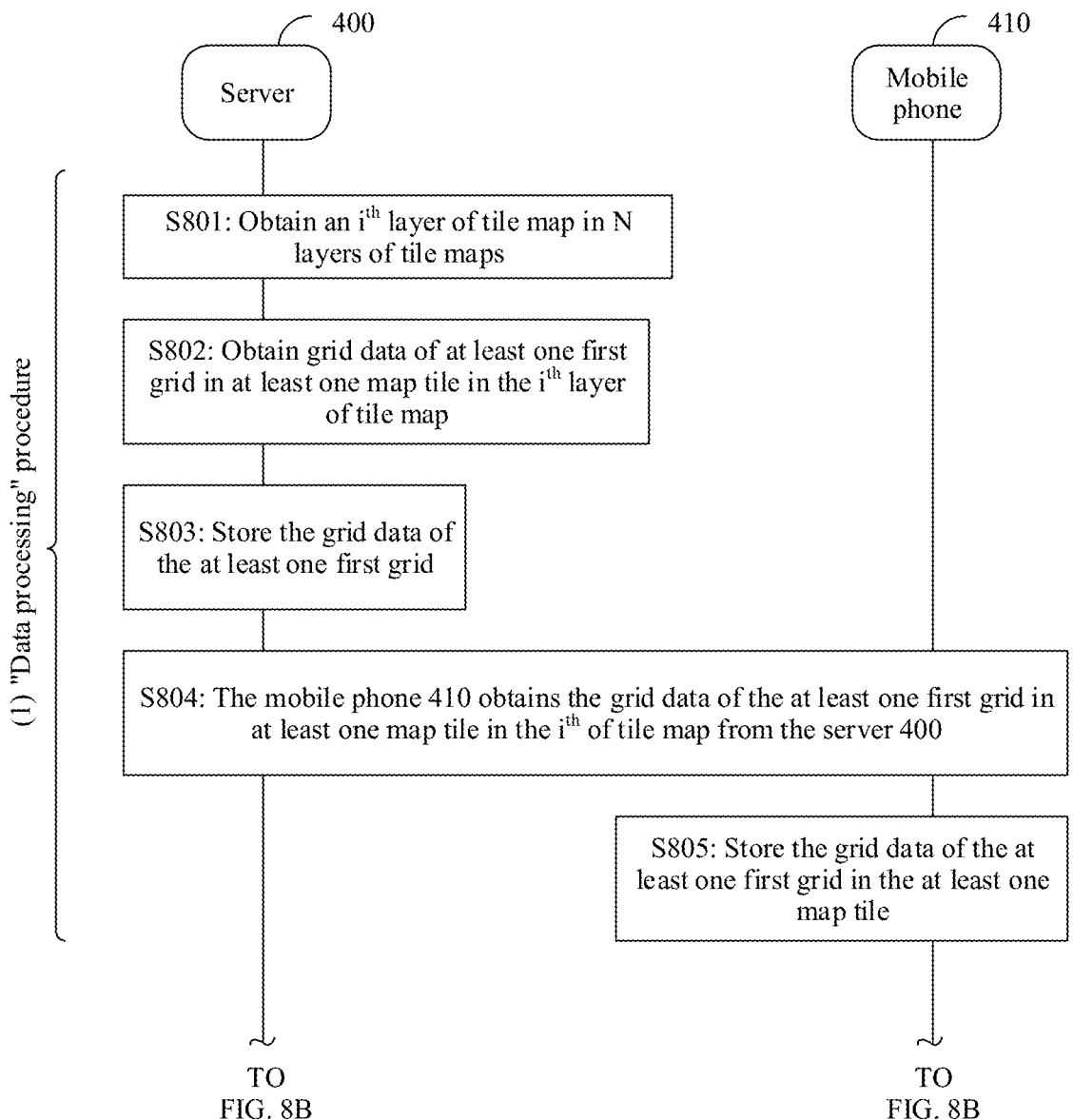
FIG. 8A and FIG. 8B are a flowchart of a positioning method according to an embodiment of this application.
Figure 8B:
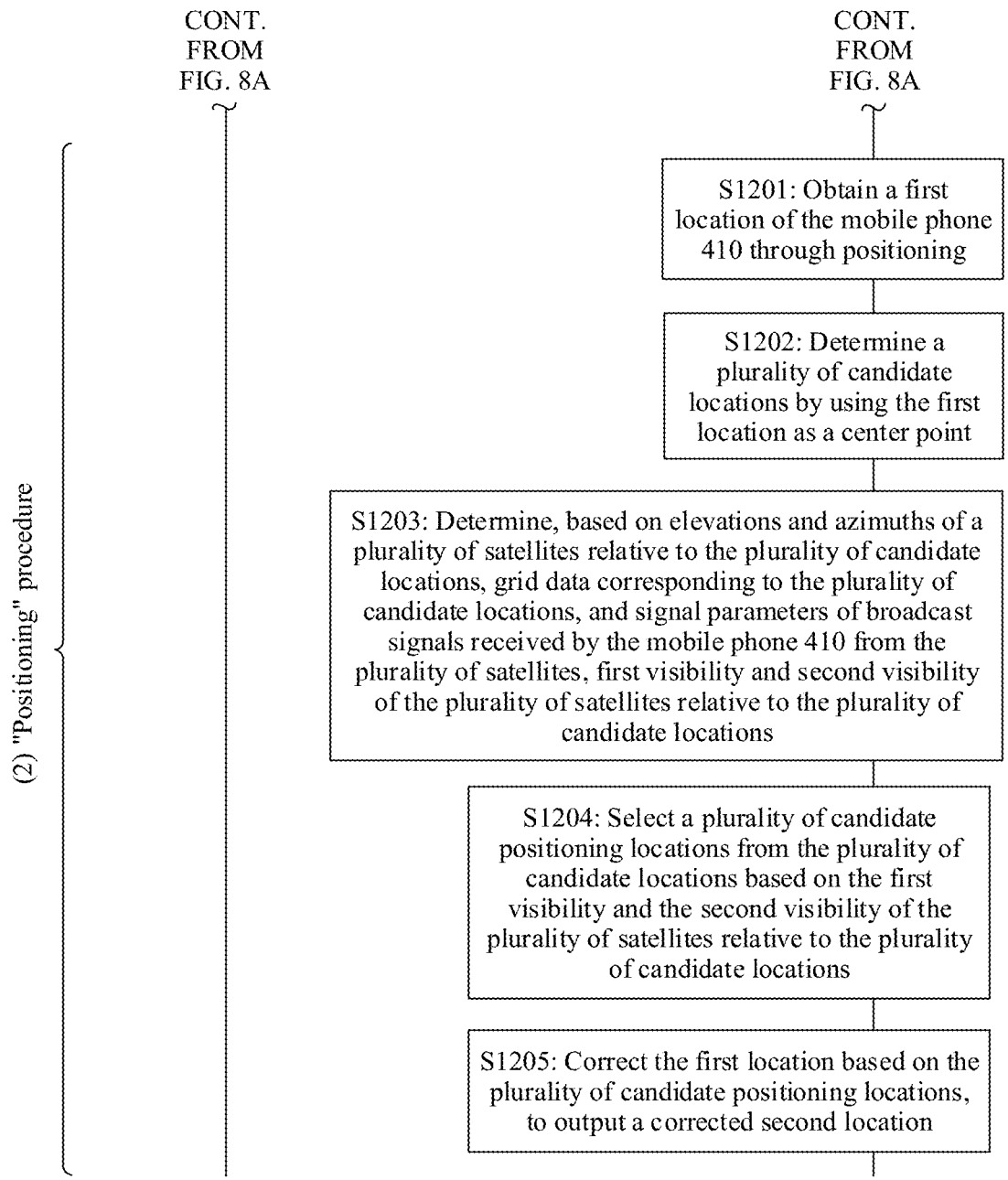

For example, as shown in FIG. 8A and FIG. 8B, the method in the embodiments of this application may include: (1) a "data processing" procedure; and (2) a "positioning" procedure.

(1) "Data processing" Procedure.

Figure 21A:
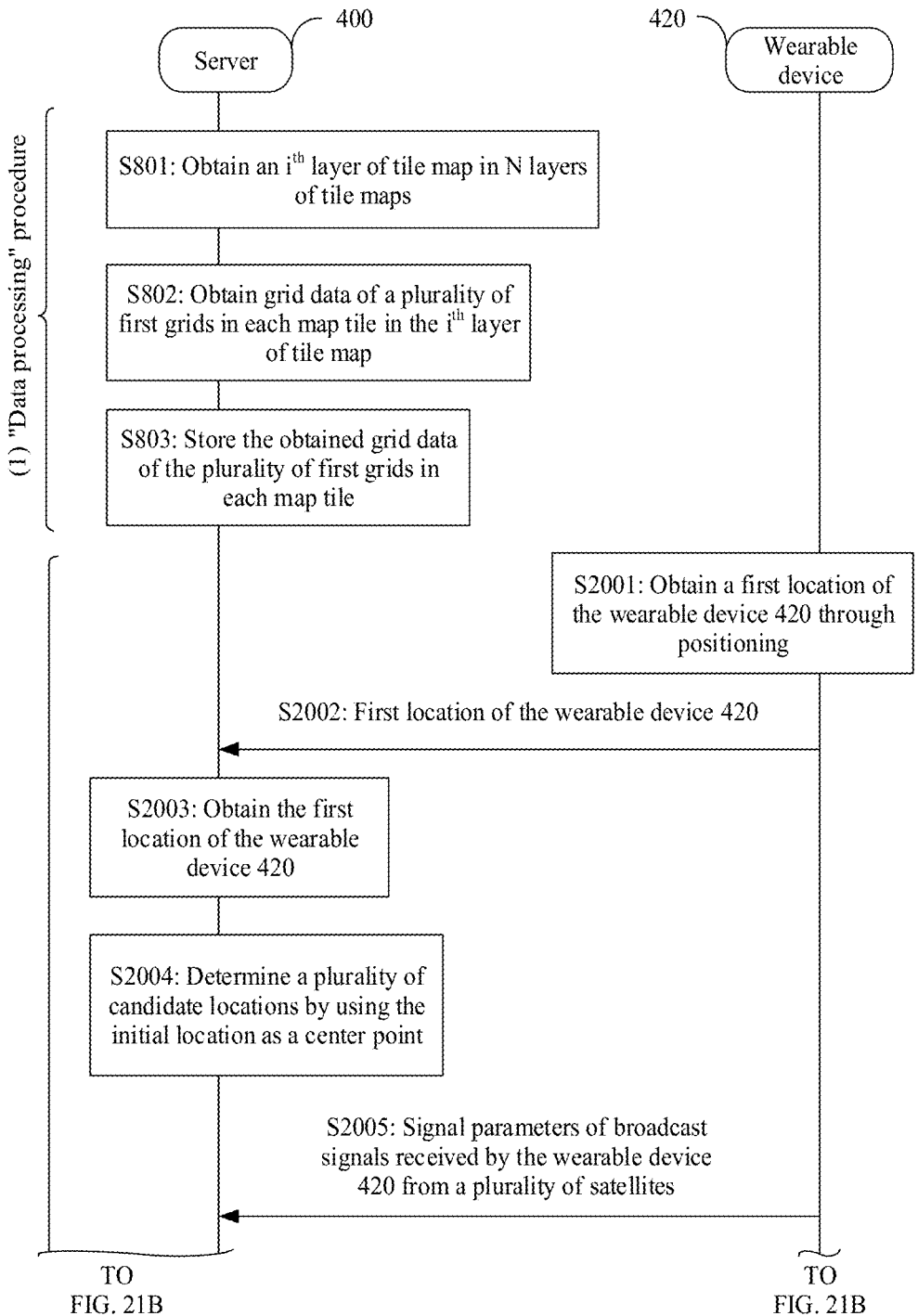
FIG. 21A and FIG. 21B are a flowchart of another positioning method according to an embodiment of this application.

The "data processing" procedure is used to generate a plurality of pieces of tile data. Specifically, in either Case (1) or Case (2), as shown in FIG. 8A or FIG. 21A, the "data processing" procedure may include S801 to S803.

S801: The server 400 obtains an $i^{th}$ layer of tile map in N layers of tile maps.

Figure 9A:
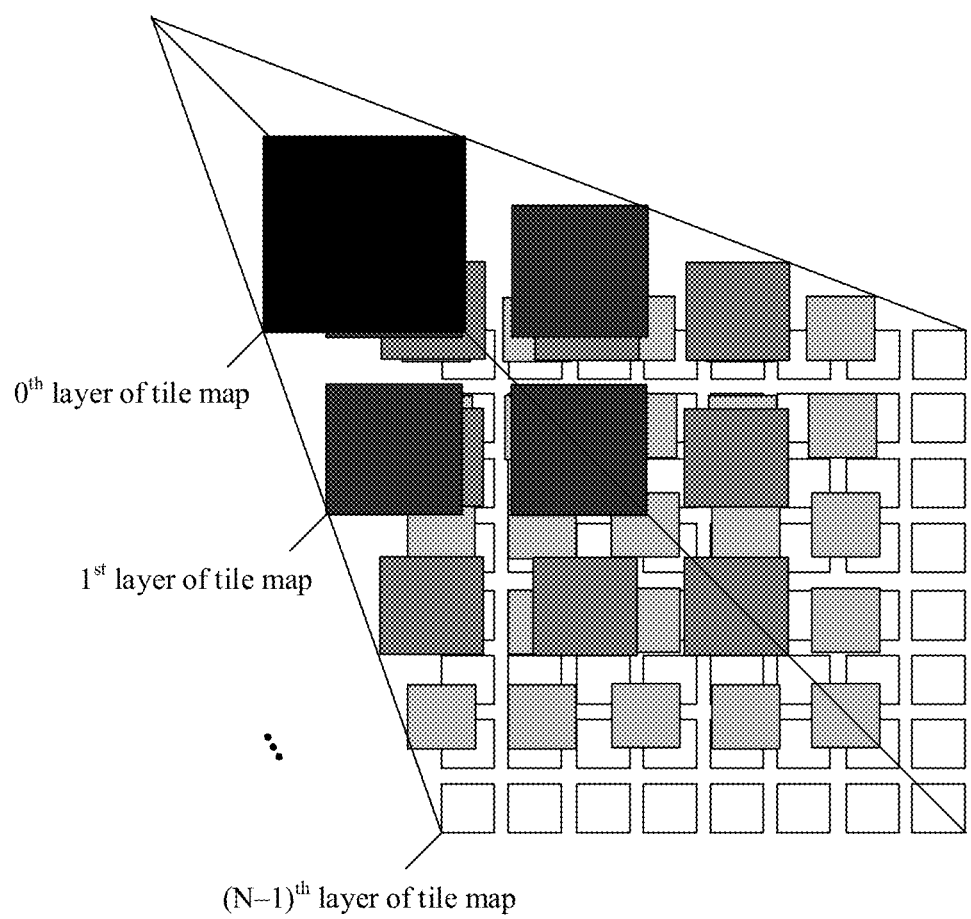
FIG. 9A is a diagram of an example of a multi-layer tile map according to an embodiment of this application.

The N layers of tile (Tile) maps are a tile pyramid model (a tile pyramid model shown in FIG. 9A). The tile pyramid model is a multi-resolution hierarchical model. As shown in FIG. 9A, a top layer of the tile pyramid model is a $0^{th}$ layer of tile map, and a bottom layer is an $(N-1)^{th}$ layer of tile map. From the top layer to the bottom layer in the tile pyramid model, resolution of the tile map becomes higher, but a geographic area represented by each tile map remains unchanged. N≥2, and N is a positive integer.

Specifically, the method for obtaining the N layers of tile maps by the server 400 may include: first, determining a zoom level N of the tile map; obtaining a $0^{th}$ layer of map image (the $0^{th}$ layer of map image has a highest zoom level and a largest map scale), and segmenting the $0^{th}$ layer of map image from left to right and from top to bottom into map tiles of a same size to form a $0^{th}$ layer of map tile (which is also referred to as a $0^{th}$ layer of map tile matrix); generating a $1^{st}$ layer of map image based on the $0^{th}$ layer of map image by using a method of synthesizing every 2*2 pixels into one pixel, and segmenting the $1^{st}$ layer of map image into map tiles of a same size to form a $1^{st}$ layer of map tile (which is also referred to as a $1^{st}$ layer of map tile matrix); . . . and generating an $(N-1)^{th}$ layer of map image based on an $(N-2)^{th}$ layer of map image by using a method of synthesizing every 2*2 pixels into one pixel, and segmenting the $(N-1)^{th}$ layer of map image into map tiles of a same size to form an $(N-1)^{th}$ layer of map tile (which is also referred to as an $(N-1)^{th}$ layer of map tile matrix). In this way, the server 400 may obtain the N layers of tile maps.

Figure 9B:
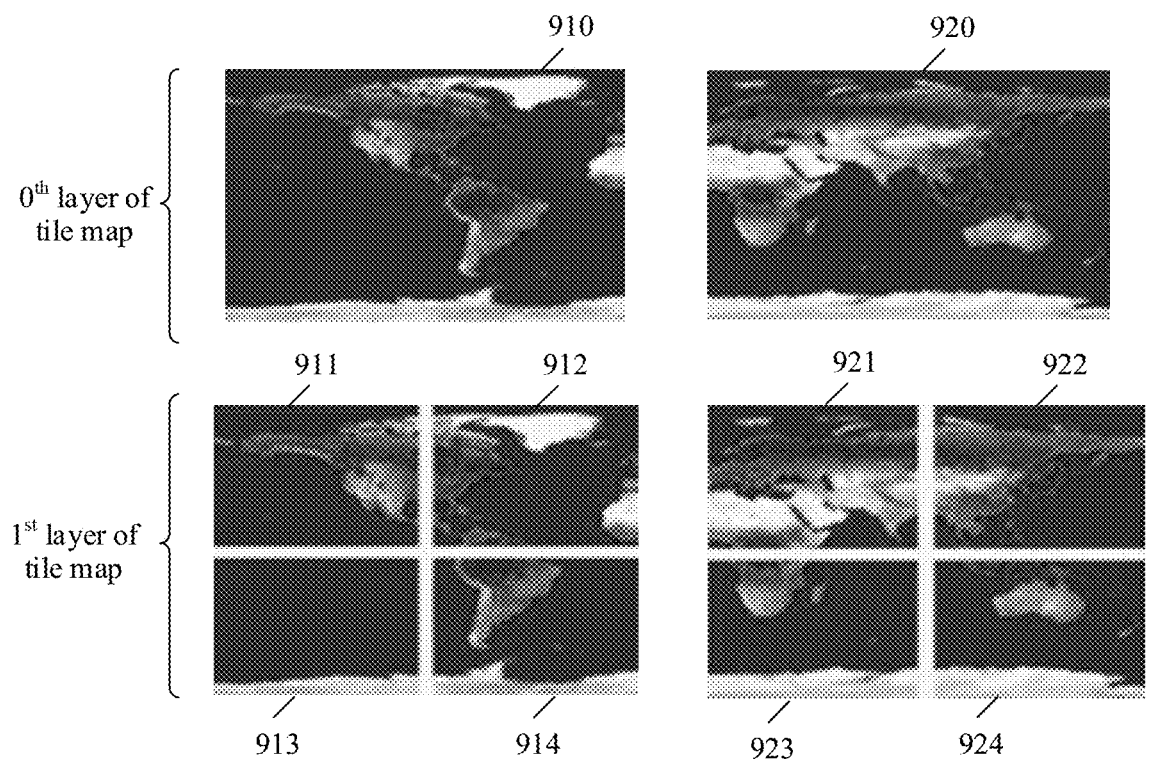
FIG. 9B is a diagram of a principle of generating a tile map according to an embodiment of this application.

It should be noted that a map image (for example, the $0^{th}$ layer of map image) in this embodiment of this application is a vector map, and is a map drawn based on vector data. Each layer of tile map in the N layers of tile maps is a map obtained through splicing at least one map tile. For example, as shown in FIG. 9B, in this embodiment of this application, the $0^{th}$ layer of tile map may include a map tile 910 of the eastern hemisphere and a map tile 920 of the western hemisphere. The $1^{st}$ layer of tile map may include a map tile 911, a map tile 912, a map tile 913, a map tile 914, a map tile 921, a map tile 922, a map tile 923, and a map tile 924.

It may be understood that a higher layer of tile map indicates a larger quantity of map tiles that form a world map, and a more detailed map displayed by the layer of tile map. Therefore, a larger N indicates a more detailed map displayed by an $N^{th}$ layer of tile map.

For example, i=15. In a segmentation manner shown in FIG. 9B, a size of each map tile in a $15^{th}$ layer of tile map of the world map obtained by the server 400 is p*p. A unit of p is meter (m). A value of p is about 600 m. For example, p=611 m, that is, a size of each map tile is 611 m*611 m. For another example, p=600 m, that is, a size of each map tile is 600 m*600 m.

S802: The server 400 obtains grid data of at least one first grid in at least one map tile in an $i^{th}$ layer of tile map.

S802 may specifically include S802a and S802b. S802a: The server 400 segments each of the at least one map tile in the $i^{th}$ layer of tile map into K first grids, where K≥2, and K is a positive integer. S802b: The server 400 obtains grid data of at least one first grid in the K first grids.

It may be understood that one server may be disposed for each of different geographic areas. A server for a geographic area is configured to generate and store a plurality of pieces of tile data for the geographic area. The foregoing geographic areas may be obtained through division in different dimensions. For example, the earth may be divided into two geographic areas along the equator, for example, the southern hemisphere and the northern hemisphere. For another example, the earth may be divided into two geographic areas along the 20° W longitude line and the 160° E longitude line, for example, the eastern hemisphere and the western hemisphere. For another example, the earth may be divided into a plurality of geographic areas with equal areas based on fixed longitude and latitude spacings. For another example, the earth may be divided into a plurality of geographic areas based on administrative regions (for example, a country or a province of a country), and each administrative region corresponds to one geographic area. Certainly, the geographic area division manner includes but is not limited to the foregoing division manner. For another division manner, refer to the geographic area division manner in the conventional technology. Details are not described in this embodiment of this application.

The $i^{th}$ layer of tile map may include a plurality of map tiles. The at least one map tile may include: a map tile, in the plurality of map tiles in the $i^{th}$ layer of tile map, of a geographic area in which the server 400 is located. The geographic area in which the server 400 is located may correspond to one or more map tiles. For example, the at least one map tile may include: a map tile, in the plurality of map tiles in the $i^{th}$ layer of tile map, of a province in which the server 400 is located.

It may be understood that only when an electronic device performs positioning in an urban area with densely distributed buildings, inaccurate positioning may occur because a broadcast signal transmitted by a satellite cannot be received by the electronic device through straight-line transmission. However, when the electronic device performs positioning in a relatively open area such as a sea surface, a grassland, or a flat ground, a possibility that a broadcast signal transmitted by a satellite is blocked is relatively low, and positioning accuracy is not affected. It can be learned that, for the foregoing relatively open area, the server 400 does not need to obtain and store corresponding grid data. In this way, occupation of storage space of the server 400 by the grid data can be reduced.

In some embodiments, the at least one first grid may be a first grid of a geographic area with densely distributed obstructions in the K first grids. In other words, the server 400 may obtain and store only the first grid of the geographic area with densely distributed obstructions. In this way, a calculation amount of obtaining the grid data of the first grid by the server 400 can be reduced, and occupation of storage space of the server 400 by the grid data can be further reduced.

Figure 10:
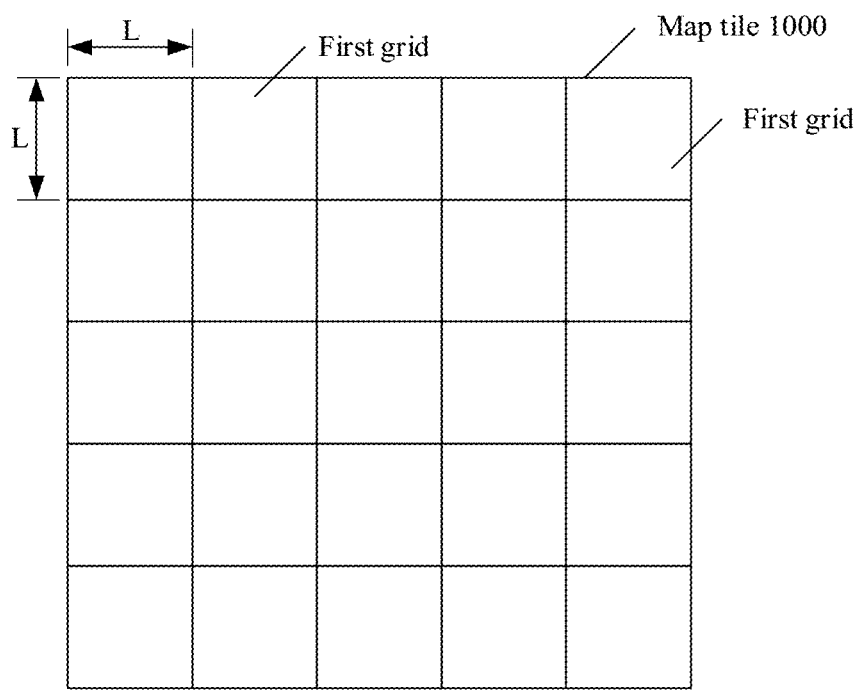
FIG. 10 is a diagram of a principle of dividing a map tile into a plurality of first grids according to an embodiment of this application.

For example, the first grid may be a square whose side length is L. As shown in FIG. 10, a map tile 1000 may be one map tile in the $i^{th}$ layer of tile map. The server 400 may evenly segment the map tile 1000 shown in FIG. 10 into 25 (that is, K=25) first grids, and each first grid is a square whose side length is L.

It may be understood that a larger K indicates a smaller L. A larger quantity of first grids obtained by dividing the map tile by the server 400 indicates a larger data amount of grid data obtained by the server 400. In this embodiment of this application, values of K and L may depend on positioning accuracy of the electronic device (the mobile phone 410 or the wearable device 420 shown in FIG. 4). Higher positioning accuracy of the electronic device indicates greater K and smaller L. A lower positioning accuracy of the electronic device indicates a smaller K and a larger L.

With reference to the foregoing example in which the size of the map tile in the $i^{th}$ layer of tile map is 600 m*600 m, L=3 m is used as an example herein. The server 400 may divide the map tile into 40000 (that is, K=40000) first grids, and each first grid is a square whose side length is 3 m.

In this embodiment of this application, the grid data of the first grid may further include (I) location information of the first grid; and (II) a sky blocking curve of the first grid.

(I) Location Information of the First Grid.

The location information of the first grid may be latitude and longitude coordinates of a first point of the first grid. The first point of a first grid may be a center point, a point in an upper left corner, a point in an upper right corner, a point in a lower left corner, a point in a lower right corner of the first grid, or any point on the first grid. This is not limited in this embodiment of this application.

(II) Sky Blocking Curve of the First Grid

The sky blocking curve of the first grid includes an elevation and an azimuth of a contour of an obstruction around the first point, that is, elevations and azimuths, relative to the first point, of a plurality of points on the contour of the obstruction around the first point of the first grid. The obstruction around the first point may be various buildings, plants, or the like.

It should be noted that, for ease of description, in this embodiment of this application, a plurality of points on a contour of an obstruction (for example, a building) are referred to as a plurality of points of the obstruction, and a point on a contour of an obstruction (for example, a building) is referred to as a point of the obstruction.

An elevation of a point of an obstruction around the first point (which is referred to as a third point for short) is an included angle between a local horizontal plane and a line connecting the third point and an origin of a geographic coordinate system, where the first point is used as the origin of the geographic coordinate system. For detailed descriptions of the geographic coordinate system, refer to related content in the foregoing embodiments. Details are not described in this embodiment of this application again.

Figure 11A:
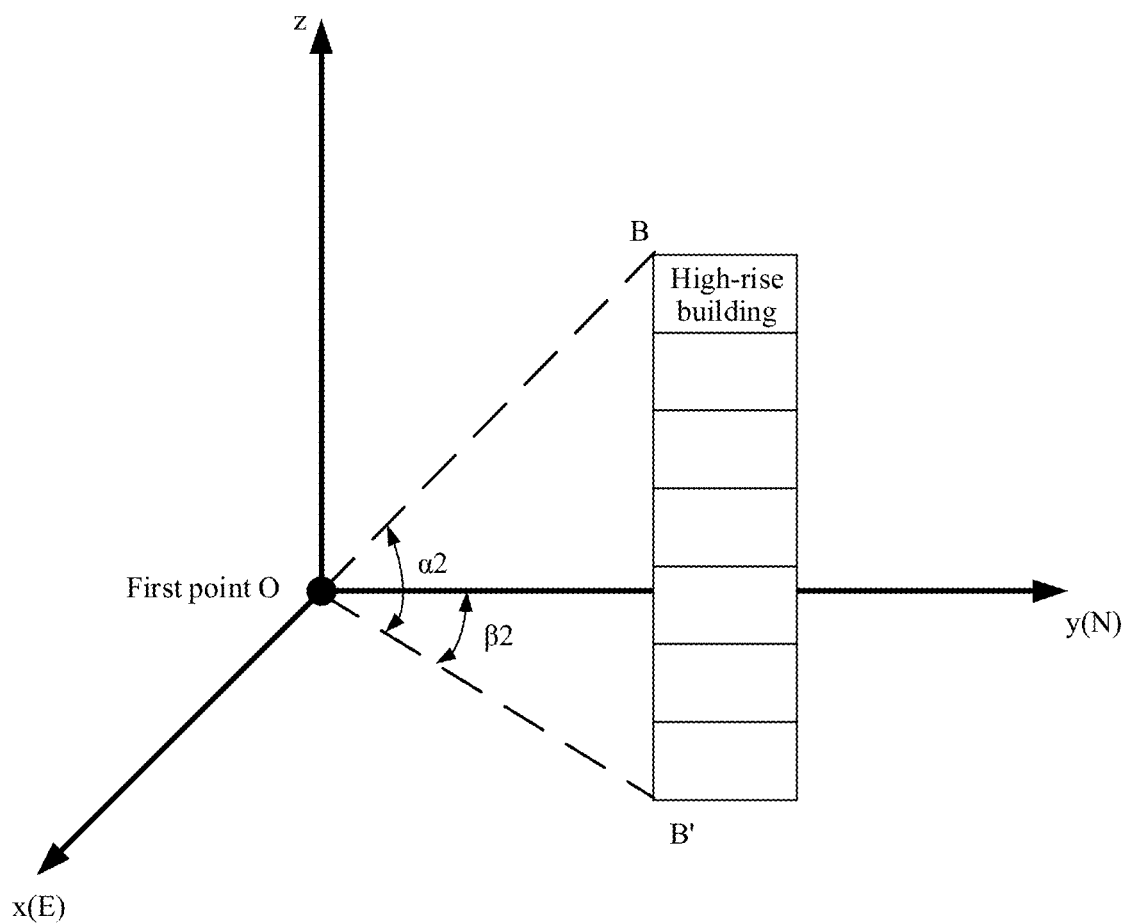
FIG. 11A is a diagram of an example of an azimuth and an elevation of a building (for example, a high-rise building) relative to a first grid according to an embodiment of this application.

For example, as shown in FIG. 11A, a first point O is used as the origin of the geographic coordinate system, an x axis points east (E) along a local latitude line, a y axis points north (N) along a local meridian line, and a z axis points upward along a local geographic vertical line. As shown in FIG. 11A, an elevation of a third point B of an obstruction (for example, a high-rise building) is an included angle α2 between a line OB and a plane (namely, a horizontal plane) formed by the x axis and the y axis, where the line OB connects the third point B of the high-rise building and the point O.

An azimuth of a point of an obstruction around the first point (which is referred to as the third point for short) is an included angle between the y axis (namely, a due north (N) direction) and a line connecting a vertical projection point of the third point on the horizontal plane and the origin of the geographic coordinate system, where the first point is used as the origin of the geographic coordinate system. For example, as shown in FIG. 11A, an azimuth of the third point B of an obstruction (for example, a high-rise building) is an included angle β2 between the y axis and a line OB' connecting the point O and a vertical projection point B' of the third point B on a horizontal plane.

It should be noted that, in this embodiment of this application, the elevation (for example, α2) of the obstruction is represented by a polar diameter $\rho_{zd}$ of a vertical projection point of the third point of the obstruction on a plane on which a second polar coordinate system is located; and a polar angle $\theta_{zd}$ of the vertical projection point of the third point of the obstruction on the plane on which the second polar coordinate system is located is used as the azimuth (for example, the foregoing β2) of the obstruction. The second polar coordinate system is a polar coordinate system using the first point as a pole, a ray in a due north (N) direction pointing from the pole to a local meridian line as a polar axis, and a clockwise direction is used as a positive direction.

For a specific method and principle of that the elevation of the obstruction is represented by the polar diameter of the vertical projection point of the third point of the obstruction on the plane on which the second polar coordinate system is located; and the polar angle of the vertical projection point of the third point of the obstruction on the plane on which the second polar coordinate system is located is used as the azimuth of the obstruction, refer to the foregoing embodiment in which a specific method and a principle of that a polar angle $\theta_{wx}$ of polar coordinates $(\rho_{wx}, \theta_{wx})$ is used as an azimuth of a satellite, and an elevation of the satellite is represented by a polar $\rho_{wx}$ are described. Details are not described in this embodiment of this application.

The server 400 may determine, based on elevations and azimuths of a plurality of points of each obstruction around the first point, polar coordinates ($\rho_{zd}$, $\theta_{zd}$) of the plurality of points of the obstruction in a polar coordinate system using the first point as a pole. $\rho_{zd}$ represents an elevation of a point (for example, the third point) of an obstruction, and $\theta_{zd}$ is an azimuth of the third point of the obstruction. Then, the server 400 may connect polar coordinates of a plurality of points of the obstruction around the first point in the foregoing polar coordinate system, and draw a sky blocking curve of the first point, that is, a sky blocking curve of a first grid corresponding to the first point.

Figure 11B:
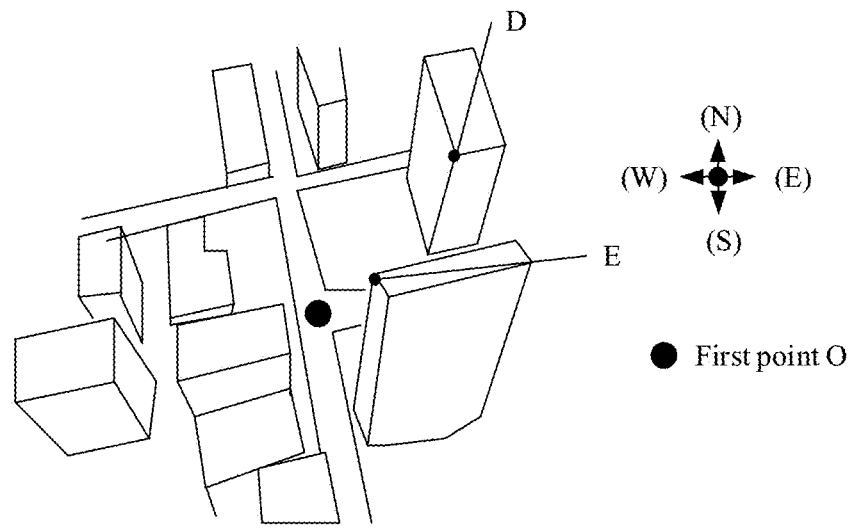
FIG. 11B and FIG. 11C are a diagram of an example of a sky blocking curve according to an embodiment of this application.
Figure 11C:
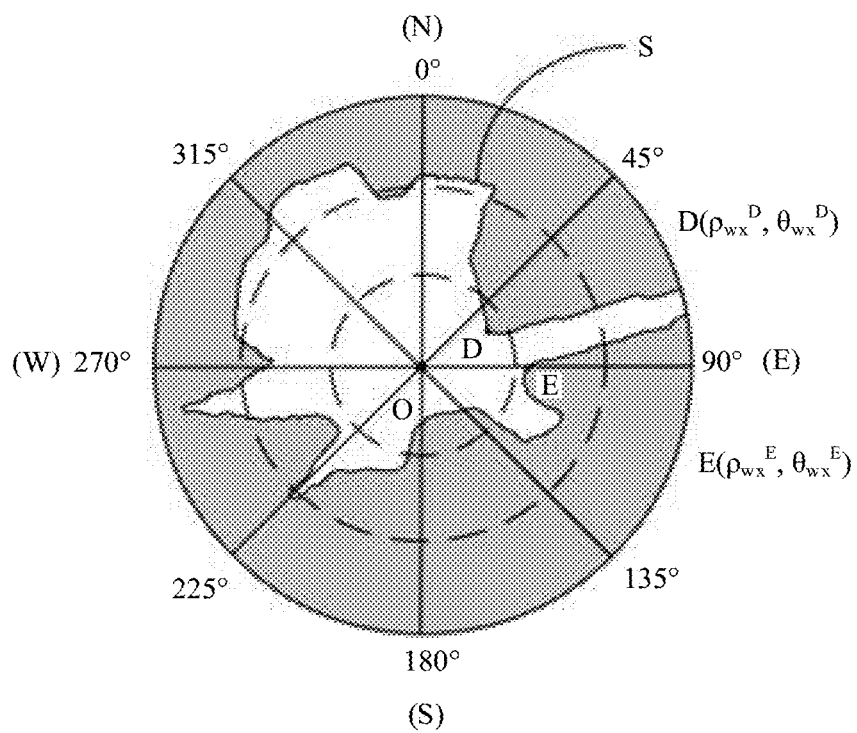

For example, a first point O of a first grid is located in the middle of a road shown in FIG. 11B, and there are many obstructions (for example, high-rise buildings) around the first point O. As shown in FIG. 11C, polar coordinates of a point D of a high-rise building shown in FIG. 11B in a polar coordinate system using the first point O as a pole is D ($\rho_{wx}^D$, $\theta_{wx}^D$); and polar coordinates of a point E of a high-rise building in the polar coordinate system using the first point O as a pole is E ($\rho_{wx}^E$, $\theta_{wx}^E$). The server 400 may draw a sky blocking curve S of the first point O in the polar coordinate system shown in FIG. 11C.

A larger pole diameter of a projection point of any point (for example, the third point) of the obstruction on the plane on which the second polar coordinate system is located indicates a smaller elevation of the third point of the obstruction. A smaller pole diameter of a vertical projection point of the third point of the obstruction on the plane on which the second polar coordinate system is located indicates a larger elevation of the third point of the obstruction. Therefore, an elevation of a highest point of a high-rise building E shown in FIG. 11C is less than an elevation of a highest point of a high-rise building D.

It may be understood that there may be an obstruction in each orientation of a first point of each first grid. If an azimuth of a satellite is the same as an azimuth of any point (for example, the third point) of an obstruction at the first point, if an elevation of the satellite is less than an elevation of the third point of the obstruction, an electronic device located at the first point cannot receive a broadcast signal transmitted by the satellite in a straight line. In other words, the satellite is a non-line-of-sight satellite of the electronic device. If the elevation of the satellite is greater than the elevation of the third point of the obstruction, the electronic device located at the first point may receive the broadcast signal transmitted by the satellite in a straight line. In other words, the satellite is a line-of-sight satellite of the electronic device.

Figure 11D:
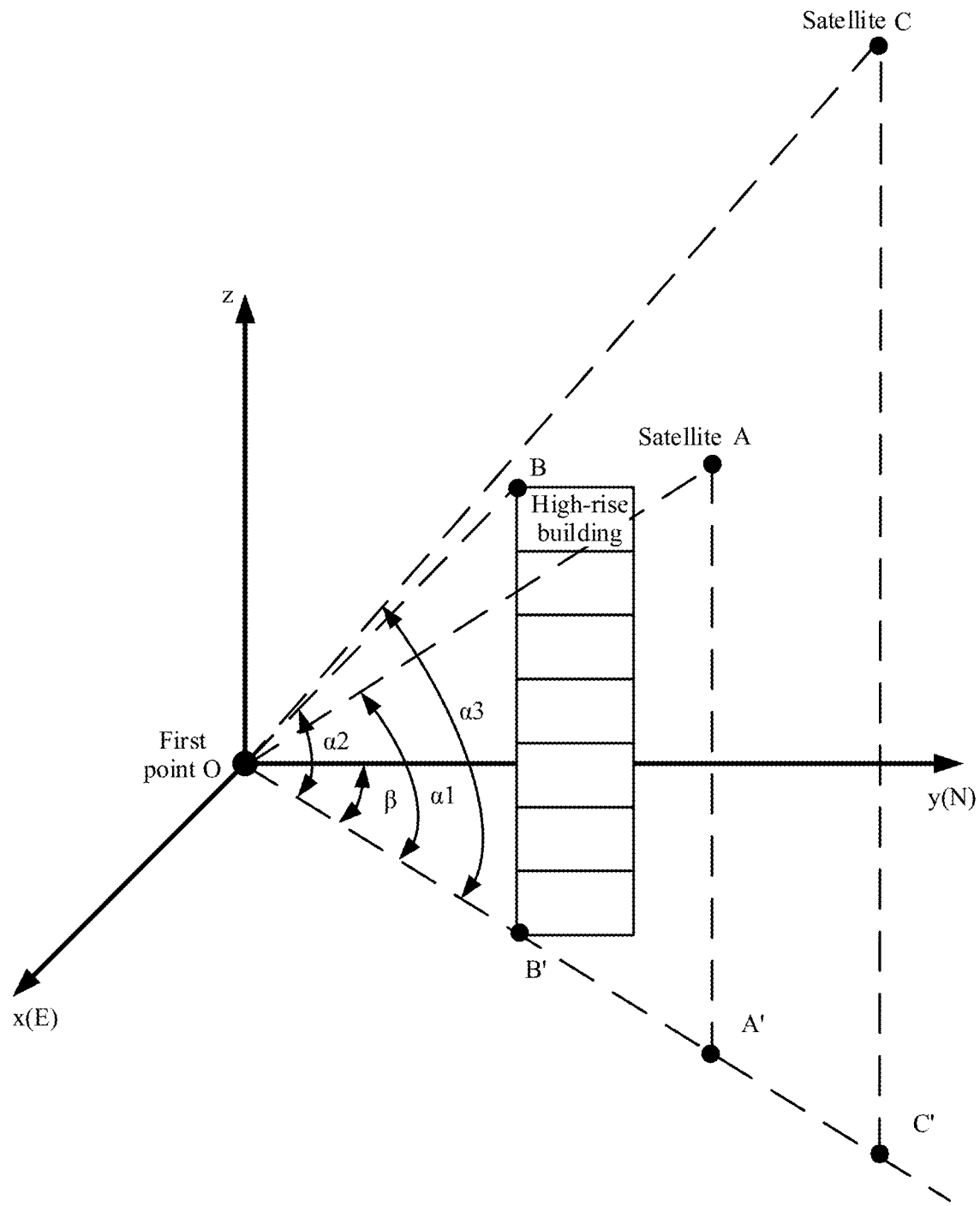
FIG. 11D is a diagram of a principle of determining first visibility according to an embodiment of this application.

For example, as shown in FIG. 11D, an azimuth of a point B of a high-rise building, an azimuth of a satellite A, and an azimuth of a satellite C are all β; and an elevation of the point B of the high-rise building is α2, an elevation of the satellite A is α1, and an elevation of the satellite C is α3. The azimuth of the point B of the high-rise building, the azimuth of the satellite A, and the azimuth of the satellite C are the same, that is, the point B of the high-rise building, the satellite A, and the satellite C are at a same orientation of the first point O. In this case, because the elevation α1 of the satellite A is less than the elevation α2 of the point B of the high-rise building, a broadcast signal transmitted by the satellite A cannot be received by the electronic device located at the first point O through straight-line transmission due to obstruction of the high-rise building, and the satellite A is a non-line-of-sight satellite of the first point O. Because the elevation α3 of the satellite C is greater than the elevation α2 of the point B of the high-rise building, a broadcast signal transmitted by the satellite C is not blocked by the high-rise building, and the satellite C is a line-of-sight satellite of the first point O. If the broadcast signal transmitted by the satellite C is not blocked by another obstruction, the broadcast signal may be received by the electronic device located at the first point O through straight-line transmission.

It can be learned from the foregoing description that if polar coordinates of the satellite in the polar coordinate system using the first point as the pole are located inside the sky blocking curve of the first point (for example, a white area enclosed by the sky blocking curve S shown in FIG. 11C), it indicates that the satellite is a line-of-sight satellite located at the first point. A broadcast signal transmitted by the satellite is not blocked, and can be received by the electronic device located at the first point through straight-line transmission. If the polar coordinates of the satellite in the polar coordinate system using the first point as the pole are located outside the sky blocking curve of the first point (for example, a gray area outside the sky blocking curve S shown in FIG. 11C), it indicates that the satellite is a non-line-of-sight satellite of the first grid. A broadcast signal transmitted by the satellite is blocked, and cannot be received by the electronic device located at the first point through straight-line transmission.

In conclusion, a sky blocking curve of a first grid may be used to determine whether the satellite is a line-of-sight satellite or a non-line-of-sight satellite of the first grid, that is, used to determine whether a broadcast signal transmitted by the satellite is blocked, and whether the broadcast signal can be received by the electronic device located at the first point through straight-line transmission.

S803: The server 400 stores the grid data of the at least one first grid.

The server 400 may store, for each of the at least one map tile, grid data of at least one first grid in the map tile. For example, the server 400 may store a tile database 1200 shown in FIG. 12A.

Figure 12A:
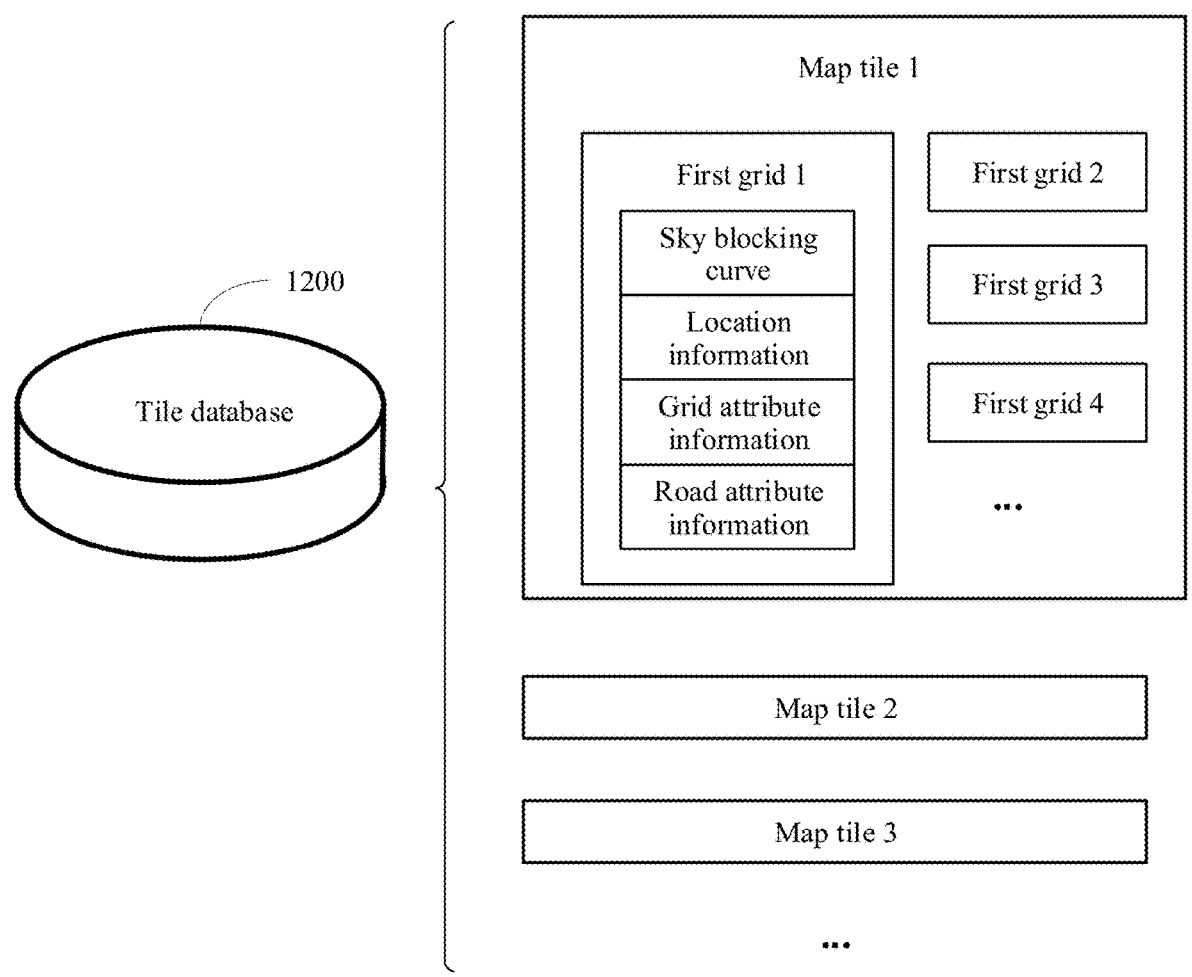
FIG. 12A is a diagram of an example of a tile database according to an embodiment of this application.

For example, as shown in FIG. 12A, the tile database 1200 stores grid data of at least one first grid in a map tile 1, grid data of at least one first grid in a map tile 2, grid data of at least one first grid in a map tile 3, and the like. The map tile 1 is used as an example. As shown in FIG. 12A, at least one piece of grid data of the map tile 1 may include: grid data of a first grid 1, grid data of a first grid 2, grid data of a first grid 3, and grid data of a first grid 4. The first grid 1 is used as an example. As shown in FIG. 12A, the grid data of the first grid 1 may include a sky blocking curve and location information of the first grid 1.

An obstruction (for example, a building) around the first point of the first grid may change with time. Therefore, the sky blocking curve of the first grid may change. Based on this, the server 400 may periodically perform S801 to S803 to obtain latest grid data.

In some embodiments, the grid data of the first grid may further include (III) building attribute information (which is also referred to as grid attribute information) of the first grid. For example, as shown in FIG. 12A, the grid data of the first grid 1 may further include grid attribute information (which is also referred to as building attribute information).

The building attribute information of the first grid is used to indicate that the first grid (for example, the first point of the first grid) is located inside a building or outside a building. For example, the server 400 may determine, based on location information (for example, latitude and longitude coordinates) of the first point of the first grid and 3D building data of each building around the first point, whether the first point is located inside a building or outside a building. Specifically, the 3D building data may include location contour coordinates and height information of a building. Location contour coordinates of a building include latitude and longitude coordinates of each point on a contour of the building, and the height information is used to indicate a height above a horizontal plane of each point on the contour of the building. The server 400 may compare the longitude and latitude coordinates of the first point of the first grid with location contour coordinates of each building around the first point, to determine whether the first point is located inside the building or outside the building.

ing to at least one map tile. 3D building data corresponding to a map tile may include 3D building data of a plurality of buildings in the map tile. The 3D building data may include location contour coordinates and height information of a building.

For example, the 3D building data of the building may be data in a kml format. For example, the following shows 3D building data of a building in the kml format.

```
<Placemark id="2">
    <name>1367376</name>
    <ExtendedData>
        <SchemaData schemaUrl="#FNBuilding3DKml">
            <SimpleData name="ID">1367376</SimpleData>
            <SimpleData name="TYPE">6</SimpleData>
            <SimpleData name="FLOOR">0</SimpleData>
            <SimpleData name="HEIGHT">9.45</SimpleData>
            <SimpleData name="STRUCTURE">0</SimpleData>
            <SimpleData name="ISO">CN</SimpleData>
            <SimpleData name="ORDATE">2016/04/06</SimpleData>
            <SimpleData name="WORKAREAID">CN-31-001</SimpleData>
            <SimpleData name="Shape__Leng">0.00034307037</SimpleData>
            <SimpleData name="Shape__Area">0.00000000716</SimpleData>
        </SchemaData>
    </ExtendedData>
    <LineString>
        <altitudeMode>relativeToGround</altitudeMode>
<coordinates>121.470016124,31.22345601100005,9.45
121.4699020380001,31.22340357100006,9.45      121.469903464,31.22345113300002,9.45
121.4699038920001,31.22345977200007,9.45      121.46990599,31.22346823300007,9.45
121.469909699,31.22347627900007,9.45          121.4699149160001,31.22348368700006,9.45
121.4699214970001,31.22349025400007,9.45      121.4699292620001,31.22349579500008,9.45
121.4699379910001,31.22350016000008,9.45      121.4699474480001,31.22350322700004,9.45
121.4699573680001,31.22350491000003,9.45      121.4699674770001,31.22350516400007,9.45
121.4699774950001,31.22350398100008,9.45      121.4699871450001,31.22350139300005,9.45
12E4699961590001,31.22349747400006,9.45
121.470016124,31.22345601100005,9.45</coordinates>
    </LineString>
</Placemark>
```

For example, if the building attribute information of the first grid is first identification information, it indicates that the first grid is located inside the building. If the building attribute information of the first grid is second identification information, it indicates that the first grid is located outside the building. For example, the first identification information may be "1", and the second identification information may be "0"; or the first identification information may be "01", and the second identification information may be "00".

It may be understood that if the building attribute information of the first grid indicates that the first grid is located inside a building, an electronic device located in the first grid cannot receive a broadcast signal transmitted by a satellite. Therefore, the electronic device located in the first grid cannot perform GNSS positioning. In other words, the grid data of the first grid is not used for location calibration, to improve positioning accuracy. In conclusion, the server 400 may not store the grid data of the first grid (namely, a first grid located outside the building) whose building attribute information is the second identification information. In this way, occupation of storage space of the server 400 by the grid data can be reduced.

It can be learned from the foregoing description that the server 400 may perform S800*a* before performing S802. S800*a*: The server 400 obtains 3D building data correspond- "ID">1367376< in the foregoing 3D building data is an identifier (Identifier, ID) of a building. The ID of a building is used to uniquely identify the building. <coordinates> in the foregoing 3D building data includes longitude, latitude, and heights of a plurality of points on a contour of the building. A height of a point on a contour of a building is a height of the point above the horizontal plane. For example, "121.470016124,31.22345601100005,9.45" in <coordinates> indicates that longitude of a point on the building is "121.470016124°", latitude of the point is "31.22345601100005°", and a height of the point above the horizontal plane is 9.45 meters.

It should be noted that, in this embodiment of this application, latitude greater than 0 may be used to indicate north latitude, and latitude less than 0 is used to indicate south latitude. In other words, when latitude of a point is a positive value, the latitude indicates north latitude, and when latitude of a point is a negative value, the latitude indicates south latitude. For example, in the foregoing 3D building data in the kml format, latitude of each point is north latitude.

In this embodiment of this application, longitude within (0°, 180°) indicates east longitude, and longitude within (−180°, 0°) indicates west longitude. Alternatively, longitude within (0°, 180°) indicates east longitude, and longitude within (180°, 360°) indicates west longitude. For example, in the foregoing 3D building data in the kml format, longitude of each point is east longitude.

Figure 12B:
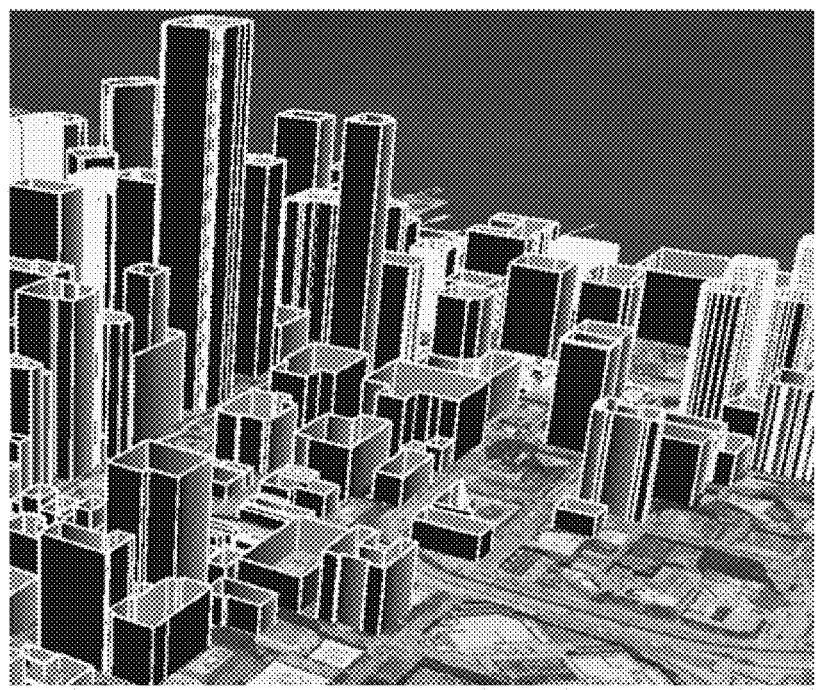
FIG. 12B is a diagram of building distribution in a geographic area according to an embodiment of this application.

It may be understood that, a diagram of building distribution labeled with contours of buildings may be drawn based on relative locations, obtained from 3D building data corresponding to a map tile, of the buildings in a geographic area corresponding to the map tile. For example, FIG. 12B shows a diagram of building distribution labeled with contours of buildings in a geographic area corresponding to a map tile.

(2) "Positioning" Procedure.

The "positioning" procedure is used to position an electronic device. By using the "positioning" process, positioning accuracy of the electronic device can be improved.

In Case (1), the first electronic device and the second electronic device are a same electronic device. The electronic device may be a device having a relatively large storage space and a relatively strong computing capability. For example, the electronic device may be the mobile phone 410 shown in FIG. 4. In this case, the first electronic device (for example, the mobile phone 410) may obtain grid data of at least one first grid in the at least one map tile from the server 400, and store the obtained data. Then, the first electronic device corrects, based on the obtained data, a first location obtained through positioning by the first electronic device, to improve positioning accuracy of the electronic device.

For example, in this embodiment of this application, an example in which both the first electronic device and the second electronic device are the mobile phone 410 shown in FIG. 4 is used to describe the "positioning" procedure in Case (1).

As shown in FIG. 8A, in Case (1), before the "positioning" procedure is performed, the method in this embodiment of this application may further include S804 and S805. In other words, the foregoing "data processing" procedure may further include S804 and S805.

S804: The mobile phone 410 obtains the grid data of at least one first grid in the at least one map tile in the $i^{th}$ layer of tile map from the server 400.

In an implementation, the mobile phone 410 may actively send a grid data request to the server 400, to request to obtain the grid data from the server 400. The server 400 may send the grid data to the mobile phone 410 after receiving the grid data request. For example, the mobile phone 410 may be installed with a data download client corresponding to the server 400. The mobile phone 410 may send the grid data request to the server 400 in response to an operation (namely, an operation for triggering the mobile phone 410 to obtain the grid data) of a user on the client.

In another implementation, the server 400 may actively send the grid data to the mobile phone 410. The mobile phone 410 may receive the grid data from the server 400. For example, the mobile phone 410 may be installed with a client corresponding to the server 400. The mobile phone 410 may receive, via the client, the grid data from the server 400.

S805: The mobile phone 410 stores the grid data of the at least one first grid in the at least one map tile.

The mobile phone 410 may store, for each of the at least one map tile, grid data of at least one first grid in the map tile.

Optionally, to reduce load of the mobile phone 410, and reduce occupation of storage space of the mobile phone 410 by the grid data, the mobile phone 410 may obtain, from the server 400, grid data of at least one first grid in a map tile corresponding to a preset geographic area.

The preset geographic area may be a geographic area covered by a circle with a current location of the mobile phone 410 as a circle center and a preset distance as a radius. For example, the preset distance may be any distance of 10 kilometers (km), 100 km, $1*10^3$ km, $2*10^3$ km, $10*10^3$ km, or the like. Alternatively, the preset geographic area may be a geographic area in which the mobile phone 410 frequently works within a preset period of time. For example, the preset period of time may be any time length such as one month, two months, six months, or one year.

Figure 12C:
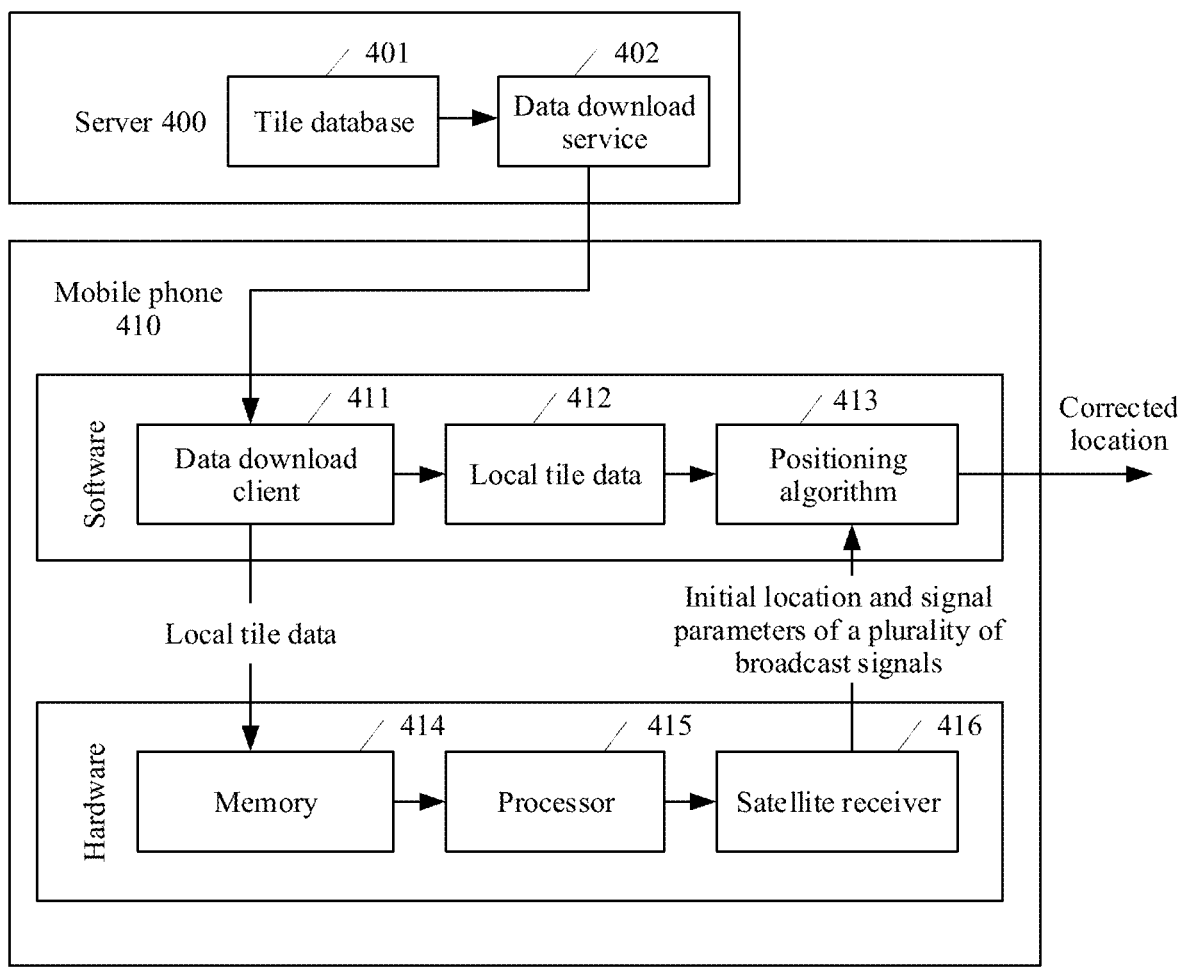
FIG. 12C is a diagram of a principle of a positioning method performed by a mobile phone 410 according to an embodiment of this application.

For example, FIG. 12C is a block diagram of a principle of performing the positioning method by the mobile phone 410 in Case (1).

In Case (1), the foregoing "data processing" procedure may include the following process shown in FIG. 12C: The server 400 stores a tile database 401 (similar to the tile database 1200 shown in FIG. 12A). For example, the server 400 may perform S801 to S803 to store a tile database in the server 400. In addition, the server 400 may provide a data download service 402 for an electronic device (for example, the mobile phone 410). The mobile phone 410 includes a data download client 411. The mobile phone 410 may perform S804 to download tile data (namely, the grid data of the at least one first grid) from the server 400. The mobile phone 410 may further store the tile data in a memory 414.

In Case (1), the foregoing "positioning" procedure may include the following process shown in FIG. 12C: A satellite receiver 416 of the mobile phone 410 may receive broadcast signals transmitted by a plurality of satellites, and a processor 415 may perform S1201 based on signal parameters of the broadcast signals transmitted by the plurality of satellites, to determine a first location of the mobile phone 410. Finally, the processor 415 may correct the first location based on local tile data 412, the first location, and the signal parameters of the plurality of broadcast signals by using a positioning algorithm 413, to obtain and output a corrected location.

It should be noted that the block diagram of a positioning principle shown in FIG. 12C provides only a simple example of a principle of positioning performed by the mobile phone 410 by using an example, and does not constitute a specific limitation on the positioning method provided in this embodiment of this application.

For example, as shown in FIG. 8B, in Case (1), the foregoing "positioning" procedure may specifically include S1201 to S1205.

S1201: The mobile phone 410 obtains the first location of the mobile phone 410 through positioning.

The mobile phone 410 may perform GNSS positioning to obtain the first location of the mobile phone 410. The GNSS may include one or more of a GPS, a GLONASS, a BDS, a QZSS, an SBAS, and a GALILEO. For example, that the mobile phone 410 determines the first location of the mobile phone 410 may include: The mobile phone 410 obtains longitude and latitude coordinates of the first location.

It should be noted that, for a method in which the mobile phone 410 performs GNSS positioning to determine the first location, refer to a specific method in which an electronic device performs GNSS positioning in the conventional art and the related descriptions in FIG. 1 and FIG. 2. Details are not described in this embodiment of this application.

S1202: The mobile phone 410 determines a plurality of candidate locations by using the first location as a center point.

For example, the mobile phone 410 uses the first location as a center point, and a method for determining the plurality of candidate locations may include S1202a and S1202b.

S1202a: The mobile phone 410 determines a candidate area by using the first location as a center point.

For example, the mobile phone 410 may determine the candidate area, by using the first location as a center point, on a map based on a preset search distance.

Figure 13A:
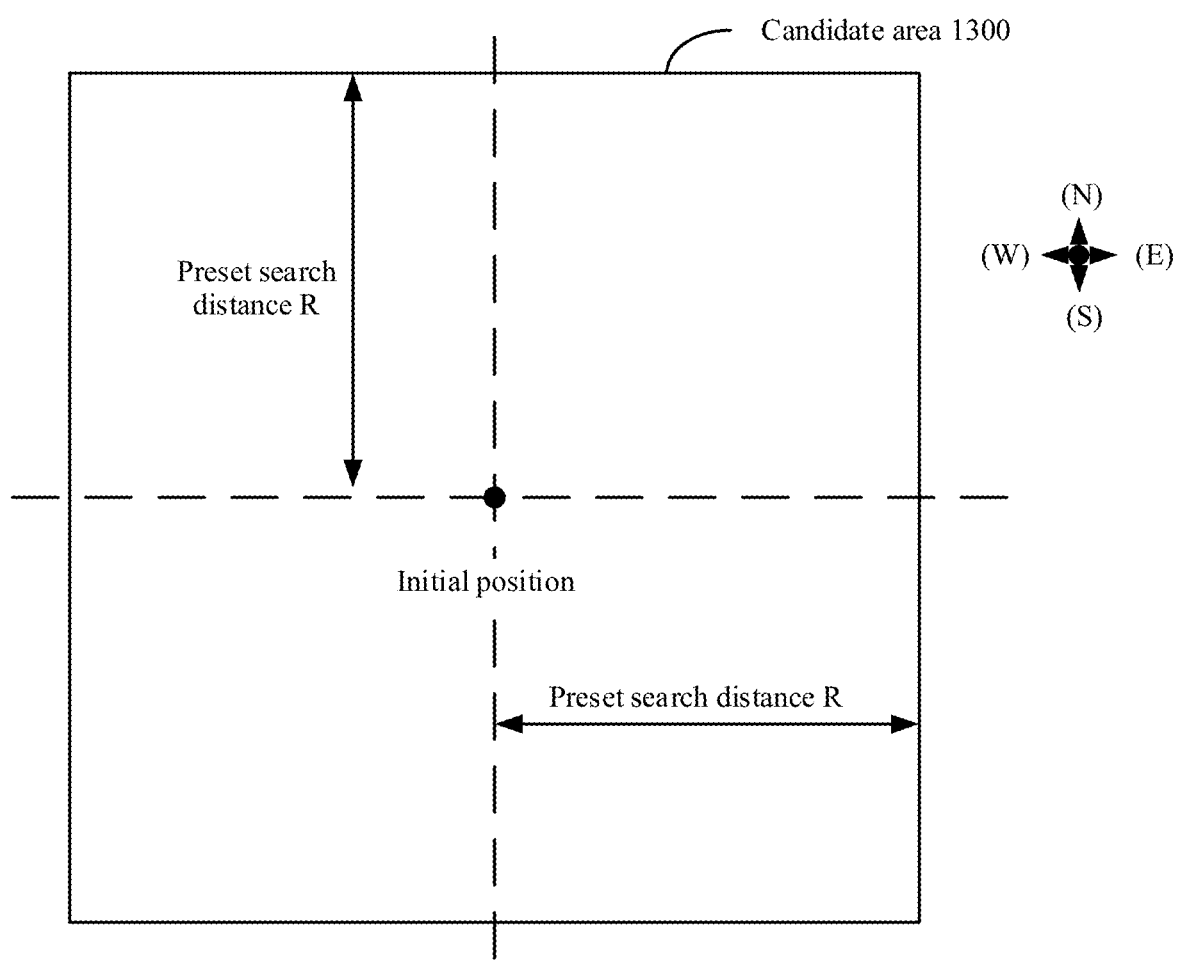
FIG. 13A and FIG. 13B are a diagram of an example of a candidate area and a candidate location according to an embodiment of this application.
Figure 13B:
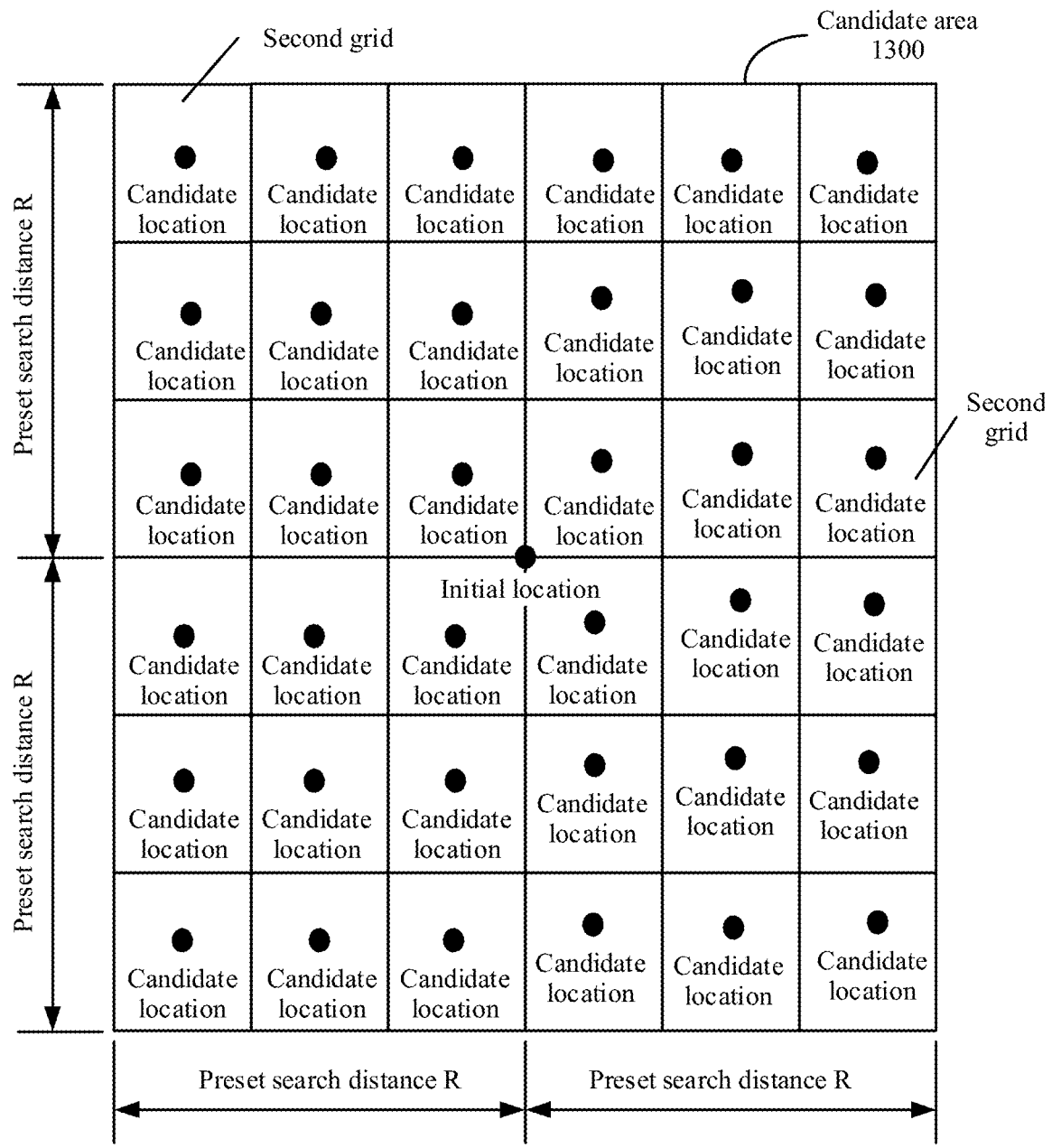

For example, the mobile phone 410 may determine, on the map by using the first location as a center point, a square area whose side length is twice a preset search distance R, where the square area is the foregoing candidate area. As shown in FIG. 13A or FIG. 13B, the mobile phone 410 may determine a candidate area 1300 by using the first location as a center point. The candidate area 1300 shown in FIG. 13A is a square area with a side length of 2R.

Figure 14A:
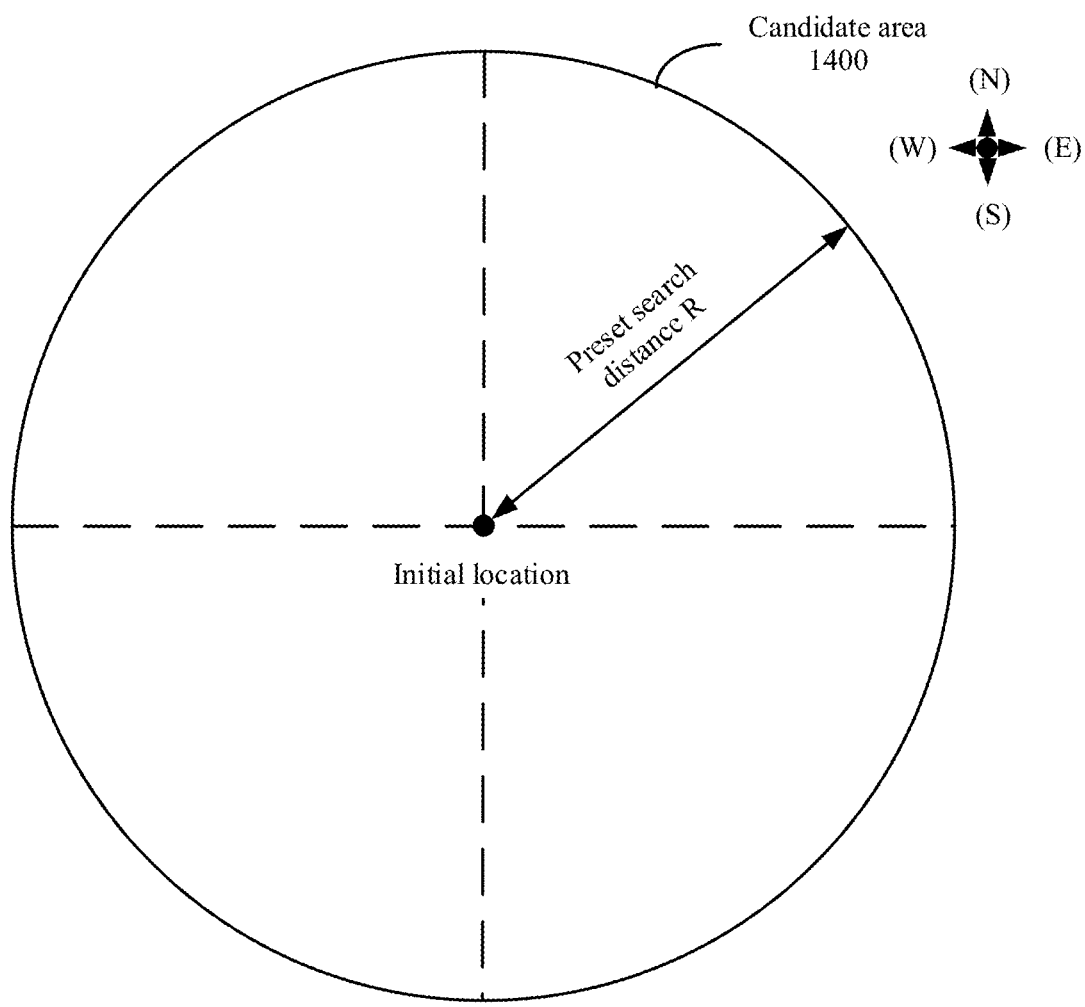
FIG. 14A and FIG. 14B are a diagram of an example of another candidate area and candidate location according to an embodiment of this application.

For another example, the mobile phone 410 may determine, as a candidate area, a circular area on the map that uses the first location as a circle center (that is, a center point) and uses the preset search distance R as a radius. As shown in FIG. 14(a), the mobile phone 410 may determine, by using the first position as a circle center, a candidate area 1400 with a radius of the preset search distance R.

S1202b: The mobile phone 410 determines a plurality of candidate locations in the candidate area.

The mobile phone 410 may determine the plurality of candidate locations in the candidate area, and obtain latitude and longitude coordinates of the plurality of candidate locations.

In an implementation, the mobile phone 410 may segment the candidate area into K second grids, where K≥2, and K is a positive integer. Then, the mobile phone 410 may determine that a second point of each of the K second grids is the candidate location.

A second point of a second grid may be a center point of the second grid. For example, as shown in FIG. 13B, a candidate location in a second grid may be a center point (namely, the second point) of the second grid.

Figure 14B:
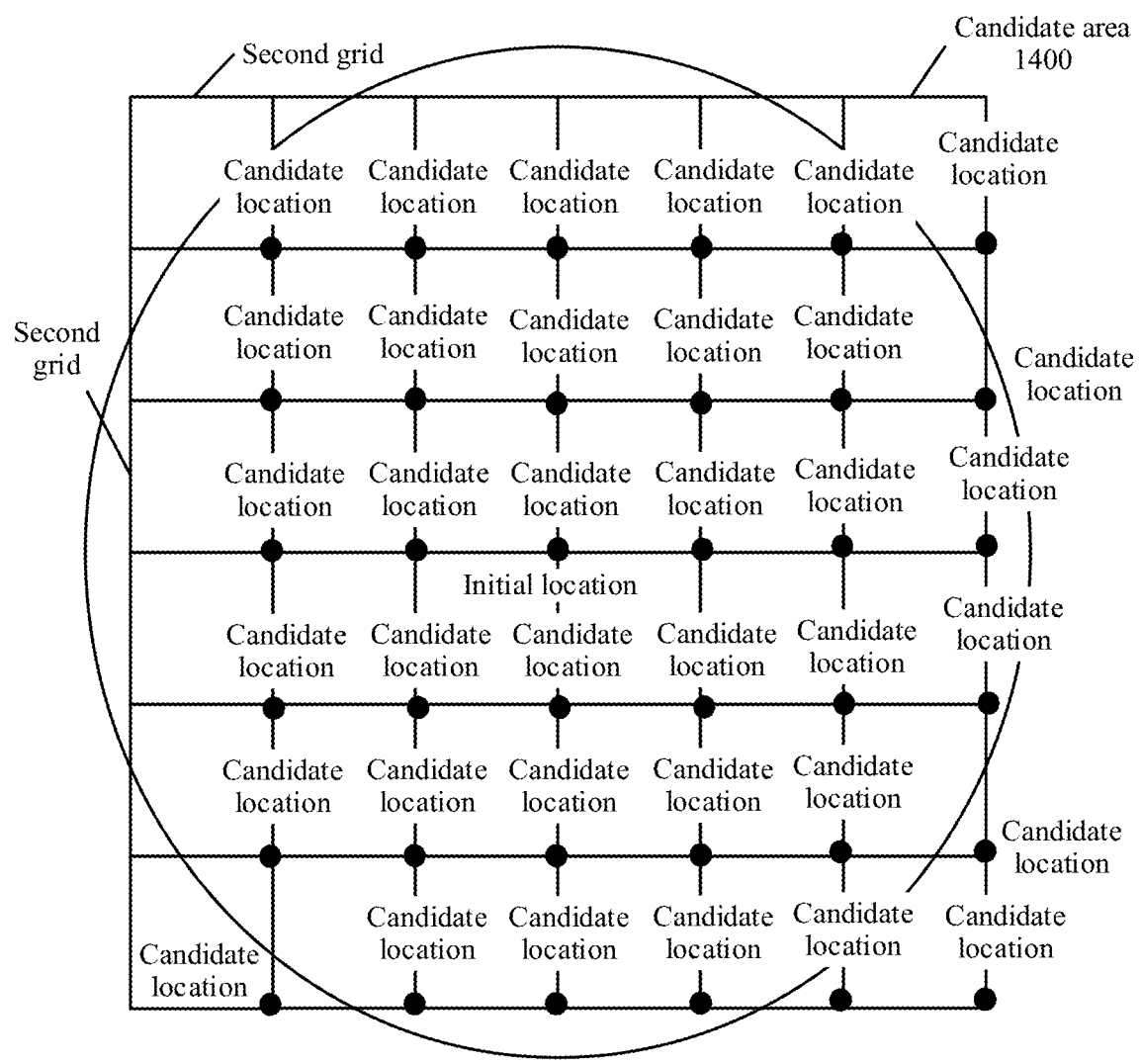

Alternatively, the second point of the second grid may be a point in an upper left corner, a point in an upper right corner, a point in a lower left corner, a point in a lower right corner of the second grid, or any point on the first grid. This is not limited in this embodiment of this application. For example, as shown in FIG. 14B, a candidate location in a second grid may be a point (namely, the second point) at a lower right corner of the second grid.

In another implementation, the mobile phone 410 may randomly determine a plurality of points in the candidate area as candidate locations, and obtain longitude and latitude coordinates of the plurality of candidate locations.

In this embodiment of this application, the mobile phone 410 may select a plurality of candidate positioning locations from the plurality of candidate locations based on elevations and azimuths of the plurality of satellites relative to the candidate locations, grid data corresponding to the plurality of candidate locations, and signal parameters of the broadcast signals received by the mobile phone 410 from the plurality of satellites. Grid data corresponding to each candidate location includes location information and a sky blocking curve. A sky blocking curve of one candidate location is used to indicate elevations and azimuths, relative to the one candidate location, of a plurality of obstructions around the one candidate location. Specifically, the mobile phone 410 may perform S1203 and S1204, to select the plurality of candidate positioning locations from the plurality of candidate locations.

S1203: The mobile phone 410 determines, based on the elevations and azimuths of the plurality of satellites relative to the plurality of candidate locations, the grid data corresponding to the plurality of candidate locations, and the signal parameters of the broadcast signals received by the mobile phone 410 from the plurality of satellites, first visibility and second visibility of the plurality of satellites relative to the plurality of candidate locations.

The plurality of satellites are satellites from which the mobile phone 410 can receive transmitted broadcast signals. First visibility of one satellite relative to one candidate location is used to indicate whether the one satellite is a line-of-sight satellite or a non-line-of-sight satellite of the one candidate location. Second visibility of one satellite relative to one candidate location is used to indicate a probability that the one satellite is a line-of-sight satellite of the one candidate location.

First, in this embodiment of this application, an example in which the mobile phone 410 determines first visibility of one satellite relative to one candidate location is used herein to describe a method in which the mobile phone 410 determines first visibility of the plurality of satellites relative to the plurality of candidate locations in S1203. The mobile phone 410 may perform, for each satellite and each candidate location and "based on an elevation and azimuth of one satellite relative to one candidate location and grid data corresponding to the one candidate location, first visibility of the one satellite relative to the one candidate location", to obtain first visibility of each satellite relative to each candidate location.

For example, the method in this embodiment of this application is described by using an example in which the mobile phone 410 determines first visibility of a satellite a relative to a candidate location a based on an elevation and azimuth of the satellite a relative to the candidate location a and a sky blocking curve of the candidate location a. The satellite a is any one of the foregoing plurality of satellites. The candidate location a is any one of the foregoing plurality of candidate locations. The mobile phone 410 may perform S(1) to S(6) to obtain the first visibility of the satellite a relative to the candidate location a.

S(1): The mobile phone 410 obtains a first azimuth and a first elevation. The first azimuth is an azimuth of the satellite a relative to the candidate location a. The first elevation is an elevation of the satellite a relative to the candidate location a.

It should be noted that, for a method for calculating the elevation of the satellite a relative to the candidate location a by the mobile phone 410, refer to the method for calculating, by an electronic device, an elevation (namely, the elevation of the satellite) of a satellite relative to a location at which the electronic device is located in the foregoing embodiment. Details are not described again in this embodiment of this application.

Similarly, for a method for calculating the azimuth of the satellite a relative to the candidate location a by the mobile phone 410, refer to the method for calculating, by an electronic device, an azimuth (namely, the azimuth of the satellite) of a satellite relative to a location at which the electronic device is located in the foregoing embodiment. Details are not described again in this embodiment of this application.

S(2): The mobile phone 410 determines, from the at least one first grid, a first grid corresponding to the candidate location a based on location information (for example, longitude and latitude coordinates) of the candidate location a and location information (for example, latitude and longitude coordinates) of the at least one first grid, to obtain grid data of the first grid corresponding to the candidate location a (namely, grid data corresponding to the candidate location a).

First, the mobile phone 410 may compare the longitude and latitude coordinates of the candidate location a with the latitude and longitude coordinates of the at least one first grid. Then, the mobile phone 410 may determine, as the first grid corresponding to the candidate location a, a first grid that is in the at least one first grid and whose longitude and latitude coordinates are closest to the longitude and latitude coordinates of the candidate location a. Finally, the mobile phone 410 may obtain the grid data of the first grid corresponding to the candidate location a (namely, the grid data corresponding to the candidate location a). The grid data corresponding to the candidate location a may include location information and a sky blocking curve.

S(3): The mobile phone 410 obtains a second elevation from the sky blocking curve of the candidate location a based on the first azimuth. The second elevation is an elevation of a first obstruction relative to one candidate location, and the first azimuth is an azimuth of the first obstruction relative to the one candidate location.

It can be learned from the foregoing embodiment that a sky blocking curve of one first grid includes elevations and azimuths, relative to the first point, of a plurality of points on a plurality of obstructions around the first grid. In this case, the sky blocking curve of the candidate location a may include elevations and azimuths, relative to the first point, of a plurality of points on a plurality of obstructions around the first grid in which the candidate location a is located. It may be understood that the mobile phone 410 may determine, from the sky blocking curve of the candidate location a, the first obstruction (or a point on the first obstruction) whose azimuth is the first azimuth. Then, the mobile phone 410 may determine, from the sky blocking curve of the candidate location a, the elevation (namely, the second elevation) of the first obstruction relative to the one candidate location.

S(4): The mobile phone 410 determines whether the first elevation is greater than the second elevation.

Specifically, if the first elevation is greater than the second elevation, the mobile phone 410 performs S(5). If the first elevation is less than or equal to the second elevation, the mobile phone 410 performs S(6).

S(5): The mobile phone 410 determines that the satellite a is a line-of-sight satellite of the candidate location a. In other words, the first visibility of the satellite a relative to the candidate location a indicates that the satellite a is a line-of-sight satellite of the candidate location a.

S(6): The mobile phone 410 determines that the satellite a is a non-line-of-sight satellite of the candidate location a. In other words, the first visibility of the satellite a relative to the candidate location a indicates that the satellite a is a non-line-of-sight satellite of the candidate location a.

For example, in this embodiment of this application, S(1) to S(6) are described in detail by using an example in which the first grid corresponding to the candidate location a is the first grid I, and the mobile phone 410 determines the first visibility of the satellite a relative to the candidate location a.

First, the mobile phone 410 performs S(1), to obtain the azimuth (for example, an azimuth 1, namely, the first azimuth) and the elevation (for example, an elevation 1, namely, the first elevation) of the satellite a relative to the candidate location a. Then, the mobile phone 410 performs S(2), to determine that the first grid in which the candidate location a is located is the first grid I. Next, the mobile phone 410 performs S(3), to determine an obstruction (namely, the first obstruction) whose azimuth relative to the first grid I is the azimuth 1, and obtain an elevation (for example, an elevation 2, namely, the second elevation) of the first obstruction relative to the first grid I. Finally, the mobile phone 410 performs S(4), to compare values of the elevation 2 and the elevation 1.

If the elevation 1 of the satellite a relative to the candidate location a is greater than the elevation 2 of the first obstruction relative to the first grid, it indicates that the satellite a is a line-of-sight satellite of the candidate location a. In other words, the first visibility of the satellite a relative to the candidate location a indicates that the satellite a is a line-of-sight satellite of the candidate location a. A broadcast signal transmitted by the satellite a is not blocked, and can be received by an electronic device located at the candidate location a through straight-line transmission.

If the elevation 1 of the satellite a relative to the candidate location a is less than or equal to the elevation 2 of the first obstruction relative to the first grid I, it indicates that the satellite a is a non-line-of-sight satellite of the candidate location a. In other words, the first visibility of the satellite a relative to the candidate location a indicates that the satellite a is a non-line-of-sight satellite of the candidate location a. The broadcast signal transmitted by the satellite a is blocked, and cannot be received by the electronic device located at the candidate location a through straight-line transmission.

It can be learned from the foregoing embodiment that an elevation and azimuth of a satellite relative to a location may be represented by polar coordinates in a polar coordinate system using the location as a pole and the due north direction as a polar axis. In other words, the elevation of the satellite a relative to the candidate location a may be represented by polar coordinates of the satellite a in a polar coordinate system using the candidate location a as a pole and the due north direction as a polar axis. Specifically, a polar diameter $\rho_{wx}$ of a projection point of the satellite a on a plane on which the polar coordinate system a is located represents the elevation of the satellite a relative to the candidate location a, and a polar angle $\theta_{wx}$ of the projection point of the satellite a on the plane on which the polar coordinate system a is located is used as the azimuth of the satellite a relative to the candidate location a.

In some embodiments, the mobile phone 410 may determine, by determining whether polar coordinates ($p_{wx}^a$, $\theta_{wx}^a$) of the satellite a in the polar coordinate system a are located in a sky blocking curve I of the first grid I, to determine whether the satellite a is a line-of-sight satellite or a non-line-of-sight satellite of the candidate location a, that is, the first visibility of the satellite a relative to the candidate location a.

Figure 15A:
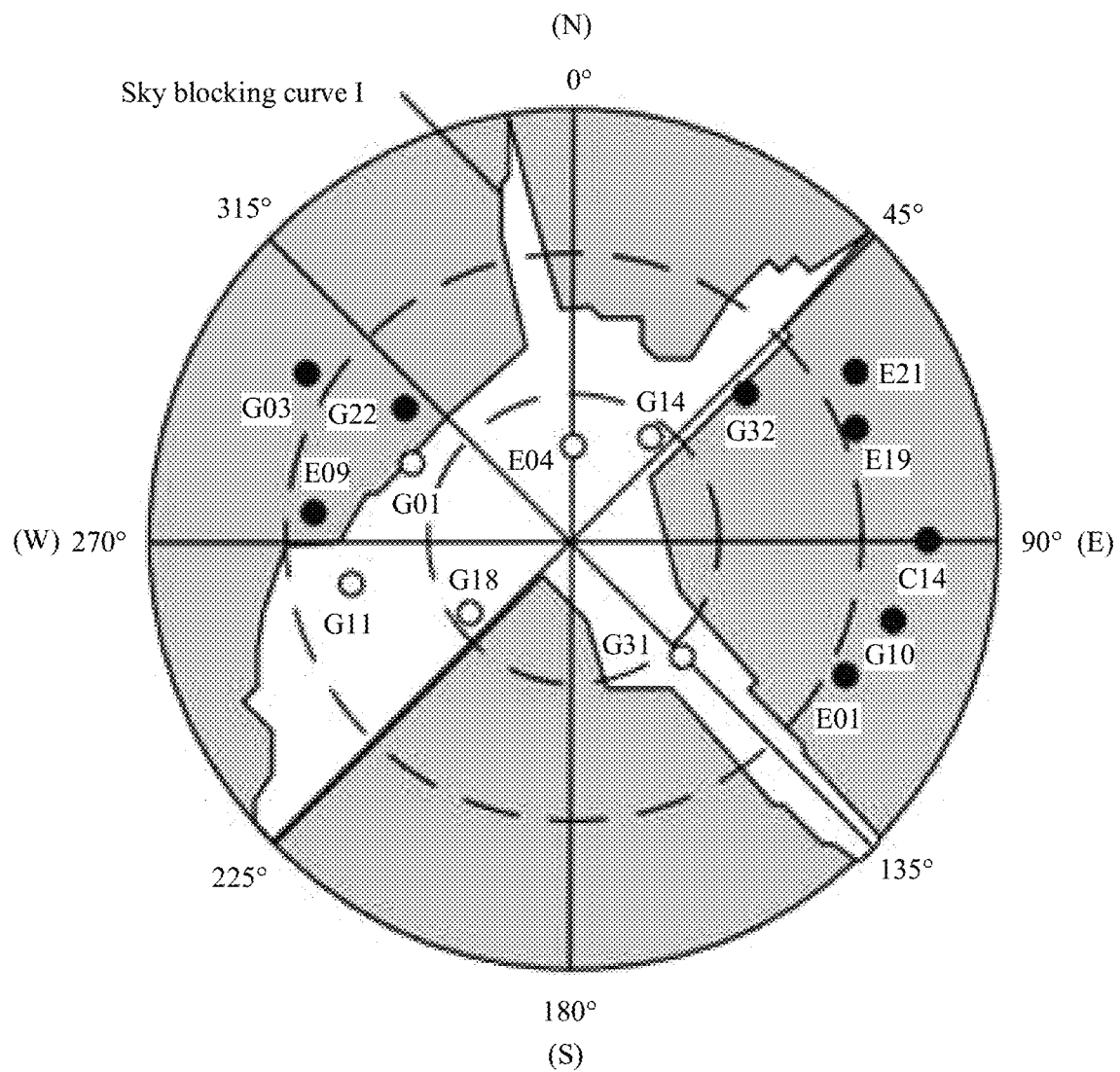
FIG. 15A is a diagram of an example of another sky blocking curve according to an embodiment of this application.

Specifically, if the polar coordinates ($p_{wx}^a$, $\theta_{wx}^a$) of the satellite a are located inside the sky blocking curve I (for example, a white area enclosed by the sky blocking curve I as shown in FIG. 15A), it indicates that the satellite a is a line-of-sight satellite of the candidate location a. A broadcast signal transmitted by the satellite a is not blocked, and can be received by an electronic device located at the candidate location a through straight-line transmission.

If the polar coordinates ($p_{wx}^a$, $\theta_{wx}^a$) of the satellite a are located outside the sky blocking curve I (for example, a gray area outside the sky blocking curve I as shown in FIG. 15A), it indicates that the satellite a is a non-line-of-sight satellite of the candidate location a. A broadcast signal transmitted by the satellite a is blocked, and cannot be received by the electronic device located at the candidate location a through straight-line transmission.

For example, as shown in FIG. 15A, polar coordinates of a satellite G03, a satellite G22, a satellite E09, a satellite G32, a satellite E19, a satellite E21, a satellite C14, a satellite G10, and a satellite E01 are located outside the sky blocking curve I. Therefore, as shown in Table 1, these satellites are line-of-sight satellites of the candidate location a. As shown in FIG. 15A, polar coordinates of a satellite G01, a satellite G11, a satellite E04, a satellite G18, a satellite G14, and the satellite G31 are located inside the sky blocking curve I. Therefore, as shown in Table 1, these satellites are non-line-of-sight satellites of the candidate location a.

TABLE 1

Table of the first visibility of the satellite a relative to the candidate location a

| Satellite | First visibility |
| --- | --- |
| Satellite G03 | Non-line-of-sight satellite |
| Satellite G22 | Non-line-of-sight satellite |
| Satellite E09 | Non-line-of-sight satellite |
| Satellite G32 | Non-line-of-sight satellite |
| Satellite E19 | Non-line-of-sight satellite |
| Satellite E21 | Non-line-of-sight satellite |
| Satellite C14 | Non-line-of-sight satellite |
| Satellite G10 | Non-line-of-sight satellite |
| Satellite E01 | Non-line-of-sight satellite |
| Satellite G01 | Line-of-sight satellite |
| Satellite G11 | Line-of-sight satellite |
| Satellite E04 | Line-of-sight satellite |
| Satellite G18 | Line-of-sight satellite |
| Satellite G14 | Line-of-sight satellite |
| Satellite G31 | Line-of-sight satellite |

In FIG. 15A, a black circle is used to represent a non-line-of-sight satellite indicated by the first visibility relative to the candidate location a, and a white circle is used to represent a line-of-sight satellite indicated by the first visibility indication relative to the candidate location a.

The satellite G03, the satellite G22, the satellite G32, the satellite G10, the satellite G01, the satellite G11, the satellite G14, the satellite G31, and the satellite G18 belong to a same satellite system. The satellite E09, the satellite E19, the satellite E21, the satellite E01, and the satellite E04 belong to a same satellite system. The satellite C14 belongs to another satellite system.

It may be understood that, because a location of one satellite relative to the earth is unchanged, a coordinate location of one candidate location on the earth is also unchanged within a period of time. Therefore, "an elevation and an azimuth of the one satellite relative to the one candidate location" are unchanged for a period of time. In addition, "a sky blocking curve corresponding to the one candidate location" is also unchanged in a period of time. It can be learned that "an elevation and an azimuth of the one satellite relative to the one candidate location" and "a sky blocking curve corresponding to the one candidate location" do not vary with a measurement error of a pseudorange between the mobile phone 410 and the one satellite.

In addition, first visibility of one satellite relative to one candidate location is determined based on "an elevation and an azimuth of the one satellite relative to the one candidate location" and "a sky blocking curve of the one candidate location". Therefore, it can be concluded that "first visibility of one satellite relative to one candidate location" calculated by the mobile phone 410 shows a real case in which the one satellite is a line-of-sight satellite or a non-line-of-sight satellite of the one candidate location.

Further, in this embodiment of this application, an example in which the mobile phone 410 determines second visibility of one satellite relative to one candidate location is used herein to describe a method in which the mobile phone 410 determines second visibility of the plurality of satellites relative to the plurality of candidate locations in S1203. The mobile phone 410 may determine, for each satellite and each candidate location, "the second visibility of the plurality of satellites relative to the one candidate location based on the signal parameters of the broadcast signals received by the mobile phone 410 from the plurality of satellites", to obtain second visibility of each satellite relative to each candidate location.

In this embodiment of this application, the second visibility may be referred to as predictive visibility. The second visibility of the one satellite relative to the one candidate location is used to indicate a probability that the one satellite is a line-of-sight satellite of the one candidate location For example, the signal parameter may include at least one of a CN0, a pseudorange residual, and a pseudorange rate. It can be learned from the description of the CN0 in the foregoing embodiment that a larger CN0 of a broadcast signal indicates a smaller quantity of times the broadcast signal is reflected, and a smaller CN0 of a broadcast signal indicates a larger quantity of times the broadcast signal is reflected. If a broadcast signal transmitted by a satellite is received by an electronic device through reflection transmission, it indicates that the satellite is a non-line-of-sight satellite of a location at which the electronic device is located. It can be learned that a larger CN0 of a broadcast signal transmitted by a satellite indicates a higher probability that the satellite is a non-line-of-sight satellite of the location at which the electronic device is located, and a lower probability that the satellite is a line-of-sight satellite of the location at which the electronic device is located; and a smaller CN0 of a broadcast signal transmitted by a satellite indicates a higher probability that the satellite is a line-of-sight satellite of the location at which the electronic device is located, and a lower probability that the satellite is a non-line-of-sight satellite of the location at which the electronic device is located.

A pseudorange residual is a difference between an accurate distance (namely, a real distance) and a pseudorange between an electronic device and a satellite. A larger quantity of times the broadcast signal transmitted by the satellite is reflected indicates a larger pseudorange. A larger pseudorange indicates a larger pseudorange residual between the electronic device and the satellite. It can be learned from the foregoing description that, a larger pseudorange residual between the electronic device and the satellite indicates a higher probability that the satellite is a non-line-of-sight satellite of the location at which the electronic device is located, and a lower probability that the satellite is a line-of-sight satellite of the location at which the electronic device is located; and a smaller pseudorange residual between the electronic device and the satellite indicates a higher probability that the satellite is a line-of-sight satellite of the location at which the electronic device is located, and a lower probability that the satellite is a non-line-of-sight satellite of the location at which the electronic device is located.

The pseudorange rate is a rate of change of the pseudorange between the electronic device and the satellite. A larger pseudorange rate indicates a larger pseudorange change, a higher probability that the satellite is a non-line-of-sight satellite of the location at which the electronic device is located, and a lower probability that the satellite is a line-of-sight satellite of the location at which the electronic device is located.

In conclusion, the CN0, the pseudorange rate, and the pseudorange residual all affect visibility of the satellite relative to a location of the electronic device.

For example, the method in this embodiment of this application is described by using an example in which the mobile phone 410 determines second visibility of the satellite a relative to the candidate location a based on a signal parameter of a broadcast signal received by the mobile phone 410 from the satellite a.

First, the mobile phone 410 obtains the signal parameter (including the CN0, the pseudorange residual, and the pseudorange rate) of the broadcast signal that is received by the electronic device located at the candidate location a from the satellite. For example, refer to Table 2, which is a table of example signal parameters of broadcast signals that are received by the electronic device located at the candidate location a from the plurality of satellites shown in FIG. 15A or Table 1.

TABLE 2

| Satellite | Pseudorange | Pseudorange rate | CN0 |
|---|---|---|---|
| Satellite C14 | 25460640.4 | 547.284059 | 16 |
| Satellite E01 | 26171185.33 | −299.652085 | 18 |
| Satellite E04 | 23551635.63 | 164.1656862 | 17 |
| Satellite E09 | 25580824.59 | −175.703446 | 38 |
| Satellite E19 | 26271989.21 | 487.1018532 | 12 |
| Satellite E21 | 26777369.35 | 129.8596962 | 15 |
| Satellite G01 | 21243876.97 | −104.743798 | 35 |
| Satellite G03 | 23429238.77 | −412.131468 | 30 |
| Satellite G10 | 23521690.24 | 619.2646425 | 25 |
| Satellite G11 | 21566968.91 | 305.4507994 | 34 |
| Satellite G14 | 21025061.07 | 399.96051 | 31 |
| Satellite G18 | 20556599.03 | 330.3643939 | 19 |
| Satellite G22 | 21945800.04 | −292.945262 | 25 |
| Satellite G31 | 20765697.11 | −156.34733 | 23 |
| Satellite G32 | 21905732.79 | 566.4123715 | 31 |

Finally, the mobile phone 410 uses the signal parameter as an input, and determines second visibility of the plurality of satellites relative to the candidate location a by using a preset AI model.

The mobile phone 410 may store model code of the preset AI model. The mobile phone 410 may run the model code of the preset AI model, use the signal parameter as an input, and determine the second visibility of the plurality of satellites relative to the candidate location a by using the preset AI model.

The preset AI model may be an AI model obtained after a large amount of sample training by the server 400 or another server by using a large quantity of training samples. The preset AI model has a capability of determining second visibility of a satellite relative to a location of an electronic device based on "a signal parameter of a broadcast signal received by the electronic device from the satellite". The training sample includes the signal parameter of the broadcast signal received by the electronic device from the satellite.

For example, the preset AI model may be obtained after a large amount of sample training by using a deep learning algorithm. Alternatively, the preset AI model may be obtained after a large amount of sample training by using a classification algorithm. For example, the classification algorithm may include any one of a support vector machine (SVM) model, a maximum entropy model, a fastText classification algorithm model, a convolutional neural network (CNN) model, an n-gram (n-gram) model, or a recurrent neural network (recurrent neural network, RNN) model.

In this embodiment of this application, second visibility of a satellite relative to the candidate location a indicates a probability that the satellite is a line-of-sight satellite of the candidate location a. If a probability that a satellite is a line-of-sight satellite of the candidate location a (namely, a probability indicated by the second visibility) is greater than or equal to a preset probability threshold, it indicates that the satellite is a line-of-sight satellite of the candidate location a. If a probability that a satellite is a line-of-sight satellite of the candidate location a is less than a preset probability threshold, it indicates that the satellite is a non-line-of-sight satellite of the candidate location a. For example, the preset probability threshold may be any value such as 90%, 95%, 96%, or 85%.

Figure 15B:
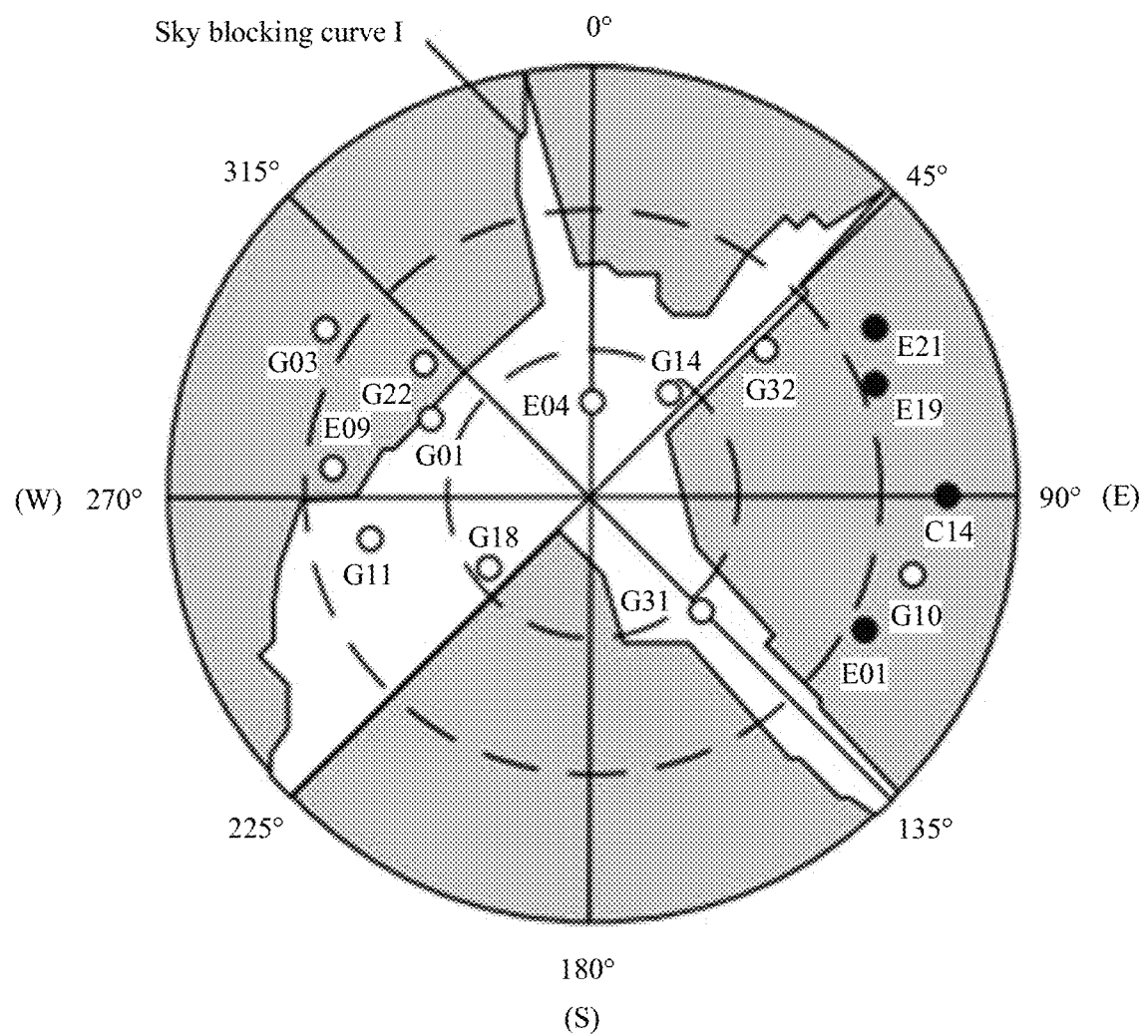
FIG. 15B is a diagram of an example of another sky blocking curve according to an embodiment of this application.

For example, it is assumed that the preset probability threshold is 90%. As shown in Table 3, probabilities that the satellite G03, the satellite G22, the satellite E09, the satellite G32, the satellite G10, the satellite G01, the satellite G11, the satellite E04, the satellite G18, the satellite G14, and satellite G31 are line-of-sight satellites of the candidate location a are greater than or equal to the preset probability threshold. Probabilities that the satellite E19, the satellite E21, the satellite C14, and the satellite E01 are line-of-sight satellites of the candidate location a are less than the preset probability threshold. With reference to Table 3, as shown in FIG. 15B, a black circle represents a non-line-of-sight satellite of the candidate location a, and a white circle represents a line-of-sight satellite of the candidate location a.

TABLE 3

| Table of the second visibility of the satellite a relative to the candidate location a | |
|---|---|
| Satellite | Second visibility |
| Satellite G03 | 95% (line-of-sight satellite) |
| Satellite G22 | 98% (line-of-sight satellite) |
| Satellite E09 | 92% (line-of-sight satellite) |
| Satellite G32 | 92% (line-of-sight satellite) |
| Satellite E19 | 62% (non-line-of-sight satellites) |
| Satellite E21 | 36% (non-line-of-sight satellites) |
| Satellite C14 | 71% (non-line-of-sight satellites) |
| Satellite G10 | 95% (line-of-sight satellite) |
| Satellite E01 | 99% (line-of-sight satellite) |
| Satellite G01 | 95% (line-of-sight satellite) |
| Satellite G11 | 96% (line-of-sight satellite) |
| Satellite E04 | 97% (line-of-sight satellite) |
| Satellite G18 | 93% (line-of-sight satellite) |
| Satellite G14 | 92% (line-of-sight satellite) |
| Satellite G31 | 92% (line-of-sight satellite) |

It may be understood that a measurement error may exist in the signal parameter (for example, a pseudorange) of the broadcast signal received by the mobile phone 410 from the satellite. It can be learned that "the second visibility of the satellite relative to the candidate location" determined based on "the signal parameter of the broadcast signal received by the mobile phone 410 from the satellite" may not reflect a real case in which the satellite is a line-of-sight satellite of the candidate location.

S1204: The mobile phone 410 selects a plurality of candidate positioning locations from the plurality of candidate locations based on the first visibility and the second visibility of the plurality of satellites relative to the plurality of candidate locations.

In an implementation, the plurality of candidate positioning locations may include a candidate location at which a quantity of satellites that meet a preset condition is greater than a preset quantity threshold. The satellite that meets the preset condition is a satellite whose first visibility and second visibility match.

In this embodiment of this application, that first visibility and second visibility of a satellite relative to a candidate location match may specifically include: The first visibility indicates that the satellite is a line-of-sight satellite of the candidate location, and the second visibility is greater than or equal to the preset probability threshold. Alternatively, the first visibility indicates that the satellite is a non-line-of-sight satellite of the candidate location, and the second visibility is less than the preset probability threshold.

For example, it is assumed that the plurality of satellites are six satellites (including a satellite 1 to a satellite 6), and the preset probability threshold is 90%. The plurality of candidate locations include: a candidate location 1, a candidate location 2, a candidate location 3, and a candidate location 4. Please refer to Table 4, which shows a table of examples of first visibility and second visibility of the satellite 1 to the satellite 10 relative to the candidate location 1 to the candidate location 3.

TABLE 4

| Candidate location | | Candidate location 1 | Candidate location 2 | Candidate location 3 | Candidate location 4 |
|---|---|---|---|---|---|
| Satellite 1 | First visibility | Line-of-sight satellite | Line-of-sight satellite | Line-of-sight satellite | Line-of-sight satellite |
| | Second visibility | 95% | 63% | 95% | 93% |
| Satellite 2 | First visibility | Non-line-of-sight satellite | Non-line-of-sight satellite | Line-of-sight satellite | Non-line-of-sight satellite |
| | Second visibility | 55% | 32% | 32% | 36% |
| Satellite 3 | First visibility | Line-of-sight satellite | Line-of-sight satellite | Non-line-of-sight satellite | Non-line-of-sight satellite |
| | Second visibility | 52% | 96% | 95% | 92% |
| Satellite 4 | First visibility | Line-of-sight satellite | Non-line-of-sight satellite | Line-of-sight satellite | Non-line-of-sight satellite |
| | Second visibility | 90% | 95% | 93% | 93% |
| Satellite 5 | First visibility | Non-line-of-sight satellite | Line-of-sight satellite | Non-line-of-sight satellite | Line-of-sight satellite |
| | Second visibility | 23% | 95% | 90% | 63% |
| Satellite 6 | First visibility | Non-line-of-sight satellite | Line-of-sight satellite | Line-of-sight satellite | Non-line-of-sight satellite |
| | Second visibility | 63% | 90% | 63% | 63% |

As shown in Table 4, the first visibility of the satellite 1 relative to the candidate location 1 indicates that the satellite 1 is a line-of-sight satellite of the candidate location 1. The second visibility indicates that a probability that the satellite 1 is a line-of-sight satellite of the candidate location 1 is 95%, and 95% is greater than 90% (namely, the preset probability threshold). Therefore, the first visibility and the second visibility of the satellite 1 relative to the candidate location 1 match. As shown in Table 4, the first visibility of the satellite 2 relative to the candidate location 1 indicates that the satellite 2 is a non-line-of-sight satellite of the candidate location 1. The second visibility indicates that a probability that the satellite 2 is a line-of-sight satellite of the candidate location 1 is 55%, and 55% is less than 90% (namely, the preset probability threshold). Therefore, the first visibility and the second visibility of the satellite 2 relative to the candidate location 1 match.

Similarly, it can be learned from Table 4 that the first visibility and the second visibility of the satellite 3 relative to the candidate location 1 do not match; the first visibility and the second visibility of the satellite 4 relative to the candidate location 1 match; the first visibility and the second visibility of the satellite 5 relative to the candidate location 1 match; and the first visibility and the second visibility of the satellite 6 relative to the candidate location 1 match. It can be concluded that for the candidate location 1, a quantity of satellites that meet the preset condition is 5.

Similarly, it can be learned from Table 4 that for the candidate location 2, a quantity of satellites that meet the preset condition is 4; for the candidate location 3, a quantity of satellites that meet the preset condition is 2; and for the candidate location 4, a quantity of satellites that meet the preset condition is 3.

It is assumed that the preset quantity threshold is 3. In this case, for the candidate location 1 and the candidate location 2 shown in Table 4, a quantity of satellites that meet the preset condition is greater than the preset data threshold. Therefore, the candidate location 1 and the candidate location 2 shown in Table 4 are candidate positioning locations.

In another implementation, the plurality of candidate positioning locations include M candidate locations in the plurality of candidate locations, where M≥2, and M is a positive integer. A quantity of satellites that meet the preset condition in the M candidate locations is greater than a quantity of satellites that meet the preset condition at another candidate location. The another candidate location includes a candidate location other than the M candidate locations in the plurality of candidate locations.

For example, with reference to the example shown in Table 4, it is assumed that N=3, where N is a quantity of candidate positioning locations. The plurality of candidate locations are the candidate location 1, the candidate location 2, the candidate location 3, and the candidate location 4. The plurality of candidate positioning locations may include the candidate location 1, the candidate location 2, and the candidate location 4. Quantities of satellites that meet the preset condition in the candidate location 1, the candidate location 2, and the candidate location 4 are all greater than the quantity of satellites that meet the preset condition in the candidate location 2.

In another implementation, for each candidate location, a quantity of satellites that meet the preset condition (satellites whose first visibility and second visibility match) can be used to determine a score of the candidate location. In other words, for each candidate location, the mobile phone 410 may count a quantity of satellites whose first visibility and second visibility match, and determine a score of the corresponding candidate location based on the counted quantity. Then, the mobile phone 410 may select a plurality of candidate positioning locations from the plurality of candidate locations based on a score of each candidate location.

For example, the foregoing candidate location a is used as an example. After Table 1 is compared with Table 3, the following information can be learned: The first visibility and the second visibility of the satellite G03 relative to the candidate location a do not match; the first visibility and the second visibility of the satellite G22 relative to the candidate location a do not match; the first visibility and the second visibility of the satellite E09 relative to the candidate location a do not match; the first visibility and the second visibility of the satellite G32 relative to the candidate location a do not match; the first visibility and the second visibility of the satellite E19 relative to the candidate location a match; the first visibility and the second visibility of the satellite E21 relative to the candidate location a match; the first visibility and the second visibility of the satellite C14 relative to the candidate location a match; the first visibility and the second visibility of the satellite G10 relative to the candidate location a do not match; the first visibility and the second visibility of the satellite E01 relative to the candidate location a do not match; the first visibility and the second visibility of the satellite G01 relative to the candidate location a match; the first visibility and the second visibility of the satellite G11 relative to the candidate location a match; the first visibility and the second visibility of the satellite E04 relative to the candidate location a match; the first visibility and the second visibility of the satellite G18 relative to the candidate location a match; the first visibility and the second visibility of the satellite G14 relative to the candidate location a match; and the first visibility and the second visibility of the satellite G31 relative to the candidate location a match. For the candidate location a, a quantity of satellites whose first visibility and second visibility match is 9.

A counted quantity for one candidate location is proportional to a score of the candidate location. In other words, a higher counted quantity for a candidate location indicates a higher score of the candidate location; and a lower counted quantity for a candidate location indicates a lower score of the candidate location.

For example, a value interval of scoring each candidate location may be [0, T]. For example, T=10. After counting a quantity of satellites whose first visibility and second visibility relative to a candidate location match, the mobile phone 410 may calculate a ratio of the counted quantity to a total quantity of the plurality of satellites, and calculate a product of the ratio and T. The product obtained through calculation by the mobile phone 410 is a score of the candidate location.

For example, the mobile phone 410 may select, from the plurality of candidate locations, a candidate location whose score is greater than a preset scoring threshold as a candidate positioning location. The preset scoring threshold is less than T. Using T=10 as an example, the preset scoring threshold may be 8, 9, 7, 6, or the like.

Figure 16A:
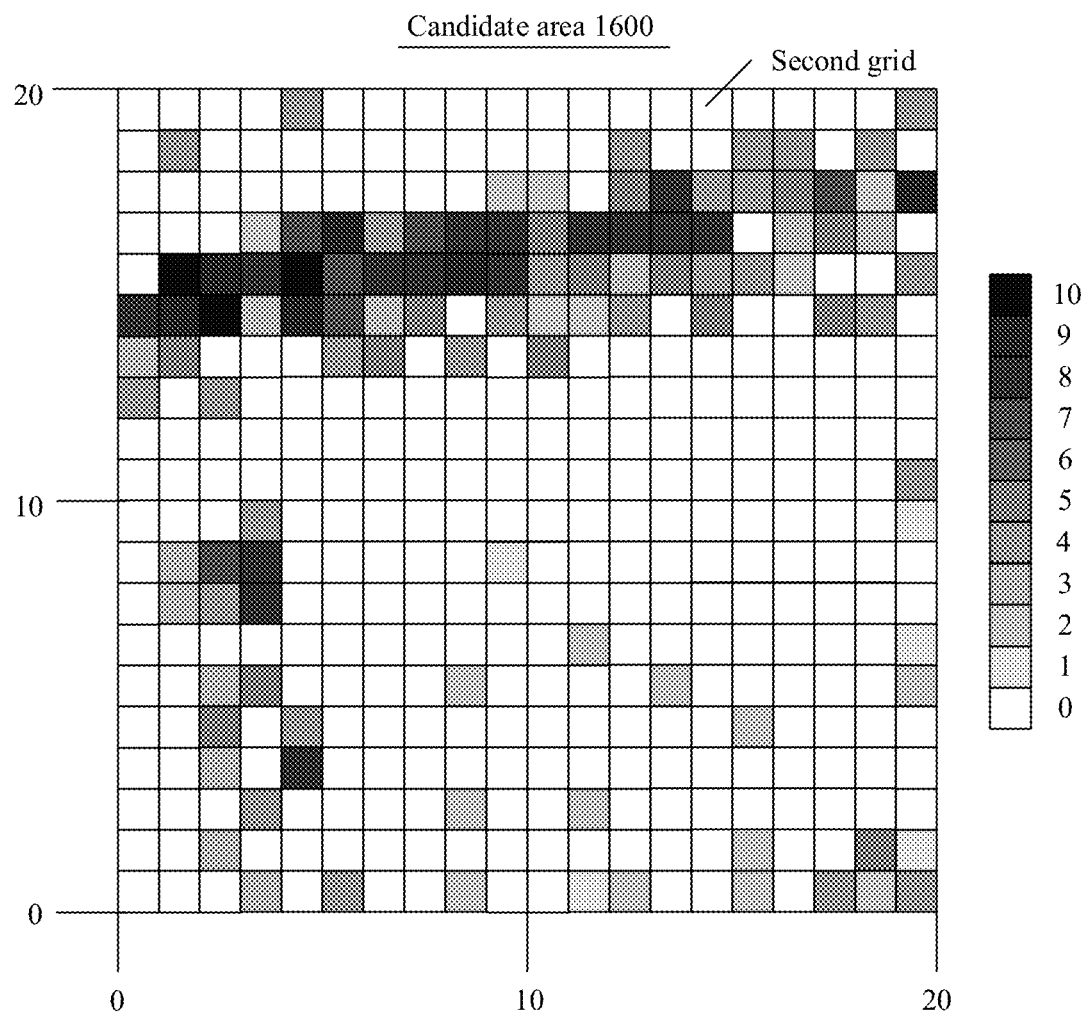
FIG. 16A is a diagram of scoring a second grid (namely, a candidate location) according to an embodiment of this application.

For example, T=10, that is, a value interval of scoring the candidate location may be [0, 10], and the preset scoring threshold is equal to 6. It is assumed that the user is located at the point O shown in FIG. 11B. A candidate location 1600 shown in FIG. 16A is a candidate area determined by the mobile phone 410 by performing S1202a. The candidate area shown in FIG. 16A includes a plurality of second grids, and each second grid corresponds to one candidate location. In FIG. 16A, a filling color of each second grid is used to represent a score of a candidate location corresponding to the second grid. A darker filling color of a second grid indicates a higher score of a candidate location corresponding to the second grid; and a whiter filling color of a second grid indicates a lower score of a candidate location corresponding to the second grid.

Figure 16B:
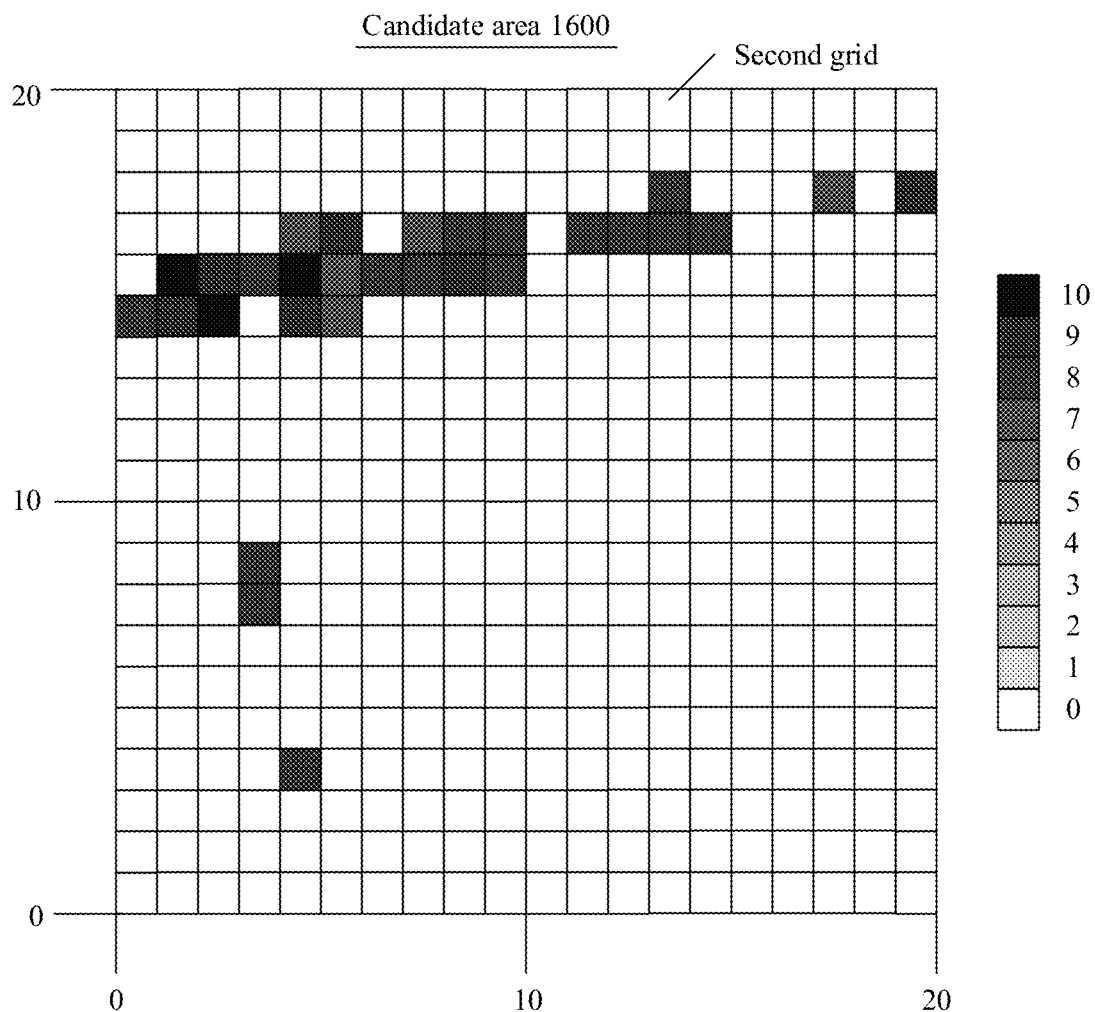
FIG. 16B is a diagram of scoring a candidate positioning location according to an embodiment of this application.

The mobile phone 410 selects, from the plurality of candidate locations shown in FIG. 16A, a candidate location whose score is greater than the preset scoring threshold (for example, 6) as a candidate positioning location, to obtain a diagram of candidate positioning locations shown in FIG. 16B. As shown in FIG. 16B, a second grid filled with a color (non-white) in the candidate location 1600 is correspondingly a candidate positioning location. Scores of candidate positioning locations shown in FIG. 16B are all greater than 6.

It may be understood that, for one candidate location, a larger quantity (namely, a higher score of the candidate location) of satellites whose first visibility and second visibility match indicates higher positioning accuracy of the candidate location. Therefore, in this embodiment of this application, the mobile phone 410 corrects the first location based on location information (for example, latitude and longitude coordinates) of candidate locations (namely, the plurality of candidate positioning locations) with relatively high scores, so that positioning accuracy of the mobile phone 410 can be improved.

S1205: The mobile phone 410 corrects the first location based on the plurality of candidate positioning locations, to output a corrected second location.

For example, the mobile phone 410 may use the following formula (3):

$$x = \frac{\sum_{i=1}^{n} score_i \times x_i}{\sum_{i=1}^{n} score_i}, y = \frac{\sum_{i=1}^{n} score_i \times y_i}{\sum_{i=1}^{n} score_i} \quad (3)$$

determine latitude and longitude coordinates (x, y) of the second location of the mobile phone 410. $(x_i, y_i)$ is longitude and latitude coordinates of an $i^{th}$ candidate positioning location in the plurality of candidate positioning locations (for example, n candidate positioning locations). A score, is a score of the $i^{th}$ candidate positioning location.

In some embodiments, after determining the second location, the mobile phone 410 may use the second location as a final positioning location of the mobile phone 410. It may be understood that the second location is determined with reference to the first visibility and the second visibility of the plurality of satellites relative to the mobile phone 410. Therefore, the following possibility can be reduced: That positioning accuracy of the mobile phone 410 is relatively low due to a relatively large pseudorange measurement error caused by that a broadcast signal transmitted by the satellite cannot be received by the mobile phone 410 through straight-line transmission. Compared with the first location obtained through positioning by the mobile phone 410, positioning accuracy for the second location is relatively high. In other words, according to the method in this embodiment of this application, in a scenario in which a signal transmitted by a satellite is easily blocked, positioning accuracy of the mobile phone 410 can still be ensured or even improved.

In some vehicle-mounted positioning solutions, the first location obtained through positioning by the electronic device may be corrected based on a road. For example, the first location obtained through positioning by the mobile phone 410 may be corrected to a road centerline closest to the first location. However, this solution is only applicable to positioning error correction in a high-speed motion scenario rather than a low-speed scenario (for example, a scenario in which a user walks) and a static scenario (for example, a scenario in which a user is taking a taxi). In addition, according to the foregoing solution, a side of a road on which the electronic device is located cannot be accurately identified.

With respect to the foregoing problem, according to the method in this embodiment of this application, a side of the road on which the electronic device (for example, the mobile phone 410) is located can be accurately located, while GNSS positioning accuracy is improved, so as to improve user experience. Specifically, the grid data of the first grid may further include a road identifier of a road on which the first grid is located.

For example, in this embodiment of this application, the grid data of the first grid may further include (IV) road attribute information of the first grid. For example, as shown in FIG. 12A, the grid data of the first grid 1 may further include road attribute information.

The road attribute information of the first grid may include road indication information. The road indication information is used to indicate that the first grid (for example, a first point of the first grid) is located on a road or off a road.

If road indication information of one first grid indicates that the first grid is on a road, road attribute information of the first grid may further include road data of a road on which the first grid is located. The road data may include a road identifier, road start point coordinates, road width information, road direction information, and the like. Road data of a road may include longitude and latitude coordinates of a group of points.

Grid data corresponding to the plurality of candidate locations is included in data of one or more map tiles. The data of the map tile may include construction data of a building in the map tile, and road data of a road in the map tile.

It can be learned from the foregoing description that the server 400 may perform S800b before performing S802. S800b: The server 400 obtains road data of a road in at least one map tile. Then, the server 400 may perform S802 to obtain road attribute information of the at least one first grid (namely, a plurality of locations) from the road data obtained after performing S800b.

Road data of a road in a map tile may include road data of a road in the map tile. Road data of a road may include: a road identifier (which is also referred to as a road number), road start point coordinates, road width information, road direction information, and the like of the road.

For example, the road data of the road may be data in a kml format. For example, the following shows road data in the kml format.

```
<Placemark id="1">
    <name>72520</name>
    <ExtendedData>
        <SchemaData schemaUrl="#RoadsKML">
            <SimpleData name="ID">72520</SimpleData>
            <SimpleData name="TYPE">22</SimpleData>
            <SimpleData name="STATE">0</SimpleData>
            <SimpleData name="PROPERTY">0</SimpleData>
            <SimpleData name="MAXSPEED">70</SimpleData>
            <SimpleData name="TRAVEL">0</SimpleData>
            <SimpleData name="WIDTH">20.0</SimpleData>
            <SimpleData name="ISO">CN</SimpleData>
        </SchemaData>
    </ExtendedData>
    <MultiGeometry>
        <LineString>
            <altitudeMode>clampToGround</altitudeMode>
            <coordinates>121.46006087300009,31.194542826000017
                121.45997871200007,31.194337521
                121.45961551100004,31.194134186000014</coordinates>
        </LineString>
    </MultiGeometry>
</Placemark>
```

"ID">72520< in the road data is a road number, which is also referred to as a road identifier (ID). The road ID is used to uniquely identify the road. In the foregoing road data, "WIDTH">20.0< indicates that a width of the road is 20 meters. <coordinates> in the road data includes latitude and longitude coordinates of a plurality of points (for example, a road start point) on the road. For example, "121.46006087300009,31.194542826000017" in <coordinates> above indicates that longitude of a point on the road is "121.46006087300009°" and latitude of the point is "31.194542826000017°". Certainly, the road data further includes other data (for example, a maximum driving speed) of the road. This is not described in this embodiment of this application.

It can be learned from the descriptions of longitude and latitude in the foregoing embodiment that, latitude greater than 0 indicates north latitude, latitude less than 0 indicates south latitude, and longitude within (0°, 180°) indicates east longitude. For example, in the foregoing road data in the kml format, longitude of each point is east longitude, and latitude of each point is north latitude.

Figure 16C:
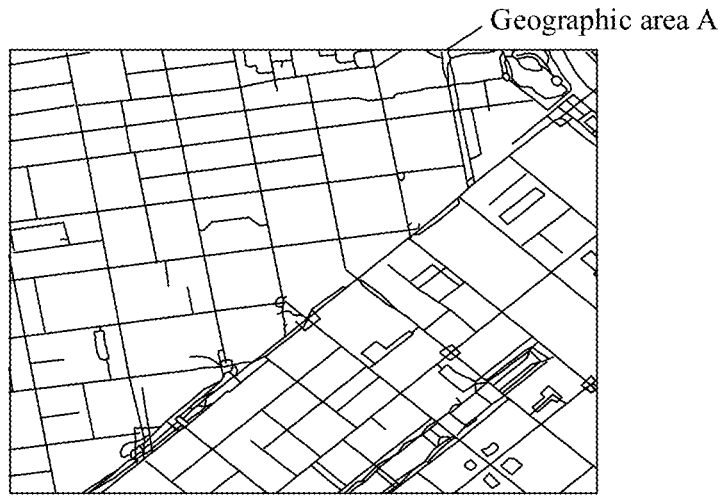
FIG. 16C, FIG. 16D, and FIG. 16E are a diagram of road distribution in a geographic area according to an embodiment of this application.

It may be understood that, a diagram of road distribution labeled with roads may be drawn based on relative locations, obtained from road data of the roads in a map tile, of the roads in a geographic area corresponding to the map tile. For example, it is assumed that a geographic area corresponding to a map tile A is a geographic area A shown in FIG. 16C. In FIG. 16C, a diagram of road distribution labeled with contours of roads in the geographic area A is shown. Black lines shown in FIG. 16C identify the roads in the geographic area A. The server 400 performs S800b for the geographic area A corresponding to the map tile A, and may obtain road data (including road identifiers and road route coordinates of a plurality of roads) of the roads identified by the black lines shown in FIG. 16C, that is, road data corresponding to the map tile.

Optionally, before S802, the server 400 may select a road with low positioning accuracy from roads in a geographic area corresponding to each map tile. There is a relatively low possibility that an electronic device located on the road with low positioning accuracy receives a broadcast signal transmitted by a satellite through straight-line transmission. In other words, positioning accuracy for the first location obtained through positioning by the electronic device located on the road with low positioning accuracy is relatively low. Therefore, when an electronic device (for example, the mobile phone 410) is located on the road with low positioning accuracy, the method in this embodiment of this application may be performed to effectively improve positioning accuracy of the electronic device.

For example, after S800*b*, the server 400 may perform S800*c* and S800*d* to obtain road data of the road with low positioning accuracy.

Figure 16D:
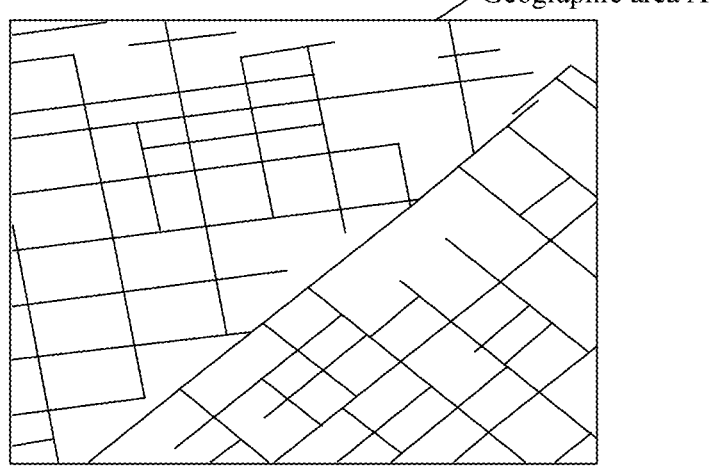

S800*c*: The server 400 selects, from the roads in the geographic area A corresponding to the map tile A, a road that meets a preset selection condition. The server 400 determines one or more first roads after a curved road segment is excluded from a road that meets a preset selection condition. That the road meets the preset selection condition may include the following: a road length of the road is greater than a preset length threshold; and the road is a main road, not the auxiliary road. For example, the server 400 performs S800*c* for the roads in the geographic area A shown in FIG. 16C, to obtain the first road identified by the black line in FIG. 16D, and obtain road data of the first road identified by the black line shown in FIG. 16D.

S800*d*: The server 400 segments the one or more first roads at a preset length interval, to obtain a plurality of second roads. The server 400 selects, from the plurality of second roads, a second road that meets a preset road condition. The second road that meets the preset road condition is the road with low positioning accuracy. The server 400 may obtain road data of each road with low positioning accuracy.

For example, the second road that meets the preset road condition may include a second road on which there are buildings (for example, high-rise buildings) on both sides, and for which a ratio of a largest height of the buildings on both sides to a width of the road is greater than a preset proportion threshold.

It may be understood that if there are buildings on both sides of a road, a possibility that an electronic device on the road receives, through straight-line transmission, a broadcast signal transmitted by a satellite is relatively low, and positioning accuracy of the first location obtained through positioning by the electronic device on the road with low positioning accuracy is relatively low.

For example, the preset proportion threshold may be 100%, 80%, 90%, or the like. For example, the preset proportion threshold is 100%. If a ratio of a largest height of buildings on both sides of a road to a width of the road is greater than 100%, a possibility that an electronic device located on the road receives, through straight-line transmission, a broadcast signal transmitted by a satellite is relatively low, and positioning accuracy of the first location obtained through positioning by the electronic device located on the road with low positioning accuracy is relatively low.

Figure 16E:
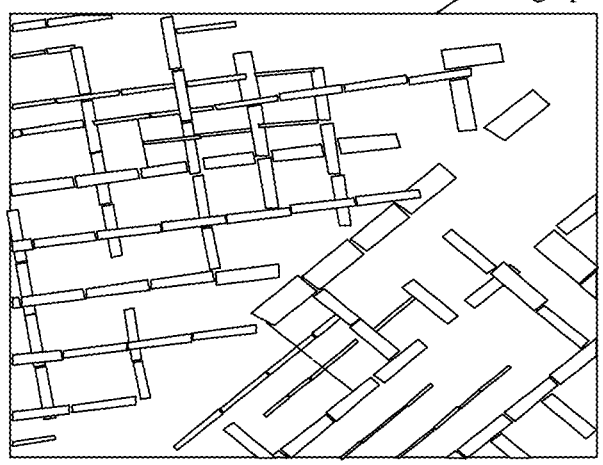

For example, the preset length interval may be 100 m, 80 m, 120 m, 110 m, or the like. For example, the preset length interval is 100 m. The server 400 may segment each first road identified by white lines shown in FIG. 16D into a plurality of second roads whose road lengths are less than or equal to 100 m. The plurality of second roads identified by white blocks shown in FIG. 16E are all second roads that meet the preset road condition. Each white block shown in FIG. 16E is used to identify a second road that meets the preset road condition.

In conclusion, a possibility that an electronic device located on the second road (namely, a road with low positioning accuracy) that meets the preset road condition receives, through straight-line transmission, a broadcast signal transmitted by a satellite is relatively low. In other words, positioning accuracy of the first location obtained through positioning by the electronic device on the second road (namely, the road with low positioning accuracy) that meets the preset road condition is relatively low. Therefore, when an electronic device (for example, the mobile phone 410) is located on the road with low positioning accuracy, the method in this embodiment of this application may be performed to effectively improve positioning accuracy of the electronic device.

It should be emphasized that the road attribute information that is of the first grid and that is included in the grid data of the first grid exists for the road with low positioning accuracy (namely, the second road that meets the preset road condition). Specifically, the road attribute information of a first grid includes road indication information. The road indication information is used to indicate whether the first grid is on a second road. If the road indication information of the first grid indicates that the first grid is on a second road, the road attribute information of the first grid may further include road data of the second road on which the first grid is located. The road data of the second road may include a road identifier, road start point coordinates, road width information, road direction information, and the like.

To determine, through accurate positioning, whether the mobile phone 410 is located on a road and on which side the mobile phone 410 is located, the mobile phone 410 may determine, based on road data corresponding to road identifiers of roads on which candidate positioning locations in the plurality of candidate positioning locations, a side that is of a road centerline of a positioned road and on which the mobile phone 410 is located. The positioned road is a road on which the mobile phone 410 is located.

Figure 18A:
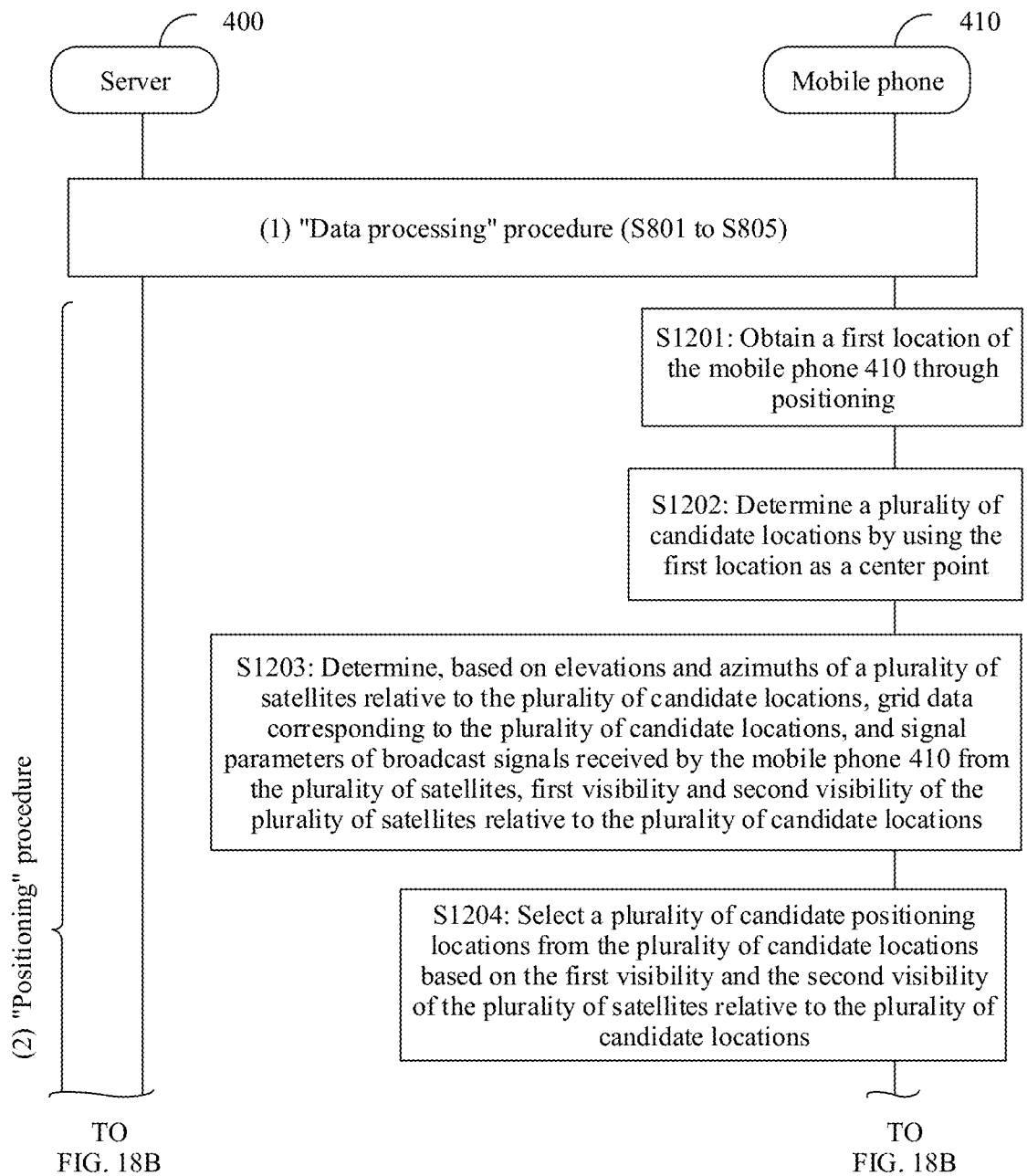
FIG. 18A and FIG. 18B are a flowchart of another positioning method according to an embodiment of this application.
Figure 18B:
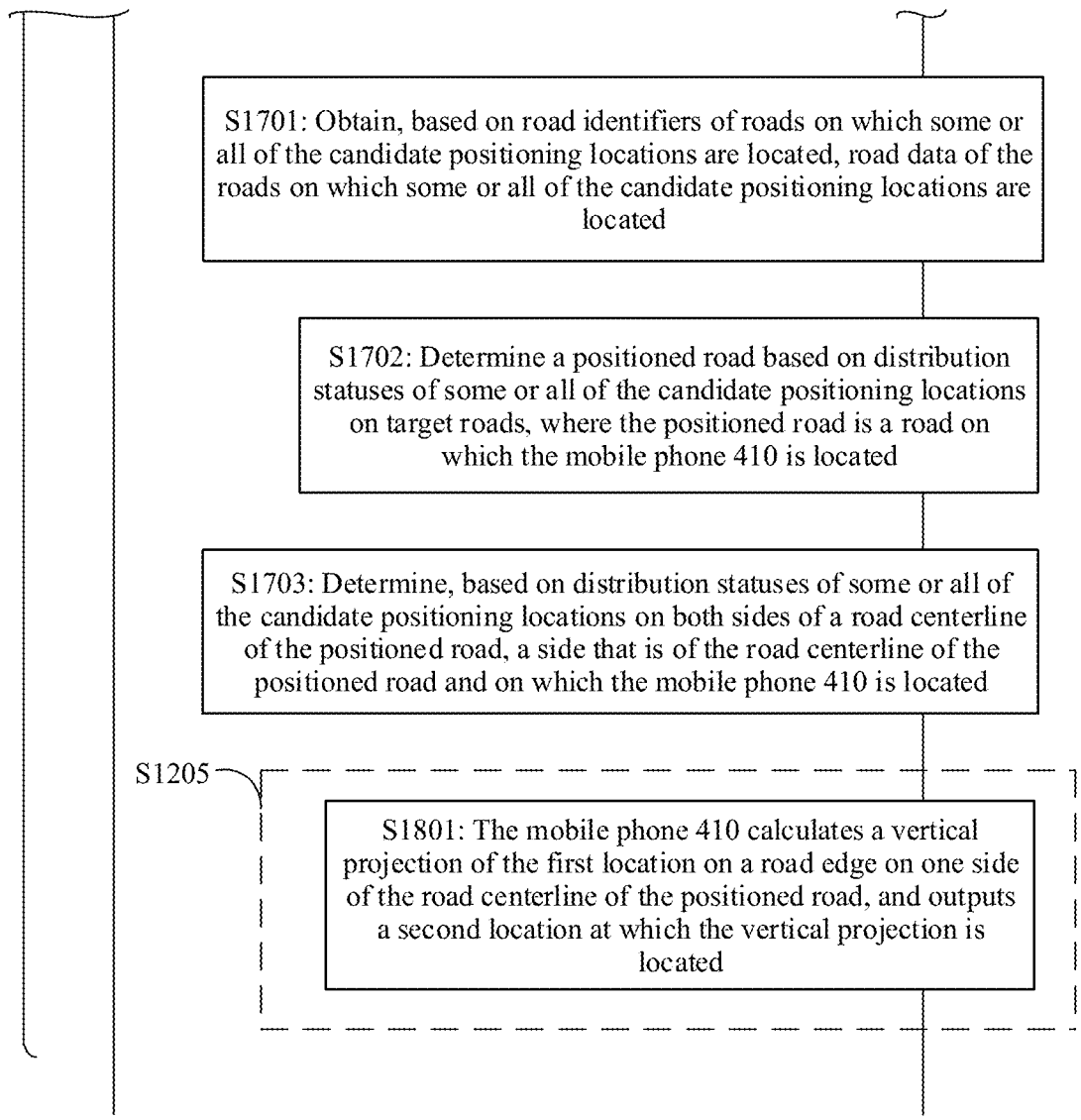

As shown in FIG. 18B, after S1204 shown in FIG. 8B, the method in this embodiment of this application may further include S1701 to S1703. As shown in FIG. 18B, S1205 shown in FIG. 8B may be replaced with S1801.

S1701: The mobile phone 410 obtains, based on road identifiers of roads on which some or all of the candidate positioning locations are located, road data of the roads on which some or all of the candidate positioning locations are located.

It may be understood that some of the plurality of candidate positioning locations may be located on a road while other candidate positioning locations may be located off the road. Certainly, the plurality of candidate positioning locations may all be located on the road. Alternatively, all the candidate positioning locations may be located off the road.

It should be noted that, in this embodiment of this application, during determining a side of the road centerline of the positioned road on which the mobile phone 410 is located, the mobile phone 410 may use the road data corresponding to the road identifiers of roads on which some or all of the candidate positioning locations are located.

In this embodiment of this application, the mobile phone 410 may first determine candidate positioning locations that are located on the road, and then obtain road data of target roads on which some or all of the candidate positioning locations (namely, the foregoing some or all of the candidate positioning locations) obtained through determining are located. For example, the mobile phone 410 may perform S(a) to S(c), to obtain the road data of the target roads.

S(a): The mobile phone 410 determines road attribute information of a candidate positioning location based on location information (for example, longitude and latitude coordinates) of the candidate positioning location and location information (for example, latitude and longitude coordinates) of the at least one first grid.

The mobile phone 410 may search the at least one first grid for a first grid whose longitude and latitude coordinates are closest to the longitude and latitude coordinates of the candidate positioning location. The mobile phone 410 may determine road attribute information of the first grid obtained through searching as the road attribute information corresponding to the candidate positioning location.

S(b): The mobile phone 410 determines, based on the road attribute information corresponding to the candidate positioning location, whether the candidate positioning location is located on a road.

The road attribute information includes road indication information. The road indication is used to indicate that the first grid (for example, a first point of the first grid) is located on a road or off a road. Specifically, the mobile phone 410 may determine, based on the road indication information in the road attribute information corresponding to the candidate positioning location, whether the candidate positioning location is located on a road.

Specifically, if the road indication information indicates that the candidate positioning location is located on a road, the road attribute information corresponding to the candidate positioning location further includes road data of the corresponding road, and the mobile phone 410 may perform S(c). If the road indication information indicates that the candidate positioning location is outside the road, the road attribute information corresponding to the candidate positioning location does not include the road data.

S(c): The mobile phone 410 obtains the road data of the target roads on which some or all of candidate positioning locations are located.

Figure 17:
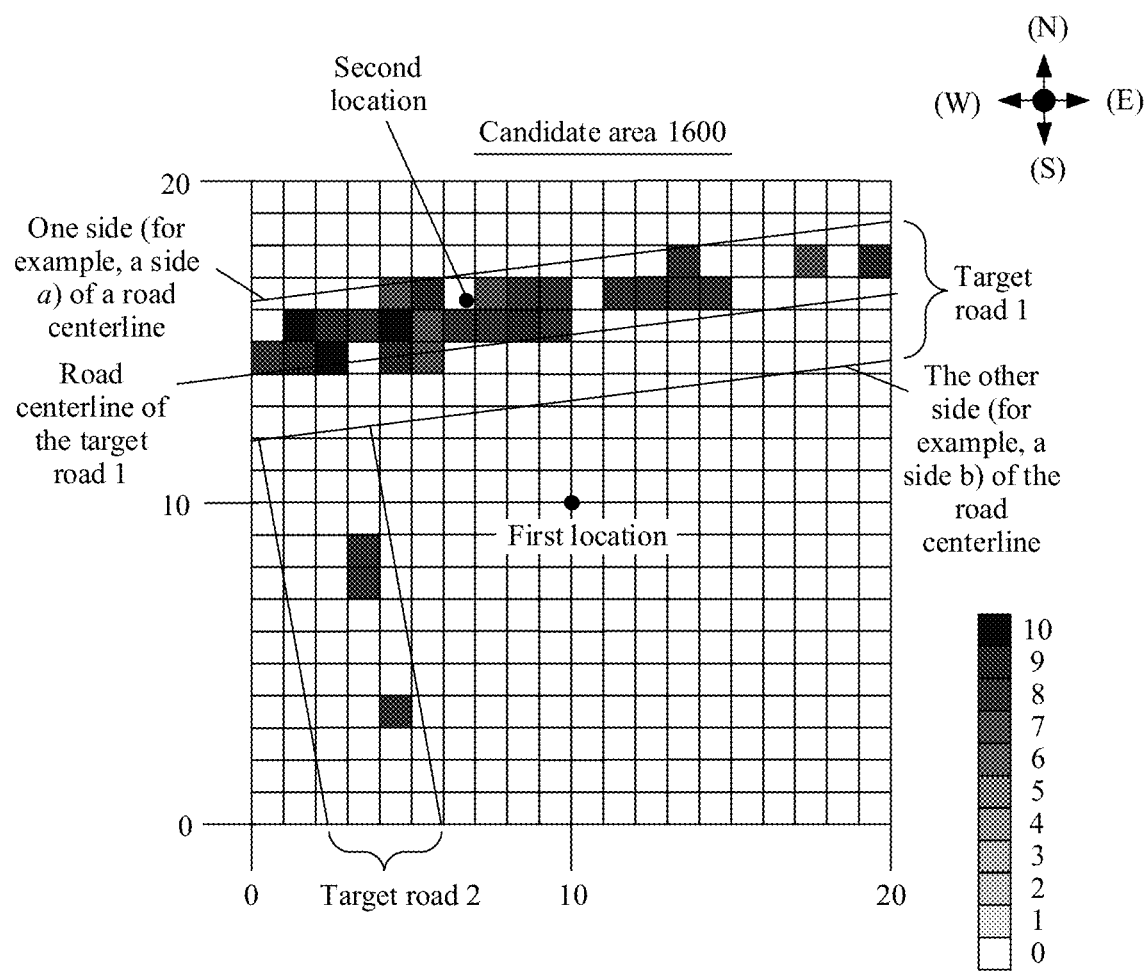
FIG. 17 is a diagram of a positioning principle according to an embodiment of this application.

For example, after performing S(a) and S(b) for some or all of the candidate positioning locations shown in FIG. 16B, the mobile phone 410 may obtain the road data of the target roads on which some or all of the candidate positioning locations are located. For example, as shown in FIG. 17, the mobile phone 410 may determine that a target road 1 and a target road 2 are roads on which some or all of the candidate positioning locations are located.

S1702: The mobile phone 410 determines a positioned road based on distribution statuses of some or all of the candidate positioning locations on the target roads. The positioned road is a road on which the mobile phone 410 is located.

For example, the mobile phone 410 may determine, as the positioned road, a target road on which a larger quantity of candidate positioning locations are distributed in the foregoing target roads. For example, the target road 1 shown in FIG. 17 is the positioned road of the mobile phone 410.

S1703: The mobile phone 410 determines, based on distribution statuses of some or all of the candidate positioning locations on both sides of a road centerline of the positioned road, a side that is of the road centerline of the positioned road and on which the mobile phone 410 is located.

A quantity of candidate positioning locations distributed on one side of the road centerline of the positioned road is greater than a quantity of candidate positioning locations distributed on the other side of the road centerline. One side and the other side of a road centerline of a road are distributed on both sides of a road centerline of the road. As shown in FIG. 17, a quantity of candidate positioning locations distributed on one side (for example, a side a) of a road centerline of the target road 1 (namely, the positioned road) is greater than a quantity of candidate positioning locations distributed on the other side (for example, a side b) of the road centerline. The mobile phone 410 may determine that the mobile phone 410 is located on a side (for example, the side a) of the road centerline of the target road 1 shown in FIG. 17.

By using the method in this embodiment of this application, the mobile phone 410 can improve positioning accuracy of the mobile phone 410, and can accurately locate a side of a road on which the mobile phone 410 is located. In this way, the following problem in some scenarios can be avoided: Another user cannot find the user of the mobile phone 410 in a timely manner because a side of the road on which the mobile phone 410 is located cannot be accurately located. For example, in a Didi taxi scenario, if a mobile phone of a taxi-hailing customer is located on the east side of a north-south road, and positioning of the mobile phone of the taxi-hailing customer shows that the mobile phone is located on the west side of the road, it is difficult for a Didi driver to pick up the taxi-hailing customer on time based on the positioning. However, according to the method in this embodiment of this application, a side of a road on which the mobile phone of the taxi-hailing customer is located can be determined, so that use experience of the taxi-hailing customer can be improved.

S1801: The mobile phone 410 calculates a vertical projection of the first location on a road edge on one side of the road centerline of the positioned road, and output a second location at which the vertical projection is located.

Figure 19:
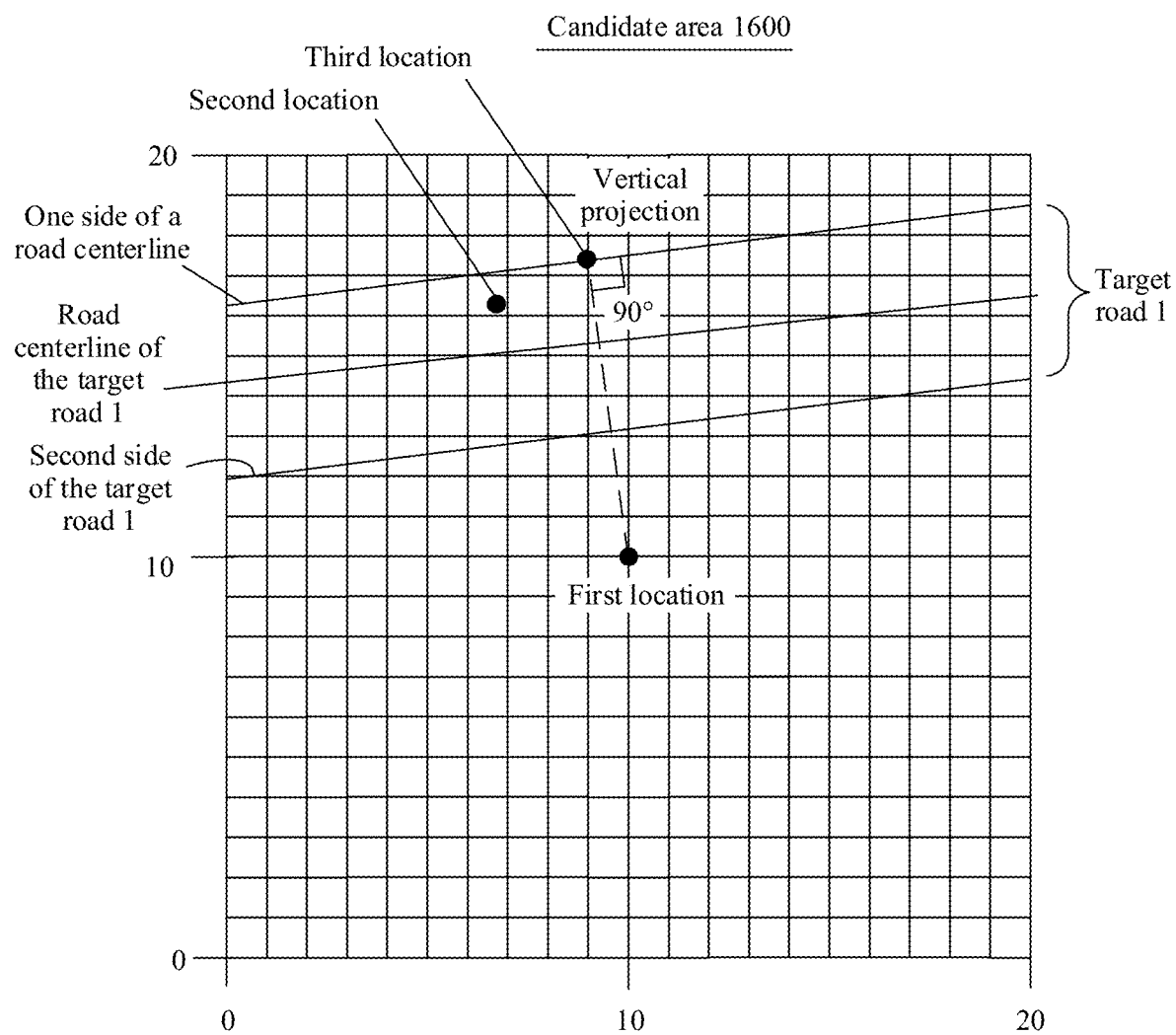
FIG. 19 is a diagram of a positioning principle according to an embodiment of this application.

For example, with reference to FIG. 17, as shown in FIG. 19, the mobile phone 410 may calculate the vertical projection of the first location on a road edge on one side of a road centerline of the target road 1 (namely, the positioned road), and output the second location at which the vertical projection is located. The second location shown in FIG. 19 may be obtained by modifying the first location.

In this embodiment of this application, the mobile phone 410 accurately locates a side of a road on which the mobile phone 410 is located, and may further correct the first location of the mobile phone 410 based on relative locations of the mobile phone 410 and the road on which the mobile phone 410 is located (that is, on a first side of the positioned road on which the mobile phone 410 is located), to obtain the second location. The second location is determined with reference to an obstruction (for example, a building) around the first location and the positioned road of the mobile phone 410, and the relative locations of the mobile phone 410 and the positioned road (that is, one side of the positioned road on which the mobile phone 410 is located). Therefore, compared with the first location of the mobile phone 410, the second location is comparatively close an actual location of the mobile phone 410. In other words, positioning accuracy of the mobile phone 410 can be improved according to the method in this embodiment of this application.

In Case (2), the second electronic device may be a device with a relatively small storage space and a relatively weak computing capability. For example, the second electronic device may be the wearable device 420 shown in FIG. 4. The first electronic device may be a device with a relatively large storage space and a relatively strong computing capability, for example, the server 400 or the mobile phone 410.

In this case, the second electronic device (for example, the wearable device 420) does not need to obtain and store the grid data of the at least one first grid in the at least one map tile from the server 400. The wearable device 420 may report, to the server 400 or the mobile phone 410, the first location obtained through positioning by the wearable device 420 and a signal parameter of a broadcast signal received by the wearable device 420. The server 400 or the mobile phone 410 corrects the first location of the wearable device 420 based on the information reported by the wearable device 420, to improve positioning accuracy of the electronic device.

In an implementation of Case (2), an example in which the server 400 is the first electronic device and the wearable device 420 is the second electronic device is used in this embodiment of this application to describe the method in this embodiment of this application.

Figure 20:
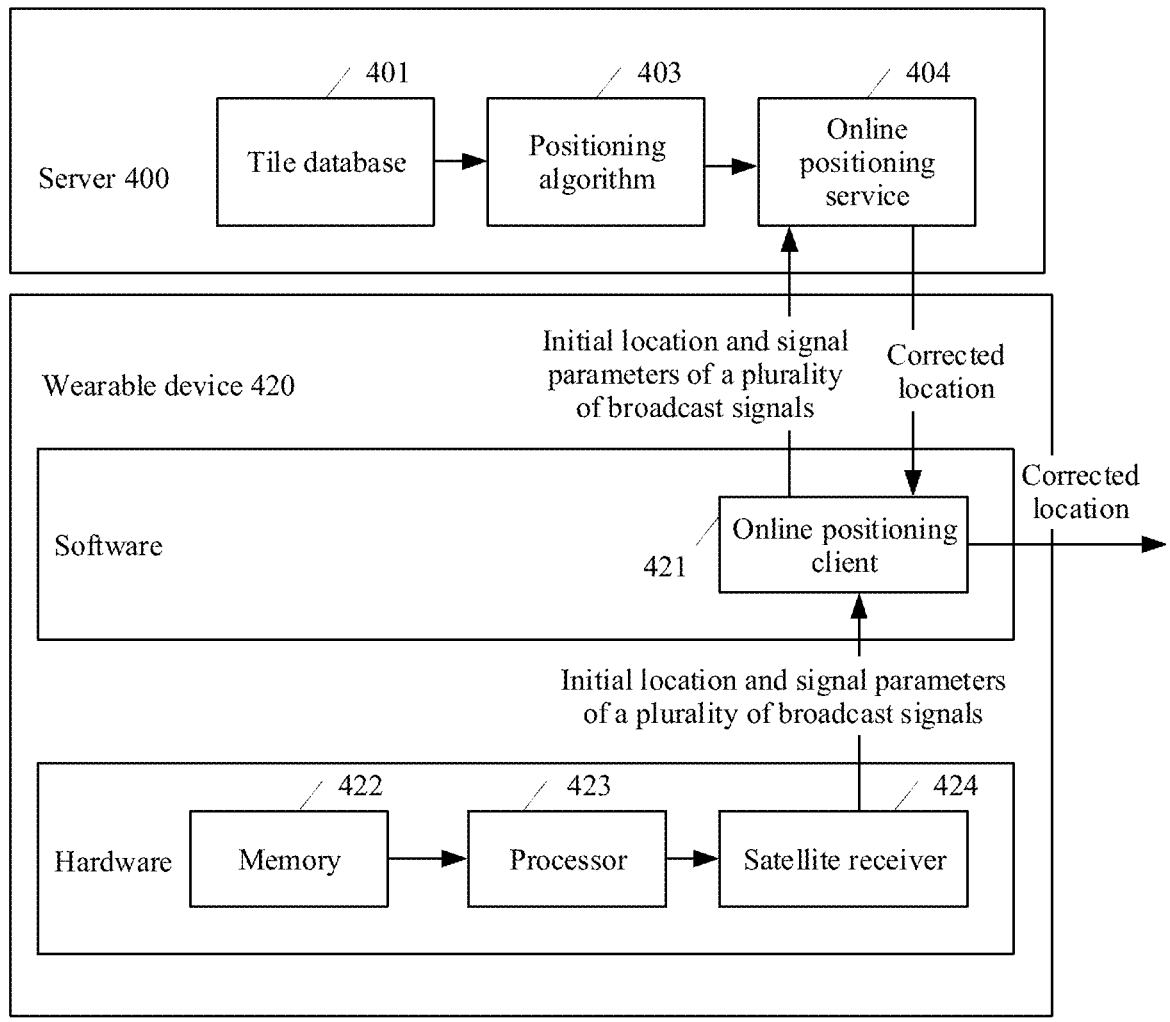
FIG. 20 is a diagram of a principle that a server assists a wearable device in performing a positioning method according to an embodiment of this application.

FIG. 20 is an example block diagram of a principle that the server 400 performs the positioning method to assist the wearable device 420 in performing positioning in an implementation of Case (2).

In an implementation of Case (2), the foregoing "data processing" procedure may include the following process shown in FIG. 20: The server 400 stores a tile database 401 (similar to the tile database 1200 shown in FIG. 12A). For example, the server 400 may perform S801 to S803 to store a tile database in the server 400.

In an implementation of Case (2), the foregoing "positioning" procedure may include the following process shown in FIG. 20: a satellite receiver 424 of the wearable device 420 may receive broadcast signals transmitted by a plurality of satellites. First, a processor 423 may execute an instruction in computer program code stored in a memory 422, and perform S1201 based on signal parameters of the broadcast signals transmitted by the plurality of satellites, to determine the first location of the mobile phone 410. The processor 423 may further send the first location and the signal parameters of the plurality of broadcast signals to the server 400 via an online positioning client 421. Then, the server 400 may provide an online positioning service 404 for the wearable device 420 by using a positioning algorithm 413. Specifically, the server 400 may correct the first location based on the local tile data 412, the first location, and the signal parameters of the plurality of broadcast signals by using the positioning algorithm 413, to obtain and output a corrected location (for example, the second location). Finally, the server 400 may indicate the corrected location to the wearable device 420 by using the online positioning service 404.

It should be noted that the block diagram of a positioning principle shown in FIG. 20 provides only a simple example of a principle that the server 400 assists the wearable device 420 in performing positioning by using an example, and does not constitute a specific limitation on the positioning method provided in this embodiment of this application.

Figure 21B:
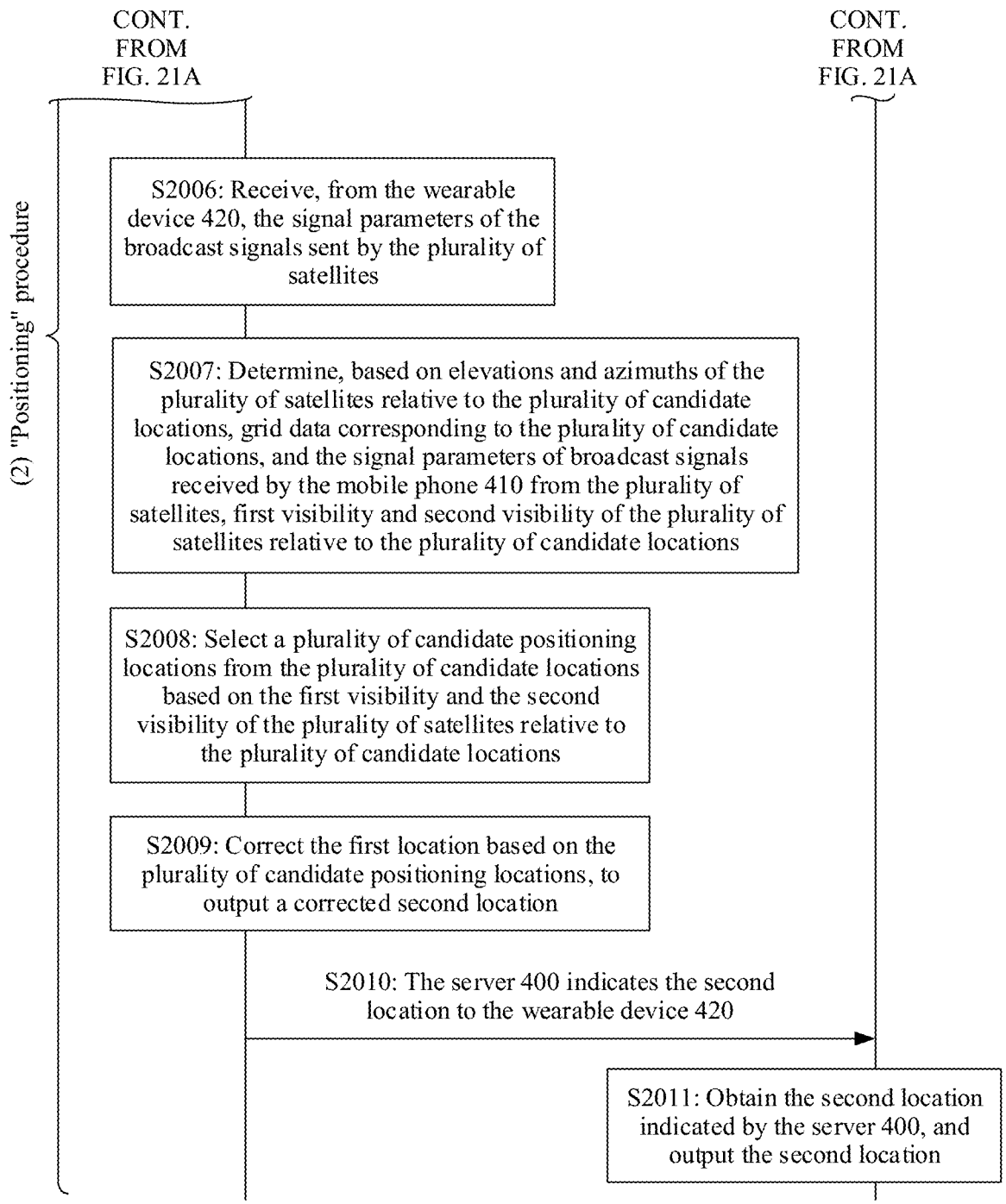

For example, as shown in FIG. 21A and FIG. 21B, in Case (2), the foregoing "positioning" procedure may specifically include S2001 to S2011.

S2001: The wearable device 420 obtains the first location of the wearable device 420 through positioning.

S2002: The wearable device 420 indicates the location of the wearable device 420 to the server 400.

S2003: The server 400 obtains the indicated first location of the wearable device 420.

S2004: The server 400 determines a plurality of candidate locations by using the first location as a center point.

S2005: The wearable device 420 sends, to the server 400, the signal parameters of the broadcast signal received by the wearable device 420 from the plurality of satellites.

S2006: The server 400 receives, from the wearable device 420, the signal parameters of the broadcast signals sent by the plurality of satellites.

S2007: The server 400 determines, based on elevations and azimuths of the plurality of satellites relative to the plurality of candidate locations, grid data corresponding to the plurality of candidate locations, and the signal parameters of the broadcast signals received by the mobile phone 410 from the plurality of satellites, first visibility and second visibility of the plurality of satellites relative to the plurality of candidate locations.

S2008: The server 400 selects a plurality of candidate positioning locations from the plurality of candidate locations based on the first visibility and the second visibility of the plurality of satellites relative to the plurality of candidate locations.

S2009: The server 400 corrects the first location based on the plurality of candidate positioning locations, to output a corrected second location.

S2010: The server 400 indicates the second location to the wearable device 420.

S2011: The wearable device 420 obtains the second location indicated by the server 400, and outputs the second location.

It should be noted that, for S2001, refer to the detailed description of S1201 in the foregoing embodiment; for S2004, refer to the detailed description of S1202; for S2007, refer to the detailed description of S1203; for S2008, refer to the detailed description of S1204; and for S2009, refer to the detailed description of S1205. Details are not described again in this embodiment of this application. In addition, for technical effects brought by performing S2001 to S2011 by the server 400 and the wearable device 420, refer to the technical effects brought by performing the positioning method by the mobile phone 410 in the foregoing embodiment. Details are not described again in this embodiment of this application.

In this embodiment of this application, compared with the mobile phone 410, the wearable device 420 has smaller storage space and a weaker computing capability. The wearable device 420 may not store tile data (namely, the grid data of the at least one first grid), and does not need to perform positioning by performing S2004 and S2007 to S2009. Instead, the server 400 performs S2004 and S2007 to S2009 to assist the wearable device 420 in positioning. In this way, even if storage space and a computing capability of the wearable device 420 are limited, positioning accuracy of the wearable device 420 may be improved according to the method in this embodiment of this application.

Figure 22A:
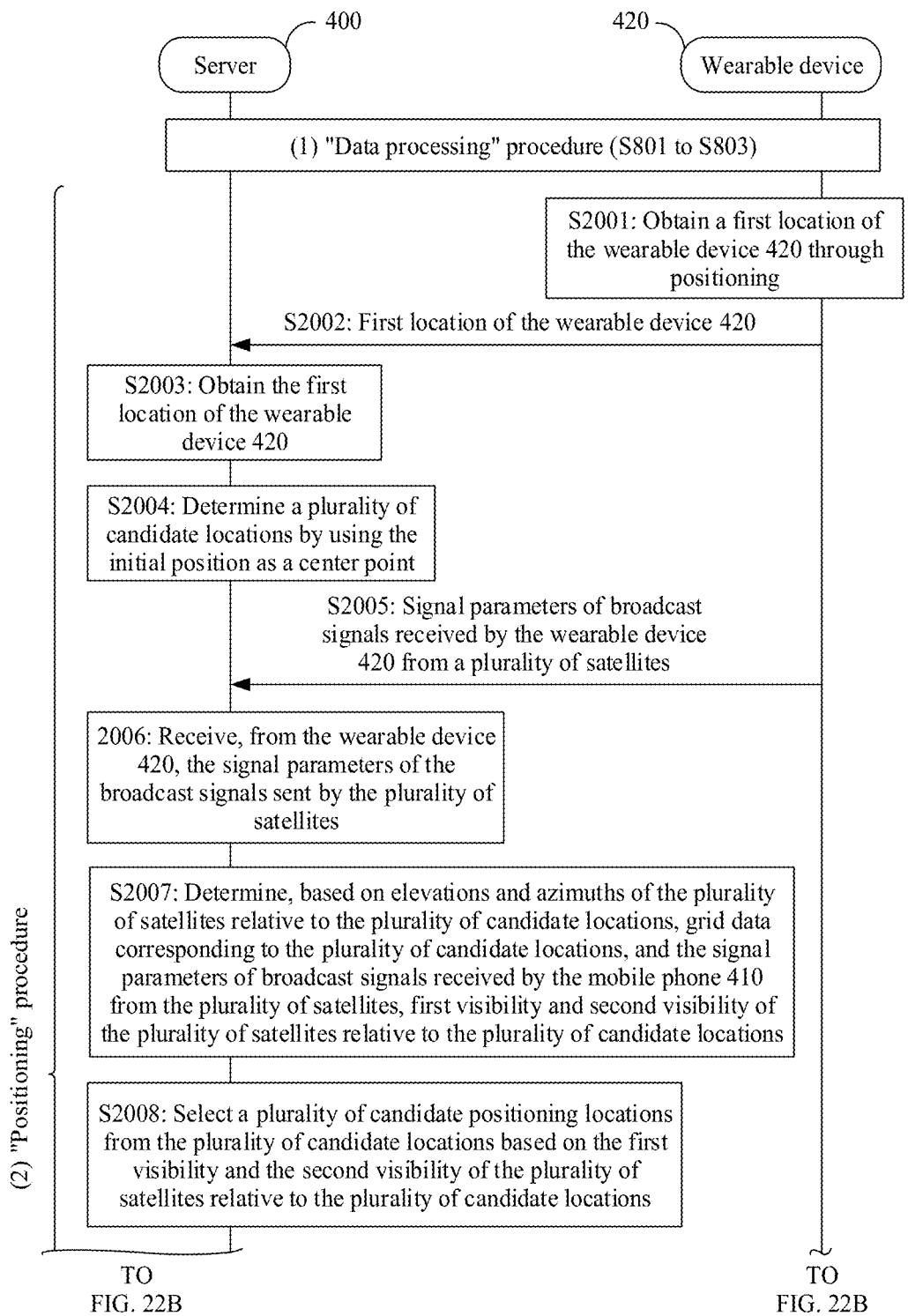
FIG. 22A and FIG. 22B are a flowchart of another positioning method according to an embodiment of this application.
Figure 22B:
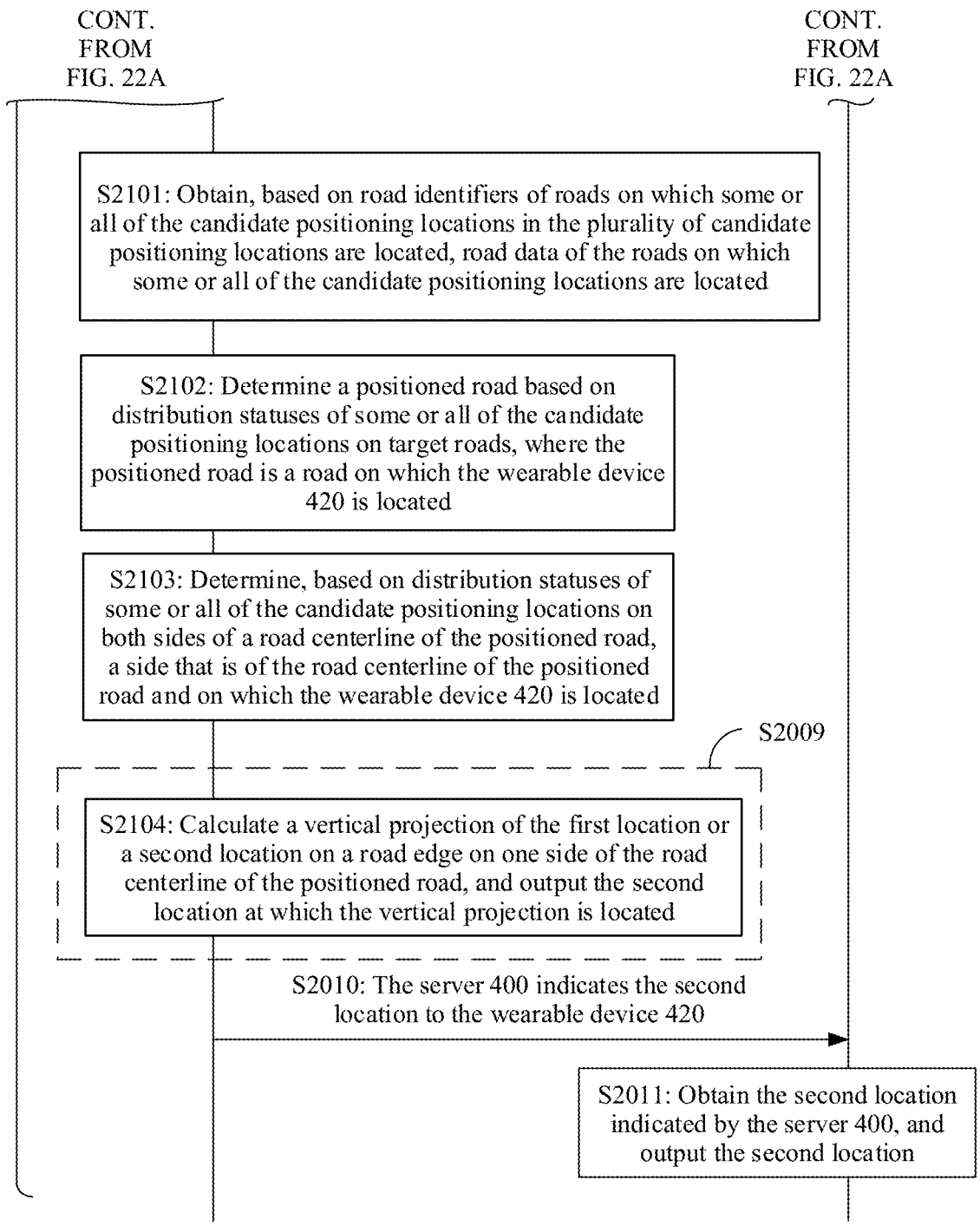

To determine, through accurately positioning, whether the wearable device 420 is located on a road and a side of the road on which the wearable device 420 is located, as shown in FIG. 22A and FIG. 22B, after S2008 shown in FIG. 21B, the method in this embodiment of this application may further include S2101 to S2104, and S2009 may be replaced with S2104.

S2101: The server 400 obtains, based on road identifiers of roads on which some or all of the candidate positioning locations in the plurality of candidate positioning locations are located, road data of the roads on which some or all of the candidate positioning locations are located.

S2102: The server 400 determines a positioned road based on distribution statuses of some or all of the candidate positioning locations on target roads. The positioned road is a road on which the wearable device 420 is located. The target road is a road on which some or all of the candidate positioning locations are located.

S2103: The server 400 determines, based on distribution statuses of some or all of the candidate positioning locations on both sides of a road centerline of the positioned road, a side that is the road centerline of the positioned road and on which the wearable device 420 is located.

S2104: The server 400 calculates a vertical projection of the first location or the second location on a road edge on one side of the road centerline of the positioned road, and outputs the second location at which the vertical projection is located.

For S2101, refer to the detailed description of S1701 in the foregoing embodiment, for S2102, refer to the detailed description of S1702 in the foregoing embodiment, for S2103, refer to the detailed description of S1703 in the foregoing embodiment, and for S2104, refer to the detailed description of S1801 in the foregoing embodiment. Details are not described again in this embodiment of this application.

Figure 23A:
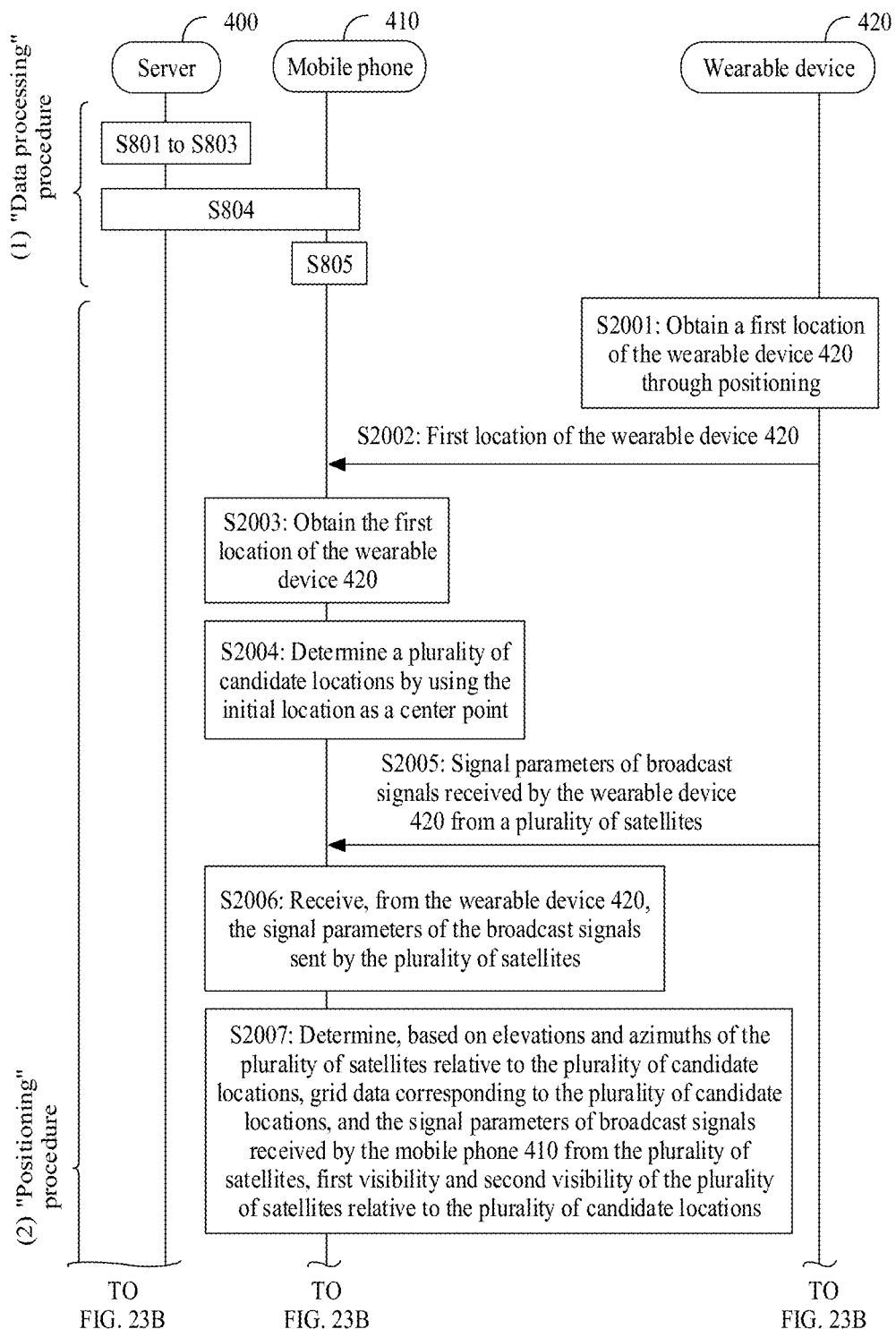

In another implementation of Case (2), the first electronic device may be the mobile phone 410, and the second electronic device may be the wearable device 420. As shown in FIG. 23A, the server 400 may perform S801 to S803 to store a tile database in the server 400. The mobile phone 410 may perform S804 and S805 to obtain the grid data of the at least one first grid in the at least one map tile. Then, the mobile phone 410 may replace the server 400 shown in FIG. 22A and FIG. 22B, and S2001 to S2009 and S2101 to S2104 may be performed by the server 400 and the wearable device 420.

In this embodiment of this application, for a device (for example, the wearable device 420) having relatively small storage space and a relatively weak computing capability, a device that has larger storage space and a stronger computing capability, for example, the server 400 or the mobile phone 410, may assist the wearable device 420 in positioning, thereby improving positioning accuracy of the wearable device 420.

Figure 24:
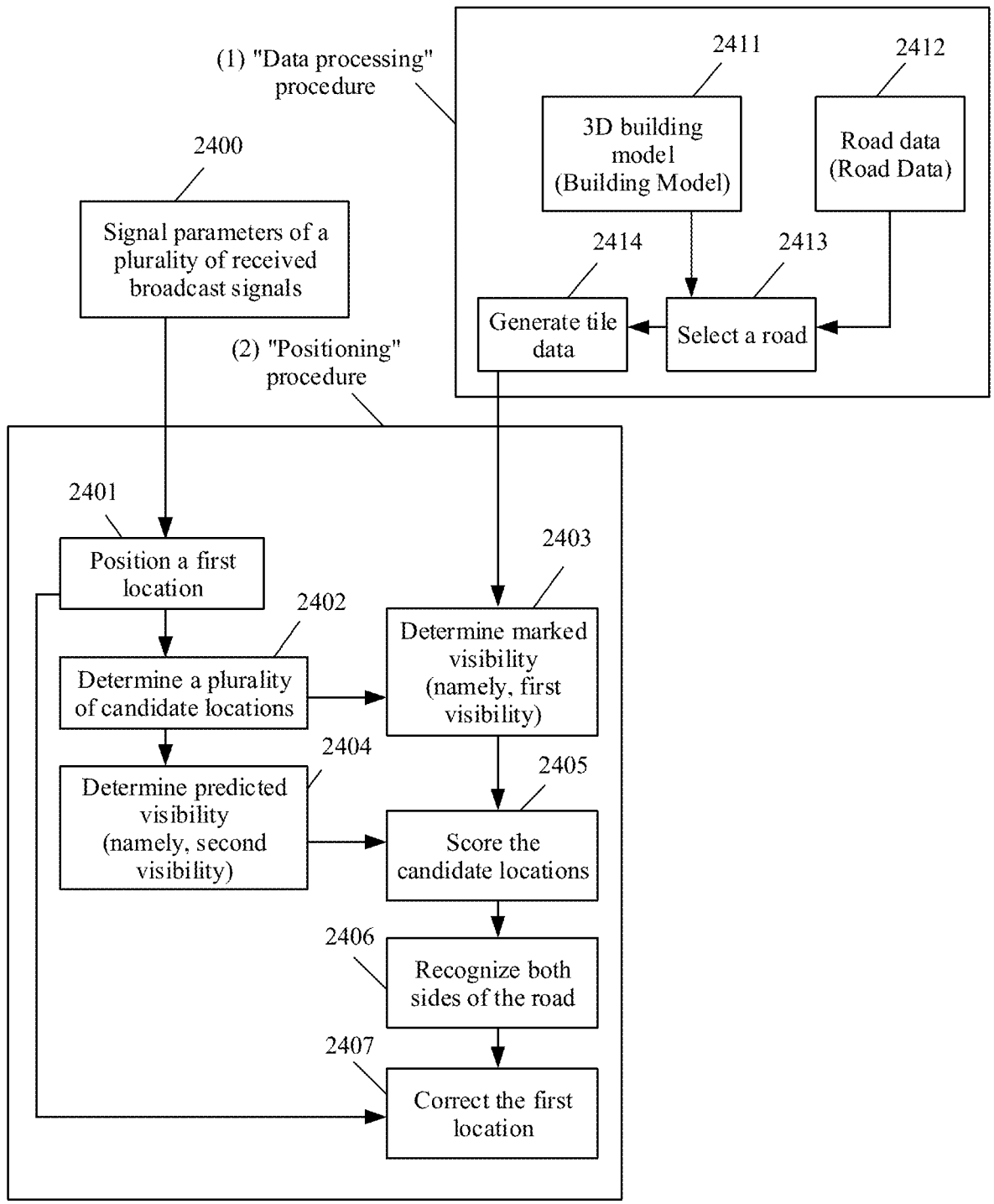
FIG. 24 is a diagram of a positioning method according to an embodiment of this application.

FIG. 24 is a simplified flowchart of a positioning method according to an embodiment of this application. As shown in FIG. 24, a "data processing" procedure in this embodiment of this application may include the following steps.

First, a first electronic device may obtain a 3D building model 2411 and road data 2412. Then, the first electronic device may perform road selection 2413 to select a road with low positioning accuracy from roads corresponding to the road data 2412. Finally, the first electronic device performs tile data generation 2414 to obtain tile data (namely, grid data of a plurality of first grids in each map tile in an $i^{th}$ layer of tile map).

For a method for obtaining the 3D building model 2411, refer to S800a and the related descriptions in the foregoing embodiment. Details are not described herein again. For detailed descriptions of the method for obtaining the road data 2412, refer to S800b and the related descriptions in the foregoing embodiment. Details are not described herein again. For detailed descriptions of performing road selection 2413, refer to S800c and S800d and the related descriptions in the foregoing embodiment. Details are not described herein again. For detailed descriptions of 2414, refer to S802 and the related descriptions in the foregoing embodiment. Details are not described herein again.

As shown in FIG. 24, before a "positioning" procedure, the first electronic device may obtain signal parameters of a plurality of broadcast signals (2400) received by a second electronic device. As shown in FIG. 24, the "positioning" procedure in this embodiment of this application may include the following steps.

First, the first electronic device may determine a first location (2401) of the second electronic device, where the first location is obtained through positioning by the second electronic device. Then, the first electronic device may determine a plurality of candidate locations (that is, perform 2402) based on the first location 2401. Specifically, the first electronic device may determine a candidate area based on the first location 2401, and then determine a plurality of candidate locations (that is, perform 2402) from the candidate area. Then, the first electronic device may determine marked visibility (that is, perform 2403) of the plurality of candidate locations based on tile data obtained in 2414 and elevations and azimuths of a plurality of satellites relative to the plurality of candidate locations. The first electronic device may further determine predicted visibility (that is, perform 2404) of the plurality of candidate locations based on the signal parameters of the broadcast signals in 2400. The first electronic device may further score the candidate location (that is, perform 2405) based on predicted visibility and marked visibility of each candidate location. The first electronic device may select a plurality of candidate positioning locations from the plurality of candidate locations based on scores of the candidate locations. The first electronic device may further obtain road data of a target road on which each candidate positioning location is located; determine a positioned road based on distribution statuses of the plurality of candidate positioning locations on the target road; and determine, based on distribution statuses of the plurality of candidate positioning locations on both sides of the positioned road, the first side that is of the positioned road (that is, perform 2406: road side identification) and on which the second electronic device is located. Finally, the first electronic device may correct the first location (that is, perform 2407: first location correction) based on the positioned road.

For detailed descriptions of determining the first location 2401, refer to S1201 or S2001. For detailed descriptions of 2402, refer to S1202, S1202a, S1202b, or S2004. For detailed descriptions of 2403 and 2404, refer to S1203 or S2007. Specifically, for detailed descriptions of 2403, refer to the foregoing S(1) to S(6). For detailed descriptions of 2405, refer to S1204 or S2008. For detailed descriptions of 2406, refer to S1701 to S1703. For detailed descriptions of 2407, refer to S1801. Details are not described again in this embodiment of this application.

Figure 25:
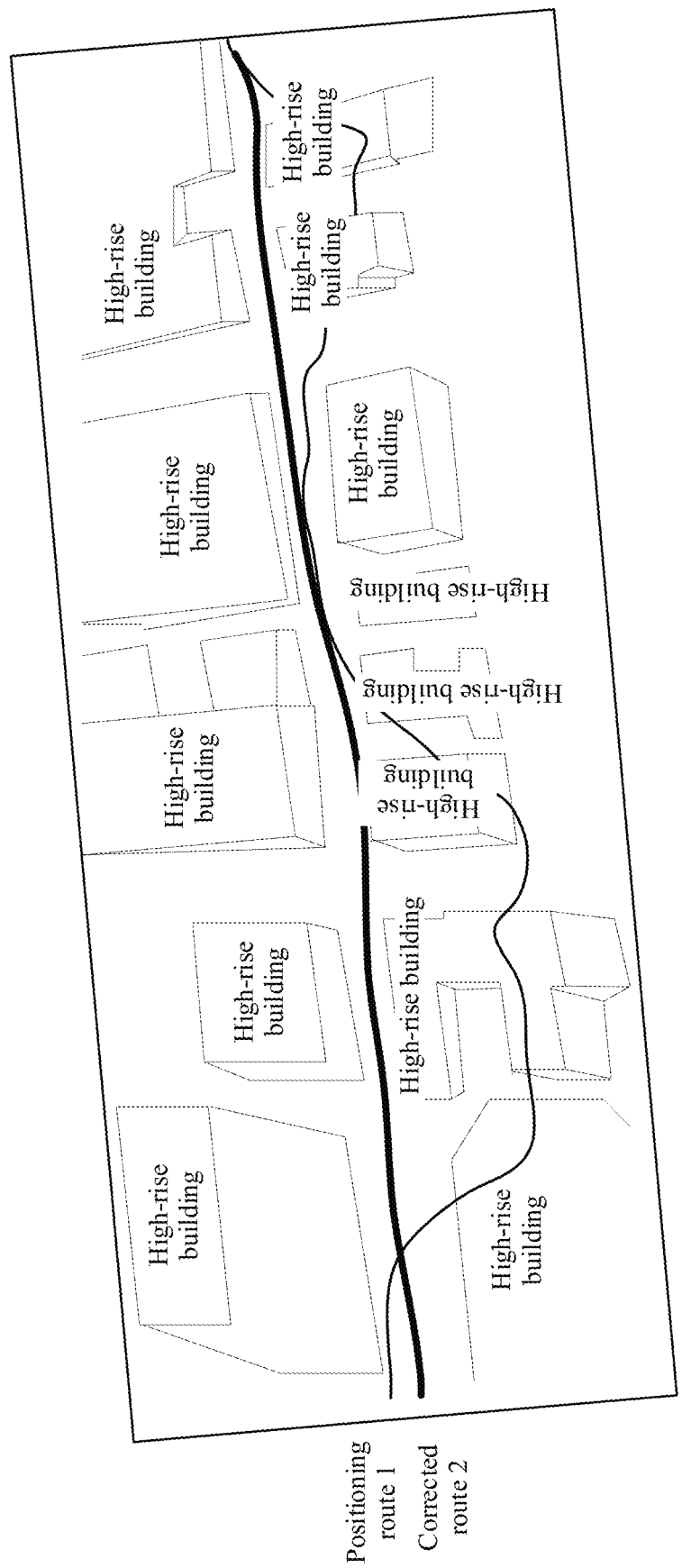
FIG. 25 is a diagram of an example of a positioning effect of a positioning method according to an embodiment of this application.

FIG. 25 is a diagram of positioning routes before and after the method in this embodiment of this application is performed in a scenario (for example, a vehicle-mounted scenario) in which an electronic device (for example, a mobile phone) moves at a high speed on a road.

A positioning route 1 shown in FIG. 25 includes a plurality of first locations obtained through positioning in the foregoing high-speed motion scenario before the mobile phone performs the method in this embodiment of this application. As shown in FIG. 25, a plurality of first locations included in the positioning route 1 are far away from a road. A corrected route 2 shown in FIG. 25 includes a plurality of second locations obtained through correcting the plurality of first locations on the route 1 after the mobile phone performs the method in this embodiment of this application. As shown in FIG. 25, the plurality of second locations included in the positioning route 2 are located on the road after correction. In addition, different second locations are corrected to different sides of the road.

It can be learned from the foregoing test scenario that, by using the method in this embodiment of this application, positioning accuracy of the electronic device can be improved, and a side of the road on which the electronic device is located can be accurately located.

It may be understood that, to implement the foregoing function, the first electronic device (for example, the mobile phone 410 or the server 400) includes a corresponding hardware structure and/or software module for performing each function. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the electronic device (namely, the first electronic device, for example, the mobile phone 410 or the server 400) may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example, and is merely logical function division. During actual implementation, another division manner may be used.

Figure 26:
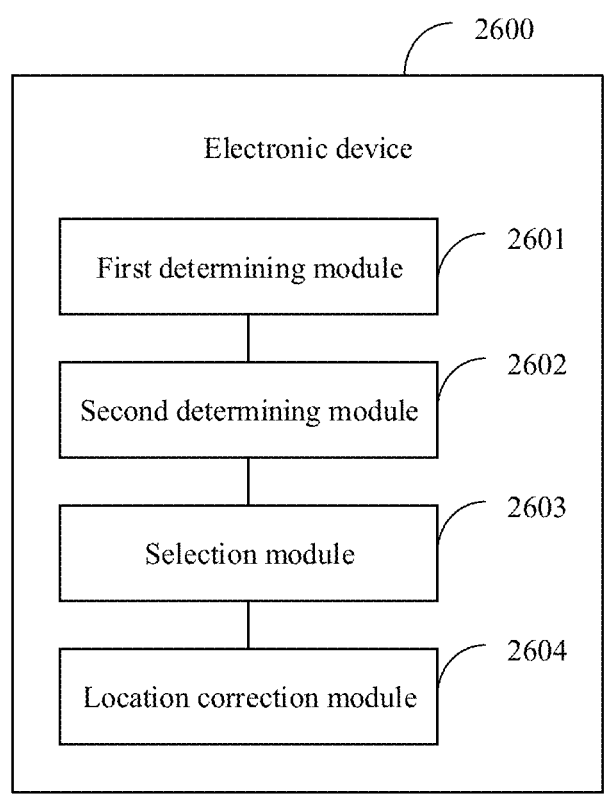
FIG. 26 is a diagram of an electronic device according to an embodiment of this application.

When an integrated unit is used, FIG. 26 is a diagram of the electronic device in the foregoing embodiments. A electronic device 2600 includes a first determining module 2601, a second determining module 2602, a selection module 2603, and a location correction module 2604.

The first determining module 2601 is configured to support the electronic device in performing S1201 and S2003 in the foregoing method embodiments, and/or another process of the technology described in this specification. The second determining module 2602 is configured to support the electronic device in performing S1202, S1202a and S1202b, and S2004 in the foregoing method embodiments, and/or another process of the technology described in this specification. The selection module 2603 is configured to support the electronic device in performing S1203 and S1204, S(1) to S(6), S2007, and S2008 in the foregoing method embodiments, and/or another process of the technology described in this specification. The location correction module 2604 is configured to support the electronic device in performing S1205, S1801, S2009, and S2104 in the foregoing method embodiments, and/or another process of the technology described in this specification.

Further, the electronic device 2600 may further include a third determining module. The third determining module is configured to support the electronic device in performing S1701 to S1703, S(a) to S(c), and S2101 to S2103 in the foregoing method embodiments, and/or another process of the technology described in this specification.

Further, the electronic device 2600 may further include a receiving module and a storage module. The receiving module is configured to support the electronic device in performing S804 in the foregoing method embodiments, and/or another process of the technology described in this specification. The storage module is configured to support the electronic device in performing S805 in the foregoing method embodiments, and/or is configured to perform another process of the technology described in this specification.

Further, the electronic device 2600 may further include an obtaining module and a storage module. The obtaining module is configured to support the electronic device in performing S801 and S802 in the foregoing method embodiments, and/or another process of the technology described in this specification. The storage module is configured to support the electronic device in performing S803 in the foregoing method embodiments, and/or is configured to perform another process of the technology described in this specification.

When an integrated unit is used, the first determining module 2601, the second determining module 2602, the selection module 2603, the location correction module 2604, the third determining module, the obtaining module, and the like may be integrated into one processing module for implementation. The processing module may be a processor or a controller, for example, may be a CPU, a general purpose processor, a DSP, an application-specific integrated circuit (ASIC), a field programmable gate array (FPGA), another programmable logic component, a transistor logic device, a hardware component, or any combination thereof. The processing module may implement or execute various example logical blocks, modules, and circuits described with reference to content disclosed in this application. The processor may alternatively be a combination implementing a computing function, for example, a combination of one or more microprocessors or a combination of a DSP and a microprocessor. The receiving module may be a communications module of an electronic device (for example, the mobile phone 410), for example, an RF circuit, a Wi-Fi™ module, or a Bluetooth™ module.

For example, when the processing module is the processor 510 shown in FIG. 5, the storage module is the internal memory 521 shown in FIG. 5, and the communications module is the wireless communications module 560 shown in FIG. 5, the electronic device provided in this application may be the electronic device 500 (for example, a mobile phone) shown in FIG. 5. The wireless communications module 560 may include a radio frequency circuit, and a Wi-Fi™ module and a Bluetooth™ module. The communications modules such as the radio frequency circuit, the Wi-Fi™ module, and the Bluetooth module may be collectively referred to as a communications interface. The processor, the communications interface, and the memory may be coupled together by using a bus.

An embodiment of this application further provides a chip system, and the chip system is applied to the first electronic device. The first electronic device positions a second electronic device. The chip system includes one or more interface circuits and one or more processors. The interface circuit and the processor are interconnected by using a cable. The interface circuit is configured to receive a signal from a memory of the first electronic device, and send the signal to the processor. The signal includes computer instructions stored in the memory. When the processor executes the computer instructions, the first electronic device performs the method in the foregoing method embodiments.

An embodiment of this application further provides a computer storage medium. The computer storage medium includes computer instructions. When the computer instructions are run on a first electronic device, the first electronic device is enabled to perform the method in the foregoing method embodiment.

An embodiment of this application further provides a computer program product. When the computer program product runs on a computer, the computer is enabled to perform the method provided in the foregoing method embodiment.

The electronic device, the chip system, the computer storage medium, and the computer program product provided in this application are all configured to perform the corresponding methods provided in the foregoing descriptions. Therefore, for beneficial effects that can be achieved by the electronic device, the chip system, the computer storage medium, and the computer program product, refer to the beneficial effects of the corresponding methods provided in the foregoing descriptions. Details are not described herein again.

According to the descriptions of the foregoing implementations, a person skilled in the art may clearly understand that, for the purpose of convenient and brief description, the foregoing division into the functional modules is merely used as an example for description. During actual application, the foregoing functions may be allocated to different functional modules for implementation based on a requirement. In other words, an internal structure of an apparatus is divided into different functional modules, to implement all or some of the functions described above.

In the several embodiments provided in this application, it should be understood that the disclosed apparatus and method may be implemented in other manners. For example, the described apparatus embodiments are merely examples. For example, the division into the modules or units is merely logical function division and there may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may or may not be physically separate, and components displayed as units may be one or more physical units, that is, may be located in one place, or may be distributed on a plurality of different places. Some or all of the units may be selected based on an actual requirement to achieve the objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A positioning method used by a first electronic device to position a second electronic device, the second electronic device receiving broadcast signals transmitted by a plurality of satellites, the method comprising:
   obtaining, by the first electronic device, a first location of the second electronic device;
   determining, by the first electronic device, a plurality of candidate locations using the first location as a center point;
   selecting, by the first electronic device, a plurality of candidate positioning locations from the plurality of candidate locations based on elevations and azimuths of the plurality of satellites relative to the plurality of candidate locations, grid data corresponding to the plurality of candidate locations, and signal parameters of the broadcast signals received by the second electronic device from the plurality of satellites, each grid data corresponding to each candidate location comprising location information and a sky blocking curve, a sky blocking curve of one candidate location indicating candidate elevations and candidate azimuths of a plurality of obstructions around the one candidate location; and
   correcting, by the first electronic device, the first location of the second electronic device based on the location information of the plurality of candidate positioning locations and outputting a corrected second location of the second electronic device.

2. The method according to claim 1, wherein the grid data corresponding to the plurality of candidate positioning locations further comprises road identifiers of roads on which candidate positioning locations in the plurality of candidate positioning locations are located, the method further comprising:
   determining, by the first electronic device, a side of a road centerline of a positioned road on which the second electronic device is located, the road data comprising at least one of: road start point coordinates, road width information, or road direction information, the determining being based on first road data corresponding to first road identifiers of first roads on which at least some candidate positioning locations are located.

3. The method according to claim 2, wherein the determining the side of the road centerline of the positioned road on which the second electronic device is located comprises:
   obtaining, by the first electronic device, the road data of the roads on which the at least some candidate positioning locations are located, the obtaining being based on the first road identifiers of the first roads on which the at least some candidate positioning locations are located;
   determining, by the first electronic device, the positioned road based on distribution statuses of the at least some candidate positioning locations on a target road, the target road comprising a road on which the at least some candidate positioning locations are located; and determining, by the first electronic device, the side of the road centerline of the positioned road on which the second electronic device is located, the determining being based on the distribution statuses of the at least some candidate positioning locations on both sides of the road centerline of the positioned road.

4. The method according to claim 2, wherein the correcting, by the first electronic device, the first location to output the corrected second location comprises:

calculating, by the first electronic device, a vertical projection of the first location on a road edge on one side of the road centerline; and outputting the second location at which the vertical projection is located.

5. The method according to claim 1, wherein the selecting, by the first electronic device, the plurality of candidate positioning locations comprises:

selecting, by the first electronic device, the plurality of candidate positioning locations based on first visibilities and second visibilities of the plurality of satellites relative to the plurality of candidate locations;

wherein a first visibility of one satellite relative to one candidate location indicates that the one satellite is a line-of-sight satellite or a non-line-of-sight satellite of the one candidate location, and the first visibility is related to a sky blocking curve of the one candidate location and an elevation and azimuth of the one satellite relative to the one candidate location; and wherein a second visibility of the one satellite relative to the one candidate location indicates a probability that the one satellite is a line-of-sight satellite of the one candidate location, and the second visibility is related to the signal parameters of the broadcast signals received by the second electronic device from the plurality of satellites.

6. The method according to claim 5, wherein the plurality of candidate positioning locations comprise a candidate location at which a quantity of satellites that meet a preset condition is greater than a preset quantity threshold; or the plurality of candidate positioning locations comprise M candidate locations in the plurality of candidate locations, wherein M>2, M is a positive integer, a quantity of satellites that meet the preset condition in the M candidate locations is greater than another quantity of satellites that meet the preset condition at another candidate location, and the another candidate location is other than the M candidate locations in the plurality of candidate locations; and a satellite that meets the preset condition is a satellite whose first visibility and second visibility match.

7. The method according to claim 5, wherein before the selecting, by the first electronic device, the plurality of candidate positioning locations, the method further comprises:

determining, by the first electronic device for each satellite and each candidate location and based on the elevation and azimuth of the one satellite relative to the one candidate location and grid data corresponding to the one candidate location, the first visibility of the one satellite relative to the one candidate location, to obtain first visibility of each satellite relative to the each candidate location; and determining, by the first electronic device for the each satellite and based on a signal parameter of a second broadcast signal received by the second electronic device from the one satellite, a second visibility of the one satellite relative to the each candidate location, to obtain a second visibility of each satellite relative to the each candidate location.

8. The method according to claim 7, wherein the determining, based on the elevation and azimuth of the one satellite relative to the one candidate location and the grid data corresponding to the one candidate location, the first visibility of the one satellite relative to the one candidate location comprises:

obtaining, by the first electronic device, a first azimuth and a first elevation of the one satellite relative to the one candidate location;

determining, by the first electronic device, a one candidate sky blocking curve of the one candidate location based on one candidate location information of the one candidate location;

obtaining, by the first electronic device, a second elevation from the one candidate sky blocking curve of the one candidate location based on the first azimuth, wherein the second elevation is an elevation of a first obstruction relative to the one candidate location, and the first azimuth is an azimuth of the first obstruction relative to the one candidate location; and determining, by the first electronic device, that the first visibility of the one satellite relative to the one candidate location indicates that the one satellite is a line-of-sight satellite if the first elevation is greater than the second elevation; or determining, by the first electronic device, that the first visibility of the one satellite relative to the one candidate location indicates that the one satellite is a non-line-of-sight satellite if the first elevation is less than or equal to the second elevation.

9. The method according to claim 7, wherein the first electronic device stores model code of a preset artificial intelligence (AI) model;

the preset AI model determining, based on a received broadcast signal parameter of a broadcast signal received by an electronic device at any location from any satellite, second visibility of the any satellite relative to the any location; and the determining, based on a second broadcast signal parameter of a second broadcast signal received by the second electronic device from the one satellite, second visibility of the one satellite relative to each candidate location comprises:

running, by the first electronic device, the model code of the preset AI model using the signal parameter of the broadcast signal received by the second electronic device from the one satellite as an input; and determining, using the preset AI model, the second visibility of the one satellite relative to the each candidate location.

10. The method according to claim 1, wherein the method further comprises:

receiving, by the first electronic device, at least one first grid data of at least one first grid from a server, the at least one first grid indicating a geographic area including the first location, a first grid area of each first grid being less than a preset area threshold, and the at least one first grid data of the at least one first grid comprises location information and an at least one first sky blocking curve of the at least one first grid; and storing, by the first electronic device, the at least one first grid data of the at least one first grid; wherein a one candidate grid data corresponding to the one candidate location is a closest first grid data of a first grid closest to the one candidate location.

11. The method according to claim 1, wherein the method further comprises:
obtaining, by the first electronic device, an $i^{th}$ layer of tile map in N layers of tile maps, wherein the $i^{th}$ layer of tile map comprises a plurality of map tiles, $2 < i < N$, and both i and N are positive integers;
obtaining, by the first electronic device, at least one first grid data of at least one first grid in at least one map tile in the $i^{th}$ layer of tile map, wherein the at least one first grid of the at least one map tile is at least one geographic area in a plurality of geographic areas obtained by dividing the map tile, a first grid area of each first grid is less than the preset area threshold, and one first grid data of one first grid comprises location information and a one first grid sky blocking curve of the at least one first grid; and
storing, by the first electronic device, the grid data of the at least one first grid, wherein the grid data corresponding to the one candidate location is of a first grid closest to the one candidate location.

12. The method according to claim 1, wherein the grid data corresponding to the plurality of candidate locations is comprised in data of one or more map tiles, the data of the one or more map tiles further comprises road data, and the road data comprises at least one of: road start point coordinates, road width information, or road direction information.

13. An electronic device, wherein the electronic device is a first electronic device, the first electronic device positions a second electronic device, the second electronic device receiving broadcast signals transmitted by a plurality of satellites, the electronic device comprising:
a memory storing instructions; and
at least one processor in communication with the memory, the at least one processor configured, upon execution of the instructions, to perform the following steps:
obtaining, by the first electronic device, a first location of the second electronic device;
determining, by the first electronic device, a plurality of candidate locations using the first location as a center point;
selecting, by the first electronic device, a plurality of candidate positioning locations from the plurality of candidate locations based on elevations and azimuths of the plurality of satellites relative to the plurality of candidate locations, grid data corresponding to the plurality of candidate locations, and signal parameters of the broadcast signals received by the second electronic device from the plurality of satellites, each grid data corresponding to each candidate location comprising location information and a sky blocking curve, a sky blocking curve of one candidate location indicating candidate elevations and candidate azimuths of a plurality of obstructions around the one candidate location; and
correcting, by the first electronic device, the first location of the second electronic device based on the location information of the plurality of candidate positioning locations and outputting a corrected second location of the second electronic device.

14. The electronic device according to claim 13, wherein the grid data corresponding to the plurality of candidate positioning locations further comprises: road identifiers of roads on which candidate positioning locations in the plurality of candidate positioning locations are located, and further comprising the one or more processors further executing the instructions to:
determining a side of a road centerline of a positioned road and on which the second electronic device is located, the road data comprising at least one of: road start point coordinates, road width information, or road direction information, the determining being based on road data corresponding to road identifiers of roads on which at least some candidate positioning locations are located.

15. The electronic device according to claim 14, wherein the determining the side of the road centerline of the positioned road on which the second electronic device is located comprises:
obtaining the road data of the roads on which the at least some candidate positioning locations are located, the obtaining being based on the road identifiers of the roads on which the at least some candidate positioning locations are located;
determining, by the first electronic device, the positioned road based on distribution statuses of the at least some candidate positioning locations on a target road, the target road comprising a road on which the at least some candidate positioning locations are located; and
determining the side of the road centerline of the positioned road on which the second electronic device is located, the determining being based on the distribution statuses of some or all of the plurality of candidate positioning locations on both sides of the road centerline of the positioned road.

16. The electronic device according to claim 14, wherein the correcting the first location to output the corrected second location comprises:
calculating, by the first electronic device, a vertical projection of the first location on a road edge on one side of the road centerline; and
outputting the second location at which the vertical projection is located.

17. The electronic device according to claim 13, wherein the selecting the plurality of candidate positioning locations comprises:
selecting, by the first electronic device, the plurality of candidate positioning locations based on first visibility and second visibility of the plurality of satellites relative to the plurality of candidate locations;
wherein the first visibility of one satellite relative to one candidate location indicates that the one satellite is a line-of-sight satellite or a non-line-of-sight satellite of the one candidate location, and the first visibility is related to a sky blocking curve of the one candidate location and an elevation and azimuth of the one satellite relative to the one candidate location; and
wherein the second visibility of the one satellite relative to the one candidate location indicates a probability that the one satellite is a line-of-sight satellite of the one candidate location, and the second visibility is related to the signal parameters of the broadcast signals received by the second electronic device from the plurality of satellites.

18. The electronic device according to claim 17, wherein the plurality of candidate positioning locations comprise a candidate location at which a quantity of satellites that meet a preset condition is greater than a preset satellite quantity threshold; or the plurality of candidate positioning locations comprise M candidate locations in the plurality of candidate locations, wherein M>2, M is a positive integer, a quantity of satellites that meet the preset condition in the M candidate locations is greater than another quantity of satellites that meet the preset condition at another candidate location, and the another candidate location is other than the M candidate locations in the plurality of candidate locations; and a satellite that meets the preset condition is a satellite whose first visibility and second visibility match.

19. The electronic device according to claim 17, wherein before the selecting the plurality of candidate positioning locations, the method further comprises:

determining, by the first electronic device for each satellite and each candidate location and based on the elevation and azimuth of the one satellite relative to the one candidate location and grid data corresponding to the one candidate location, the first visibility of the one satellite relative to the one candidate location, to obtain first visibility of each satellite relative to the each candidate location; and determining, by the first electronic device for the each satellite and based on a signal parameter of a second broadcast signal received by the second electronic device from the one satellite, a second visibility of the one satellite relative to the each candidate location, to obtain a second visibility of each satellite relative to the each candidate location.

20. A chip system is applied to a first electronic device, the first electronic device positions a second electronic device, the second device receiving broadcast signals transmitted by a plurality of satellites, the chip system comprising:

a circuit; and one or more processors coupled to the interface circuit, the one or more processors being interconnected by a cable;

the interface circuit is configured to receive a signal from a memory of the first electronic device and send the signal to the processor, the signal comprising computer instructions stored in the memory, and the one or more processors execute the computer instructions, the first electronic device performs the steps of:

obtaining a first location of the second electronic device;

determining a plurality of candidate locations using the first location as a center point;

selecting a plurality of candidate positioning locations from the plurality of candidate locations based on elevations and azimuths of the plurality of satellites relative to the plurality of candidate locations, grid data corresponding to the plurality of candidate locations, and signal parameters of the broadcast signals received by the second electronic device from the plurality of satellites, each grid data corresponding to each candidate location comprising location information and a sky blocking curve, a sky blocking curve of one candidate location indicating candidate elevations and candidate azimuths of a plurality of obstructions around the one candidate location; and correcting the first location of the second electronic device based on the location information of the plurality of candidate positioning locations and outputting a corrected second location of the second electronic device.

* * * * *